US008836813B2

(12) United States Patent
Hatano

(10) Patent No.: US 8,836,813 B2
(45) Date of Patent: Sep. 16, 2014

(54) IMAGE PROCESSING DEVICE AND IMAGE PROCESSING METHOD

(71) Applicant: Panasonic Corporation, Osaka (JP)

(72) Inventor: Toshinobu Hatano, Kyoto (JP)

(73) Assignee: Panasonic Corporation, Osaka (JP)

( * ) Notice: Subject to any disclaimer, the term of this patent is extended or adjusted under 35 U.S.C. 154(b) by 3 days.

(21) Appl. No.: 13/864,753

(22) Filed: Apr. 17, 2013

(65) Prior Publication Data
US 2013/0242199 A1 Sep. 19, 2013

Related U.S. Application Data

(63) Continuation of application No. PCT/JP2011/004359, filed on Aug. 1, 2011.

(30) Foreign Application Priority Data

Oct. 20, 2010 (JP) ................................. 2010-235523

(51) Int. Cl.
H04N 5/228 (2006.01)
H04N 9/67 (2006.01)
H04N 5/225 (2006.01)
H04N 9/04 (2006.01)
G06T 3/40 (2006.01)
H04N 101/00 (2006.01)

(52) U.S. Cl.
CPC .................. H04N 9/67 (2013.01); H04N 5/225 (2013.01); H04N 9/045 (2013.01); H04N 2101/00 (2013.01); G06T 3/4015 (2013.01)
USPC ........................................ 348/222.1; 348/273

(58) Field of Classification Search
CPC ......... H04N 5/232; H04N 5/225; H04N 5/92; H04N 5/9201; H04N 9/077; H04N 9/083; H04N 9/67; H04N 9/76; G06T 3/40; G06T 3/4015; G06T 3/4007
USPC ........ 348/222.1, 273, 242; 382/162, 298–300
See application file for complete search history.

(56) References Cited

U.S. PATENT DOCUMENTS 6,147,707 A * 11/2000 Terasawa et al. .......... 348/229.1
8,026,952 B2 * 9/2011 Chen .......................... 348/222.1

(Continued)

FOREIGN PATENT DOCUMENTS

JP 2004-147093 A 5/2004
JP 2004-312140 A 11/2004

(Continued)

OTHER PUBLICATIONS

International Search Report issued in International Patent Application No. PCT/JP2011/004359 mailed on Sep. 6, 2011.

Primary Examiner — Nelson D. Hernández Hernández
(74) Attorney, Agent, or Firm — McDermott Will & Emery LLP

(57) ABSTRACT

In a first filtering processing step, RAW data of a source image is subjected to a pixel-based filtering process along a first array direction to divide the RAW data into a first luminance data and a first color carrier data. In a first luminance distribution equalization processing step, the luminance distribution of the first luminance data in the first array direction is corrected to be uniform to produce a second luminance data. In a first color array reproduction processing step, the first color carrier data is re-synthesized with the second luminance data to produce a first multiple-color array data. In a second filtering processing step, the first multiple-color array data is subjected to a pixel-based filtering process along a second array direction to divide the first multiple-color array data into a third luminance data and a second color carrier data. In a second luminance distribution equalization processing step, the luminance distribution of the third luminance data in the second array direction is corrected to be uniform to produce a fourth luminance data. In a second color array reproduction processing step, the second color carrier data is re-synthesized with the fourth luminance data to produce a second multiple-color array data.

24 Claims, 43 Drawing Sheets

(56) References Cited

U.S. PATENT DOCUMENTS

| | | | |
|---|---|---|---|
| 2006/0132628 A1* | 6/2006 | Suzuki | 348/272 |
| 2006/0244842 A1* | 11/2006 | Hatano | 348/223.1 |
| 2007/0127095 A1* | 6/2007 | Sugimori | 358/520 |
| 2007/0222891 A1* | 9/2007 | Hsu | 348/453 |
| 2011/0058064 A1 | 3/2011 | Hatano | |

FOREIGN PATENT DOCUMENTS

| | | |
|---|---|---|
| JP | 2005-107252 A | 4/2005 |
| JP | 2010-004472 A | 1/2010 |
| WO | WO-2010/016166 A1 | 2/2010 |

\* cited by examiner

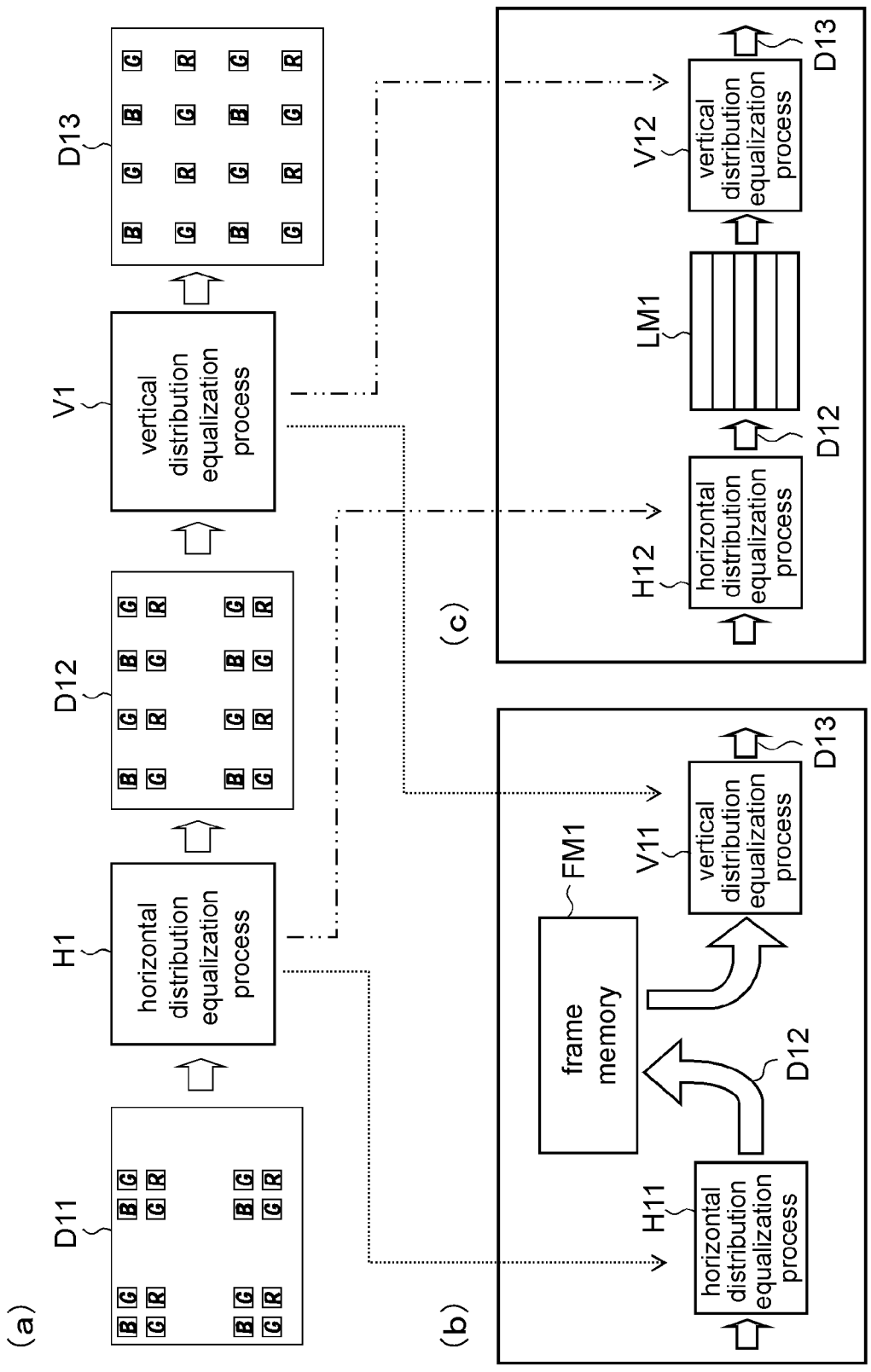

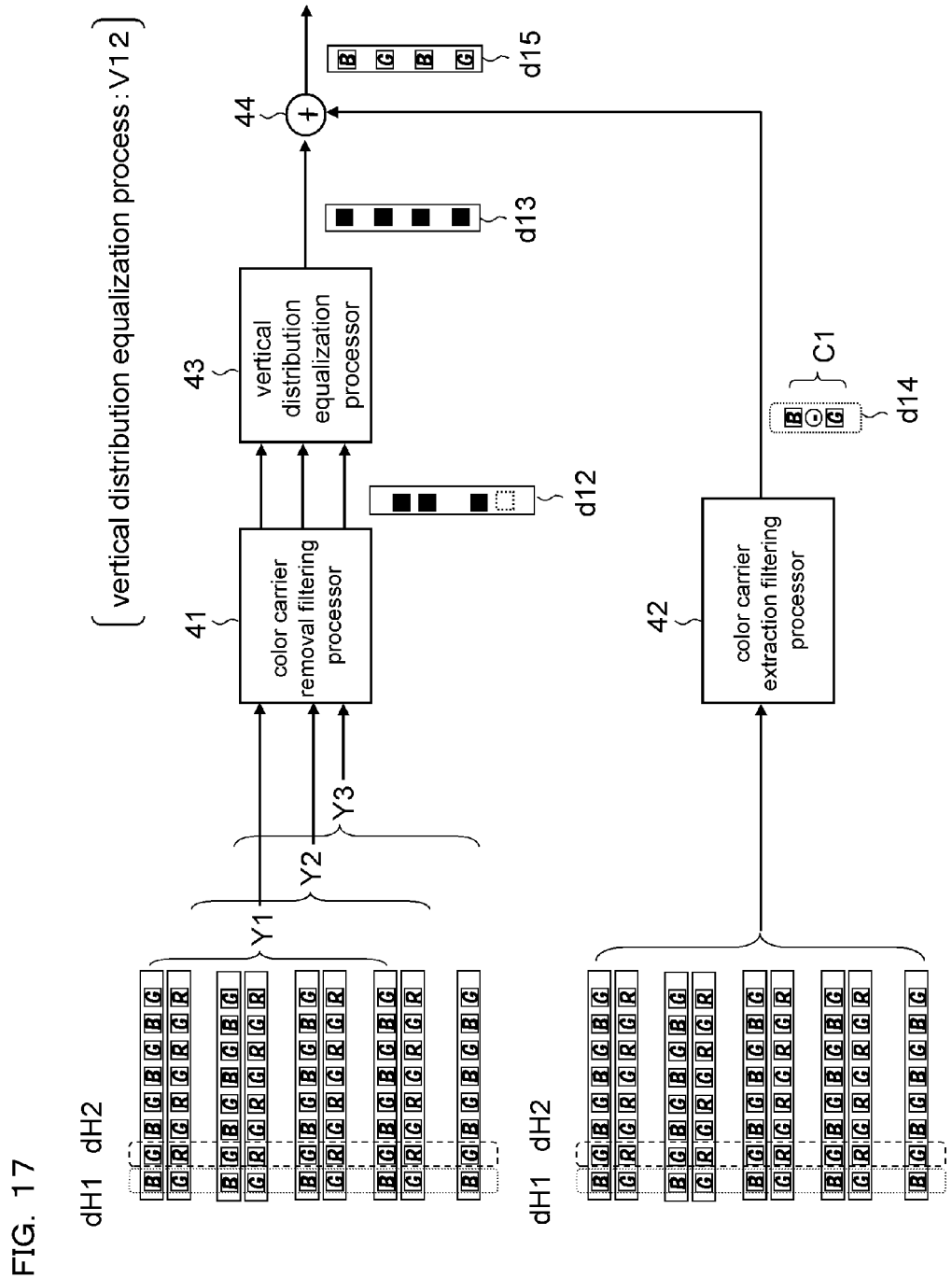

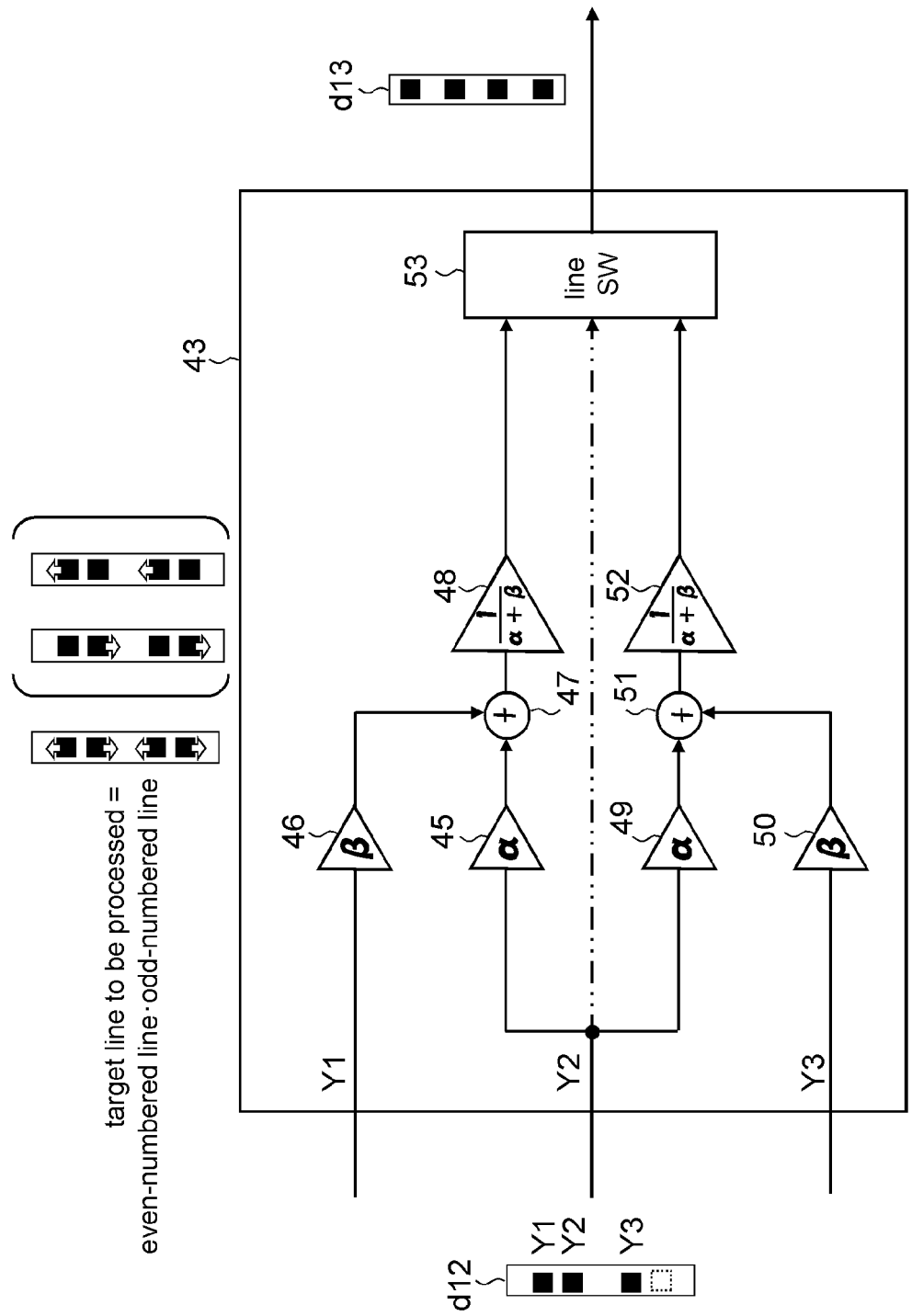

FIG. 28A

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |

FIG. 28B

| R |   | B |   | R |   |
|---|---|---|---|---|---|
|   | G |   | G |   | G |
| B |   | R |   | B |   |
|   | G |   | G |   | G |
| R |   | B |   | R |   |
|   | G |   | G |   | G |

IMAGE PROCESSING DEVICE AND IMAGE PROCESSING METHOD

RELATED APPLICATIONS

This application is a continuation application of PCT international application PCT/JP2011/004359 filed on Aug. 1, 2011, which claims priority to Japanese Patent Application No. 2010-235523 filed on Oct. 20, 2010. The disclosures of these applications including the specifications, the drawings, and the claims are hereby incorporated by reference in its entirety.

TECHNICAL FIELD

The invention relates to image processing devices and image processing methods used in the in the technical field pertaining to electronic still cameras and HD movies. More particularly, the invention is directed at processing source image RAW data outputted from an image sensor having multiple-color pixels where an array of colors has a periodicity such as a single-plate image sensor. In the case where the outputted RAW data is a result of mixing an even number of pixels, for example, four pixels, the distribution of pixels in the RAW data is not uniform in first and second array directions orthogonal to each other. The invention provides a technology for preventing the degradation of an image quality due to the non-uniform distribution. Instead of one-dimensionally dealing with a vertical direction alone for interlace conversion, a fine-resolution image naturally perceived by a viewer is ensured and the occurrence of false colors is reduced on a two-dimensional plane horizontally and vertically in order to accomplish a better image quality. When shooting images in a small RAW recording mode for recording data smaller than the source image RAW data, displaying preview, or shooting moving images for HD movies, a resizing process is performed to the obtained image data to change its data size. It requires a more complicated process to resize the source image RAW data having pixels not uniformly distributed in two-dimensional directions. The invention further provides a technology for accomplishing an image process that enables to obtain high-quality images when such a complicated resizing process is performed.

BACKGROUND ART

In digital cameras, a color separation filter for capturing color images is conventionally provided on an image sensor such as CCD (Charge Coupled Device) or MOS (Metal Oxide Semiconductor). Taking the Bayer array for instance, filters of primary colors, R (red), G (green), and B (blue) are arranged in a checkerboard pattern. Hereinafter, image data captured through the color separation filter is called RAW data. The RAW data has a larger file size than any data of JPEG format, and it is time-consuming to develop and reproduce the RAW data. As a result of higher pixels and ongoing developments of faster data-read techniques in image sensors, small RAW images smaller than source images are more often used these days. The small RAW images are paid attention for their use in; a monitor mode for monitoring photographic subjects on a liquid crystal monitoring device to capture still images, and HD movies such as moving images normalized in size. A conventional processing method for small images is to sum and read signals of the same color at every other pixel in an image sensor (pixel mixing reading method). This method provides smaller RAW data having a reduced number of output effective pixels, enabling a shorter processing time and energy saving. The typical examples of the pixel mixing method are a nine-pixel mixing method and a four-pixel mixing method.

Describing the nine-pixel mixing, three pixels in the horizontal direction and three pixels in the vertical direction for signals of the same color at every other pixel, that is matrix data of nine pixels in total, are mixed and used as data of one pixel to reduce an image size (data volume) to one-ninth of its original size. Describing the four-pixel mixing, two pixels in the horizontal direction and two pixels in the vertical direction for signals of the same color at every other pixel, that is matrix data of four pixels in total, are mixed and used as data of one pixel in order to reduce an image size (data volume) to one-fourth of its original size.

The nine-pixel mixing in the primary color Bayer array is briefly described referring to FIGS. 29 to 36. The symbols with small letters, b, g1, g2, and r, denote color elements before mixing, and symbols, B, G1, G2, and R, denote color elements after mixing. The color elements b and B are blue, g1 and g2 are green, and r and R are red. The color elements g1 and G1 are green laterally next to the color elements b and B. The color elements g2 and G2 are green vertically next to the color elements b and B. Based on the periodicity of the RGB Bayer array, bg- or BG-repeated line data and gr- or GR-repeated line data along the horizontal direction are alternately outputted in the vertical direction. The Bayer array before mixing remains unchanged after the pixels are mixed.

FIG. 29 illustrates an example of mixing the color elements b (blue). The quadrangles drawn with bold lines each represents a unit block made up by the pixel data of nine color elements b to be mixed in the distribution space of RAW data of a source image. In a unit block of the $1^{st}$ row and $1^{st}$ column, data of nine pixel data b illustrated with circles, which are respectively in the $1^{st}$ row and $1^{st}$ column, the $1^{st}$ row and $3^{rd}$ column, the $1^{st}$ row and $5^{th}$ column, the $3^{rd}$ row and $1^{st}$ column, the $3^{rd}$ row and $3^{rd}$ column, the $3^{rd}$ row and $5^{th}$ column, the $5^{th}$ row and $1^{st}$ column, the $5^{th}$ row and $3^{rd}$ column, and the $5^{th}$ row and $5^{th}$ column, are mixed by addition. As illustrated in FIG. 30, pixel data B obtained by the mixing is allocated so that a pixel at the center of three rows and three columns in horizontal and vertical directions carries the mixed pixel data B. The positions of the pixel data B illustrated in FIG. 30 are the positions of pixels of the same color b, which is a difference to the four-pixel mixing described later as is known from the comparison between FIG. 36 and FIG. 41. The pixel allocation is applied to all of the unit blocks, and pixels in the pixel data of the mixed color elements B (blue) are allocated as illustrated in FIG. 30.

FIG. 31 illustrates an example of mixing the color elements g1 (green). The quadrangles drawn with bold lines each represents a unit block made up by the pixel data of nine color elements g1 (green) to be mixed. In unit blocks illustrated in FIG. 31, pixels at the center in the lateral direction are located in the middle of two unit blocks adjacent to each other illustrated in FIG. 29. Referring to a unit block of the $1^{st}$ row and $1^{st}$ column illustrated in FIG. 31, data of nine pixels illustrated with circles, which are respectively in the $1^{st}$ row and $4^{th}$ column, the $1^{st}$ row and $6^{th}$ column, the $1^{st}$ row and $8^{th}$ column, the $3^{rd}$ row and $4^{th}$ column, the $3^{rd}$ row and $6^{th}$ column, the $3^{rd}$ row and $8^{th}$ column, the $5^{th}$ row and $4^{th}$ column, the $5^{th}$ row and $6^{th}$ column, and the $5^{th}$ row and $8^{th}$ column, are mixed by addition. As illustrated in FIG. 32, pixel data obtained by the mixing is allocated so that a pixel at the center of three rows and three columns in horizontal and vertical directions carries the mixed pixel data. The pixel allocation is applied to all of the unit blocks, and pixels in the pixel data of the mixed color elements G1 (green) are allocated as illustrated in FIG. 32.

As is clear from the drawing of FIG. 33 where the illustrations of FIGS. 30 and 32 are combined, coordinates of the allocated pixels in the pixel data of the mixed color elements B and the color elements G1 are uniformly distributed in the horizontal direction with intervals of two pixels in the horizontal direction between the different color elements. In the illustrations of FIGS. 30 and 32, there are intervals of an odd number of pixels, five pixels, in the horizontal direction between the same color elements. Therefore, pixels of different colors can be conveniently allocated in the middle of two adjacent pixels spaced from each other by five pixels. The odd number is expressed by (2m+1), where m is an arbitrary natural number. The middle position expressed by {(2m+1)+1}/2=m+1 (natural number) resulting in a dividable number is a right position for the allocation of such pixels.

FIG. 34 illustrates an example of mixing the color elements g2 (green). The coordinates of the allocated pixels in the mixed data are G2 in FIG. 36. FIG. 35 illustrates an example of mixing the color elements r (red). The coordinates of the allocated pixels in the mixed data are R in FIG. 36. FIG. 36 illustrates all of the coordinates of the allocated pixels in the B, G1, G2, and R mixed data. As is clearly known from FIG. 36, the color elements B and G2, and the color elements G1 and R aligned in the vertical direction are spaced from each other at equal intervals. There are intervals of two pixels between the different color elements, and there are intervals of five pixels between the same color elements. Therefore, pixels of different colors can be conveniently allocated in the middle of two adjacent pixels spaced from each other by five pixels. In the nine-pixel mixing, coordinates of the allocated pixels in the mixed data are uniformly distributed in the horizontal and vertical directions.

The four-pixel mixing is described referring to FIGS. 37 to 41. FIG. 37 illustrates an example of mixing the color elements b. In a unit block of the $1^{st}$ row and $1^{st}$ column, data of four pixel data b illustrated with circles, which are respectively in the $1^{st}$ row and $1^{st}$ column, the $1^{st}$ row and $3^{rd}$ column, the $3^{rd}$ row and $1^{st}$ column, and the $3^{rd}$ row and $3^{rd}$ column, are mixed by addition. As illustrated in FIG. 41, pixel data B obtained by the mixing is allocated so that a pixel at the center of two rows and two columns in horizontal and vertical directions carries the mixed pixel data B. The positions of the pixel data B illustrated in FIG. 41 are the positions of pixels of the color r in FIG. 37 (in contrast to the nine-pixel mixing where these positions are the pixel positions of the same color). The pixel allocation is applied to all of the unit blocks, and pixels of the pixel data of the mixed color elements B are allocated as illustrated in FIG. 41.

FIG. 38 illustrates an example of mixing the color elements g1. In the given example, data of four pixel data b illustrated with circles, which are respectively in the $1^{st}$ row and $2^{nd}$ column, the $1^{st}$ row and $4^{th}$ column, the $3^{rd}$ row and $2^{nd}$ column, and the $3^{rd}$ row and $4^{th}$ column, are mixed by addition. As illustrated in FIG. 41, pixel data obtained by the mixing is allocated so that a pixel at the center of two rows and two columns in horizontal and vertical directions carries the mixed pixel data. The positions of the pixel data G1 illustrated in FIG. 41 are the positions of pixels of the same color g2 in FIG. 38 (though different suffixes in G1 and g2). The pixel allocation is applied to all of the unit blocks, and pixels of the pixel data of the mixed color elements G1 are allocated as illustrated in FIG. 41.

FIG. 39 illustrates an example of mixing the color elements g2. The coordinates of the allocated pixels in the mixed data are G2 illustrated in FIG. 41. FIG. 40 illustrates an example of mixing the color elements r. The coordinates of the allocated pixels in the mixed data are R illustrated in FIG. 41. In the illustration of FIG. 41, the pixel data R are allocated at the pixel positions of the color b in FIG. 40 (in contrast to the nine-pixel mixing where these positions are the pixel positions of the same color).

As is learnt from the drawing of FIG. 41 where the illustrations of these pixel positions are combined, coordinates of the allocated pixels in the mixed data of the color elements B and the color elements G1 are not uniformly distributed in the horizontal direction. Similarly, coordinates of the allocated pixels in the mixed data of the color elements G2 and the color elements R are not uniformly distributed in the horizontal direction. On the other hand, coordinates of the allocated pixels in the mixed data of the color elements B and the color elements G2 are not uniformly distributed in the vertical direction, and coordinates of the allocated pixels in the mixed data of the color elements G1 and the color elements R are not uniformly distributed in the vertical direction.

FIGS. 42A to 42C are summarized illustrations of FIGS. 37 through 41. An image sensor of the primary color Bayer array has filters of the same colors arranged at every other pixel. When pixels are mixed in the horizontal direction, therefore, the image sensor is driven by timings corresponding to the every other pixel. The image sensor is driven likewise when the pixels are mixed in the vertical direction. FIG. 42A illustrates the source image RAW data. FIG. 42B illustrates the distribution of pixel-mixed RAW data on the source image RAW data, which is an illustration corresponding to FIG. 41. FIGS. 41 and 42B both illustrate the distribution of pixel data, indicating which of data at different coordinate positions on the source image is carried by each one of pixel data serially inputted. FIG. 42C illustrates a pixel arrangement of the RAW data where pixels are equally spaced timing-wise after four pixels are mixed.

To read the pixel data by mixing four pixels in the image sensor illustrated in FIG. 42A, BG-repeated line data of two lines are transmitted to a pixel mixer in a next stage from a photo detector (photoelectric converter) of the image sensor. The pixel mixer includes a vertical transfer switch, a signal voltage retainer circuit including capacitors, and a horizontal transfer switch. The pixel mixer outputs the BG-repeated line data after four pixels are mixed from a signal output line (see the Patent Reference 4). Then, GR-repeated line data of two lines are transmitted to the pixel mixer from the photo detector of the image sensor, and the pixel mixer outputs the GR-repeated line data after four pixels are mixed through the signal output line. The BG-repeated line data and the GR-repeated line data after four pixels are mixed are outputted serially in turns.

A group of pixels continuous in the pixel-repeated line data are equally spaced timing-wise. It may as well be said that, in the mixed pixel data of the Bayer array, timings by which data is serially inputted are timings at equal intervals in the horizontal direction, and are also timings at equal intervals in the vertical direction. However, the distribution of pixel data, indicating which of pixel at different positions on the source image is carried by each one of these pixel data, is not uniform as illustrated in FIGS. 41 and 42B. The lack of uniformity in the distribution of pixel data may be a factor that causes the degradation of an image quality as described below.

As a result of the four-pixel mixing, the coordinate position of a pixel where the mixed pixel data is allocated corresponds to a position in the middle of two pixels before the pixels are mixed. Referring to the illustrations of FIGS. 41 and 42B, the coordinate positions of pixels where the mixed pixel data are respectively allocated are not equally spaced in the vertical and horizontal directions. Horizontally and vertically, the odd-numbered B and G are very close to each other, the odd-numbered G and the even-numbered B are very distant from each other, the odd-numbered G and R are very close to each other, and the odd-numbered R and the even-numbered G B are very distant from each other. A pixel count equivalent to an interval between the very closely spaced color elements is zero, while a pixel count equivalent to an interval between the very distantly spaced color elements is two. Thus, the color elements are not equally spaced from one another. In the Bayer array after the pixels are mixed, the non-uniform distribution of pixel data leads to the loss of continuity of aliasing components to be obtained by the pixel mixing from high-frequency information to low-frequency information. This adversely affects an image quality.

The differences between the nine-pixel mixing and the four-pixel mixing are described below. In the nine-pixel mixing, the pixel data obtained by mixing the blue color elements are allocated on the odd-numbered lines both horizontally and vertically, and the pixel data obtained by mixing the red color elements are allocated on the even-numbered lines both horizontally and vertically. Thus, the lines where these pixel data are distributed remain unchanged before and after the pixel mixing. And, the same goes for the lines where the pixel data obtained by mixing the green 1 and green 2 color elements, respectively, are allocated, with the lines remaining unchanged likewise before and after the pixel mixing. In the four-pixel mixing, however, the lines of the pixel data obtained by mixing the blue color elements change from the odd-numbered lines to the even-numbered lines both horizontally and vertically, and the lines of the pixel data obtained by mixing the red color elements change from the even-numbered lines to the odd-numbered lines both horizontally and vertically. And, the same goes for the lines of the pixel data obtained by mixing the green 1 and green 2 color elements respectively, with the lines changing likewise before and after the pixel mixing.

A conventional art for correcting the distribution of pixel data is directed at solving problems such as the occurrence of image distortion and/or moire when signals of the same color are added in every other line and then read (see the Patent Reference 1). This conventional art is, however, designed to correct the distribution to be uniform in the vertical direction alone. The conventional art disclosed in the Patent Reference 1 is briefly described referring to FIGS. 43A to 43C.

As illustrated in FIG. 43A, an image sensor m2 is driven by timing signals outputted from a driver m8 of the image sensor. Of pixel signals of the same color, the pixel signals adjacent to each other in the vertical direction are mixed as illustrated in FIG. 43B (a) and (b). The resulting signal is converted to a digital signal by an AD converter m4. The digital signal is processed by a camera signal processor m6, for example, subjected to a color separation process. As a result of the process, a luminance signal and a color difference signal are generated. In the luminance signal and the color difference signal thus generated, lines are not equally spaced; a (2n−1)th line and a 2 nth line are very close to each other but the 2 nth line and a (2n+1)th line are very distant from each other, where n is a natural number (n=1, 2, . . . ).

As illustrated in FIG. 43C, a correction processor (center-of-gravity displacement correction processor) m10 corrects the non-uniform distribution of pixel data in the color difference signal and the luminance signal outputted from the camera signal processor m6. Lines Y2$n$ and Y (2$n$±even number) are even-numbered lines of the color difference signal and the luminance signal. The line Y2$n$, Y (2$n$±even number) is an upper one of two lines very close to each other due to the vertically non-uniform distribution of pixel data. The lines Y (2$n$±odd number) are odd-numbered lines of the luminance signal and the color difference signal. The line Y (2$n$±odd number) is a lower one of the two very close lines. Lines Y'2$n$ and Y' (2$n$±even number) are even-numbered lines of the color difference signal and the luminance signal after the non-uniform distribution of pixel data is corrected. Lines Y' (2$n$±odd number) are odd-numbered lines of the color difference signal and the luminance signal after the non-uniform distribution is corrected.

The ratio of an interval between Y2$n$ and Y2$n$+1 to an interval between Y2$n$+1 and Y2$n$+2 is 1:3. Therefore, the correction process is performed so that the signals have an equal interval after the vertically non-uniform distribution of pixel data is corrected, as expressed by the following equations.

$$Y'2n = Y2n$$

$$Y'2n+1 = (2/3) \times Y2n+1 + (1/3) \times Y2n+2$$

The signals of the even-numbered lines are outputted as-is, and the signals of the odd-numbered lines are interpolated so that a ratio of these signals to those of the next lines is 2:1.

As a result of such a process, the coordinates of the pixels where the mixed pixel data are allocated are uniformly distributed in the vertical direction. An image thereby obtained has no image distortion or moire because the non-uniform distribution of pixel data has been corrected.

In order to record moving images normalized in size, the RAW data may be reduced in size to one-fourth by mixing the pixels on the image sensor and then subjected to a resizing process on the Bayer array (see an example disclosed in the Patent Reference 2). According to the method disclosed in the Patent Reference 2, when a resized image is obtained from a source image containing pixels of different colors where an array of RGB colors has a periodicity, two different resizing processes are performed to luminance data and color difference data obtained from the source image in place of resizing the RGB color-separated data obtained from the source image.

RELATED ART DOCUMENT

Patent Reference

Patent Reference 1: JP Patent Application Publication No. 2004-147093
Patent Reference 2: WO2010/016166
Patent Reference 3: JP Patent Application Publication No. 2004-312140
Patent Reference 4: JP Patent Application Publication No. 2005-107252

SUMMARY OF THE INVENTION

Problem to be Solved by the Invention

A description is hereinafter given based on the premise that an image processing target is RAW data of a source image outputted from an image sensor having multiple-color pixels where an array of colors has a periodicity, and pixel data of the RAW data is non-uniformly distributed in first and second array directions orthogonal to each other because the RAW data is outputted by mixing an even number of pixels, for example, four pixels. The distribution of pixel data is a distribution indicating which of data at different coordinate positions on the source image is carried by each one of the pixel data serially inputted. When an odd number of pixels, for example, nine pixels are mixed, the problem of non-uniform distribution of pixel data does not occur. On the other hand, the distribution of pixel data becomes non-uniform when an even number of pixels, for example, four pixels are mixed. The lack of uniformity in the distribution of pixel data after the pixel mixing leads to the loss of continuity to be obtained by the pixel mixing in aliasing components from high-frequency information to low-frequency information. This is a factor that degrades an image quality.

According to the technology disclosed in the Patent Reference 1 characterized in that signals of the same color are added for every other line and read, the non-uniform distribution of pixel data is vertically corrected. However, it is neither disclosed nor implied how the non-uniformity can be horizontally corrected. The effect of correcting the lack of uniformity in the distribution of pixel data depends largely on the characteristics of the camera signal processor m6. First, the color separation process is performed, and various processes are then performed to generate the luminance signal and the color difference signal of a pixel of interest. This is commonly used two-dimensional filtering process. The technology is, wherein components causing the non-uniform distribution of pixel data are two-dimensionally dispersed, can only exert a limited effect in correcting the non-uniform distribution of pixel data on the level of pixel pitches. To correct the distribution of pixel data to be uniform, the correction processor m10 corrects the color difference signal and the luminance signal. It is stressed in the disclosure that, because the correction process is not performed in the even-numbered lines or the odd-numbered lines, the degradation of a resolution does not occur in the lines not subjected to the correction process. This technology, however, involves the disadvantage that the resolution differs in different lines because the resolution is inevitably degraded in the lines subjected to the correction process. Summarizing the description, in the technology disclosed in the Patent Reference 1 the degradation of an image quality is yet to be fully prevented because the technology is not performed by two-dimensional processing.

According to the technology disclosed in the Patent Reference 2, the luminance data and color carrier data are extracted from a source image by performing a pixel-based filtering process on the respective lines. To resize the RAW data obtained by mixing four pixels, the RAW data, in which the non-uniform distribution of pixels is left uncorrected, is resized. As a result, false colors may appear on an image or a resolution may be as poor as a sense of visual discomfort may be generated. Thus, it is difficult to obtain the resized RAW data in which features of the source image are fully exploited.

The invention was accomplished under these circumstances. The object of the invention is to ensure a desirably high resolution along with a success in reducing the occurrence of false luminance signals and/or false colors when image-processing the source image RAW data outputted by mixing an even number of pixels, for example, four pixels and having a pixel data distribution non-uniform in two-dimensional directions.

The invention is further directed at ensuring a desirably high resolution along with a success in reducing the occurrence of false luminance signals and false colors when resizing the source image RAW data having pixels non-uniformly distributed in two-dimensional directions.

Means for Solving Problems

The invention solves the conventional technical problems by taking the following measures. All of the numbers herein-after recited in the brackets, (1), (2), (3), . . . respectively correspond to the claim numbers recited in the documents when the subject application was filed. All of the bracketed numbers are not arranged in the numerical order, with some numbers in reverse or random order.

(1) The basic premise is that an image processing target is RAW data of a source image outputted from an image sensor having multiple-color pixels where an array of colors has a periodicity. The RAW data outputted by mixing an even number of pixels, for example, four pixels, has a pixel data distribution non-uniform in first and second array directions orthogonal to each other. The RAW data, though typically obtained by mixing four pixels, is not necessarily limited to the RAW data obtained by mixing four pixels but includes all of RAW data obtained by any even number of pixels. It may be arbitrarily decided which of a first array direction and a second array direction is a horizontal direction or a vertical direction. When a distribution equalization process is performed in two-dimensional directions, the process may start in the horizontal direction and then performed in the vertical direction, or the process may start in the vertical direction and then performed in the horizontal direction. The distribution equalization process can be better understood by referring to the note (*1) in an example 1 described later.

A first multiple-color array data is generated. To generate the first multiple-color array data, a pixel data distribution (indicating which of data at different coordinate positions on the source image is carried by each one of the pixel data serially inputted) of a sequence of pixel data (source image RAW data) having pixels not uniformly distributed two-dimensionally and inputted along the first array direction is corrected to be uniform in the first array direction. This is called a first distribution equalization process. The first distribution equalization process is conventionally accomplished by interpolating pixels. The first distribution equalization process corrects the pixel data distribution to be uniform in the first array direction. However, the pixel data distribution is still not uniform in the second array direction.

Then, a second multiple-color array data is generated. To generate the second multiple-color array data, the pixel data distribution of the RAW data after the first distribution equalization process is performed thereto (first multiple-color array data; a sequence of pixel data having pixels not uniformly distributed in the second array direction) is corrected to be uniform in the second array direction. This is called a second distribution equalization process. The second distribution equalization process is also accomplished by interpolating pixels. The second distribution equalization process corrects the pixel data distribution to be uniform in the second array direction as well.

So far is described the technical idea of the invention in order to solve the conventional technical problems. To fulfill the technical idea, the invention provides a first distribution equalization processor and a second distribution equalization processor. These processors are illustrated in FIG. 1.

To a first distribution equalization processor A1 is inputted RAW data of a source image outputted from an image sensor having multiple-color pixels where an array of colors has a periodicity. In the RAW data outputted by mixing an even number of pixels, for example, four pixels, pixels are not uniformly distributed in the first and second array directions orthogonal to each other. The first distribution equalization processor A1 corrects the pixel data distribution of the inputted source image RAW data to be uniform in the first array direction. The first distribution equalization processor A1 includes the following structural elements; a first filtering processor a1, a first luminance distribution equalization processor a2, and a first color array reproduction processor a7. The source image RAW data is inputted to the first filtering processor a1 per line in the first array direction (horizontal or vertical direction). The first filtering processor a1 performs a pixel-based filtering process to the inputted source image RAW data along the first array direction to divide the source image RAW data into two continuous data; first luminance data, and first color carrier data. More specifically describing the division of the source image RAW data into the first luminance data and first color carrier data that are continuous data, the continuous data originally obtained is subjected to the distribution equalization process without separating the source image into R, G, and B color data. The source image is not divided into R, G, and B color data because it becomes difficult to ensure a desirably high resolution and reduce the occurrence of false colors at the same time in the case where the color-separated data is subjected to the distribution equalization process. The RAW data is divided into the first luminance data and the first color carrier data which are both continuous data because the invention performs the interpolation process for different colors in contrast to an interpolation technique conventionally employed to correct the distribution. It may not be necessary to divide the RAW data into the luminance data and the color carrier data as far as the interpolation process is performed for the same color. The interpolation process according to the invention is targeted for two adjacent pixels, meaning that the interpolation process is performed for different colors. Another reason for dividing the RAW data is different characteristics of the luminance data and the color carrier data respectively exhibited in the filtering process. The luminance data containing many high frequency components is likely to cause aliasing, adversely affecting an image quality. On the other hand, the color carrier data containing high frequency components not as many as luminance data is unlikely to cause aliasing, hardly adversely affecting the image quality. In order to reduce the occurrence of false colors while ensuring a desirably high resolution, therefore, the first luminance data that is a continuous data is preferably subjected to the distribution equalization process independently from the first color carrier data that is a continuous data.

The first luminance distribution equalization processor a2 corrects the luminance distribution of the first luminance data continuous in the first array direction to be uniform, thereby generating a second luminance data. The first color array reproduction processor a7 generates the first multiple-color array data by re-synthesizing the first color carrier data divided by the first filtering processor a1 (continuous in the first array direction) with the second luminance data generated continuously by the first luminance distribution equalization processor a2.

To a second distribution equalization processor B1 is inputted the first multiple-color array data (having the distribution corrected to be uniform in the first array direction) outputted from the first distribution equalization processor A1. The second distribution equalization processor B1 corrects the pixel data distribution of the inputted first multiple-color array data to be uniform in the second array direction (vertical or horizontal direction), thereby generating a second multiple-color array data. The second distribution equalization processor B1 has the following structural elements; a second filtering processor b1, a second luminance distribution equalization processor b2, and a second color array reproduction processor b7. The first multiple-color array data is inputted to the second filtering processor b1 per line in the second array direction. The second filtering processor b1 performs a pixel-based filtering process to the inputted first multiple-color array data along the second array direction to divide the inputted first multiple-color array data into two continuous data; third luminance data, and second color carrier data. The second luminance distribution equalization processor b2 corrects the luminance distribution of the third luminance data (continuous in the second array direction) outputted from the second filtering processor b1 to be uniform, thereby generating a fourth luminance data. The second color array reproduction processor b7 generates the second multiple-color array data by re-synthesizing the second color carrier data divided by the second filtering processor a1 (continuous in the second array direction) with the fourth luminance data outputted from the second luminance distribution equalization processor b2.

It is difficult to ensure a desirably high resolution and prevent the occurrence of false colors at the same time. Therefore, in place of separating the source image into R, G, and B color data, the invention divides the source image RAW data into two continuous data; first luminance data, and first color carrier data, and performs the distribution equalization process to the first luminance data independently from the first color carrier data to generate the second luminance data that is a continuous data. Then, the generated second luminance data is re-synthesized with the first color carrier data that is a continuous data previously divided from the first luminance data. So far were described the distribution equalization process for the luminance data independently performed in the first array direction and the process for re-synthesizing the luminance data and the color carrier data after the distribution equalization process is performed. The invention performs these processes not only in the first array direction but also in the second array direction orthogonal to the first array direction. As a result of a synergy effect exerted by the combination of these processes, the invention favorably succeeds in ensuring a desirably high resolution and reducing the occurrence of false colors at the same time in the two-dimensional directions. Further, the invention succeeds in ensuring a desirably high resolution and reducing the false luminance signals and/ or false colors at the same time in the source image RAW data outputted by mixing an even number of pixels, for example, four pixels and having pixels non-uniformly distributed in the two-dimensional directions.

(4) This section discusses an image processing device further including a resizing function. According to the technical characteristics in (1), the first distribution equalization processor A1 and the second distribution equalization processor B1 are structurally similar in that the color array reproduction processor (a7, b7) is provided subsequent to the luminance distribution equalization processor (a2, b2). This section provides a luminance resizing processor (a3, b3) in charge of resizing between the color array reproduction processor and the luminance distribution equalization processor. The luminance resizing processor (a3, b3) generates a 2-1th luminance data and a fifth luminance data by performing a resizing process in the first or second array direction to the continuous luminance data after the distribution equalization process is performed thereto by the luminance distribution equalization processor (second, fourth luminance data). The resizing process performed to change a data size includes a reducing process and an enlarging process. The resizing process generally performed is the reducing process which reduces a data size by thinning pixel data.

The resizing process for the color carrier data is a complicated process as compared to the resizing process for the luminance data. The color carrier data is outputted from the filtering processor in the form of a color difference signal code-inverted per pixel. The color carrier data code-inverted per pixel is, in other words, the color carrier data having different colors alternately arranged per pixel. It significantly degrades an image quality to directly resize the color carrier data code-inverted per pixel by thinning pixel data. Therefore, the color carrier data outputted from the filtering processor is code-inverted so that the same colors are serially arranged in the resulting color carrier data. Then, the resulting color carrier data is subjected to the resizing process. Before synthesizing the resized color difference data with the resized luminance data, the resized color difference data having the same colors serially arranged is code-inverted again so that the array of colors resumes its original periodicity. Then, the color carrier data where the array of colors has resumed its original periodicity is synthesized with the resized luminance data Following the brief summary of the technical characteristics, a detailed description is hereinafter given referring to FIG. 2. The main structural elements are a first distribution equalization and resizing processor A2, and a second distribution equalization and resizing processor B2. To the first distribution equalization and resizing processor A2 is inputted the source image RAW data having the pixel data distribution non-uniform in the first and second array directions orthogonal to each other. The first distribution equalization and resizing processor A2 generates the first multiple-color array data by correcting the pixel data distribution of the inputted source image RAW data to be uniform in the first array direction and resizing the inputted data in the first array direction. The second distribution equalization and resizing processor B2 generates the second multiple-color array data. To generate the second multiple-color array data, the first multiple-color array data resized and having the pixel data distribution uniform in the first array direction and outputted from the second distribution equalization and resizing processor A2 is corrected to be resized and has the pixel data distribution uniform in the second array direction.

The first distribution equalization and resizing processor A2 has the following structural elements; a first filtering processor a1, a first luminance distribution equalization processor a2, a first luminance resizing processor a3, a first color inversion demodulator a4, a first color difference resizing processor a5, a first color carrier modulator a6, and a first color array reproduction processor a7. The first filtering processor a1 divides the inputted source image RAW data into two continuous data; first luminance data, and first color carrier data, by performing a pixel-based filtering process to the inputted RAW data along the first array direction (horizontal or vertical direction). The first color carrier data is a continuous data alternately code-inverted and having different colors alternately arranged per pixel. The first luminance distribution equalization processor a2 generates a second luminance data by correcting the luminance distribution of the first luminance data that is a continuous data generated by the first filtering processor a1 to be uniform in the first array direction. The first luminance resizing processor a3 generates the 2-1th luminance data by resizing the second luminance data that is a continuous data outputted from the first luminance distribution equalization processor a2 in the first array direction. The first color inversion demodulator a4 generates a first color difference data having the same colors serially arranged by demodulating the first color carrier data. The first color difference data is a continuous data where the same colors are serially arranged. The first color difference resizing processor a5 generates a second color difference data by resizing the first color difference data in the first array direction. The second color difference data is a continuous data where the same colors are serially arranged. The first color carrier modulator a6 modulates the second color difference data into a 1-1th color carrier data alternately code-inverted so that the array of colors resumes its original periodicity. The first color array reproduction processor a7 generates a first multiple-color array data by re-synthesizing the 2-1th luminance data outputted from the first luminance resizing processor a3 with the 1-1th color carrier data outputted from the first color carrier modulator a6.

The second distribution equalization and resizing processor B2 has the following structural elements; a second filtering processor b1, a second luminance distribution equalization processor b2, a second luminance resizing processor b3, a second color inversion demodulator b4, a second color difference resizing processor b5, a second color carrier modulator b6, and a second color array reproduction processor b7.

The second filtering processor b1 performs a pixel-based filtering process to the first multiple-color array data outputted from the first distribution equalization and resizing processor A2 along the second array direction (vertical or horizontal direction) to divide the first multiple-color array data into two continuous data; third luminance data, and second color carrier data. The second color carrier data is a continuous data alternately code-inverted and having different colors alternately arranged per pixel. The second luminance distribution equalization processor b2 generates a fourth luminance data by correcting the luminance distribution of the third luminance data outputted from the second filtering processor b1 to be uniform in the second array direction. The second luminance resizing processor b3 generates a fifth luminance data by performing the resizing process to the fourth luminance data outputted from the second luminance distribution equalization processor b2 in the second array direction. The second color inversion demodulator b4 demodulates the second color carrier data outputted from the second filtering processor b1 to generate a third color difference data that is a continuous data having the same colors serially arranged. The second color difference resizing processor b5 generates a fourth color difference data by performing the resizing process to the third color difference data outputted from the second color inversion demodulator b4 in the second array direction. The second color carrier modulator b6 modulates the fourth color difference data outputted from the second color difference resizing processor b5 into a third color carrier data code-inverted again so that the array of colors resumes its original periodicity. The second color array reproduction processor b7 generates the second multiple-color array data by re-synthesizing the fifth luminance data outputted from the second luminance resizing processor b3 with the third color carrier data outputted from the second color carrier modulator b6.

The operational effects exerted by these technical features are described below. The source image RAW data is divided into the continuous luminance data and color carrier data. The luminance data is subjected to the distribution equalization process independently from the color carrier data and further subjected to the resizing process. The color carrier data is demodulated and converted to the color difference data, and then resized. The color carrier data is code-inverted and then resized, and the resulting color carrier data is then code-inverted again to resume its original signal format. These technical means are the distinctive advantages of the invention. Then, the continuous luminance data resized and having pixel data uniformly distributed is re-synthesized with the resized continuous color carrier data. A sequence of these processes is performed in the first array direction and the second array direction orthogonal to the first array direction. These processes can resize the source image RAW data outputted by mixing an even number of pixel, for example, four pixels and thereby having pixel data non-uniformly distributed in the two-dimensional directions in a manner that a fine-resolution image naturally perceived is ensured and the occurrence of false colors is prevented from happening in the two-dimensional directions. As a result of the luminance distribution equalization process and the resizing process two-dimensionally performed, high-quality images can be obtained in a small RAW data recording mode for recording data smaller than the source image RAW data, display of preview, or shooting moving images for HD movies.

So far were described the modes of the image processing device according to the invention. Hereinafter, an image processing method provided by the invention is described.

(17) An image processing method configured in a manner corresponding to the image processing device recited in (1) includes the following processes and steps:

a first distribution equalization process for generating a first multiple-color array data by inputting RAW data of a source image, the source image RAW data being outputted by mixing an even number of pixels from an image sensor having multiple-color pixels where an array of colors has a periodicity and having a pixel data distribution non-uniform in first and second array directions orthogonal to each other, and by correcting the pixel data distribution of the inputted source image RAW data to be uniform in the first array direction; and a second distribution equalization process for generating a second multiple-color array data by correcting the pixel data distribution of the first multiple-color array data to be uniform in the second array direction, wherein the first distribution equalization process includes:

a first filtering processing step for dividing the source image RAW data into a first luminance data and a first color carrier data that are continuous data by performing a pixel-based filtering process to the source image RAW data along the first array direction;

a first luminance distribution equalization processing step for generating a second luminance data by correcting a luminance distribution of the first luminance data to be uniform in the first array direction; and a first color array reproduction processing step for generating the first multiple-color array data by re-synthesizing the first color carrier data with the second luminance data, and the second distribution equalization process includes:

a second filtering processing step for dividing the first multiple-color array data into a third luminance data and a second color carrier data that are continuous data by performing a pixel-based filtering process to the first multiple-color array data along the second array direction;

a second luminance distribution equalization processing step for generating a fourth luminance data by correcting a luminance distribution of the third luminance data to be uniform in the second array direction; and a second color array reproduction processing step for generating the second multiple-color array data by re-synthesizing the second color carrier data with the fourth luminance data.

(2) An image processing method configured in a manner corresponding to the image processing device recited in (4) includes the following processes and steps:

a first distribution equalization and resizing process for generating a first multiple-color array data by inputting RAW data of a source image, the source image RAW data being outputted by mixing an even number of pixels from an image sensor having multiple-color pixels where an array of colors has a periodicity and having a pixel data distribution non-uniform in first and second array directions orthogonal to each other, and by correcting the pixel data distribution of the inputted source image RAW data to be uniform in the first array direction and further resizing the inputted source image RAW data in the first array direction; and a second distribution equalization and resizing process for generating a second multiple-color array data by correcting the pixel data distribution of the first multiple-color array data to be uniform in the second array direction and further resizing the first multiple-color array data in the second array direction, wherein the first distribution equalization and resizing process includes:

a first filtering processing step for dividing the source image RAW data into a first luminance data that is a continuous data and a first color carrier data that is a continuous data alternately code-inverted and having different colors alternately arranged per pixel by performing a pixel-based filtering process to the source image RAW data along the first array direction;

a first luminance distribution equalization processing step for generating a second luminance data by correcting a luminance distribution of the first luminance data to be uniform in the first array direction;

a first luminance resizing processing step for generating a 2-1th luminance data by performing a resizing process to the second luminance data in the first array direction;

a first color inversion demodulating step for generating a first color difference data that is a continuous data having the same colors serially arranged by demodulating the first color carrier data;

a first color difference resizing processing step for generating a second color difference data by performing a resizing process to the first color difference data in the first array direction;

a first color carrier modulating step for modulating the second color difference data into a 1-1th color carrier data alternately code-inverted so that the array of colors resumes its original periodicity; and a first color array reproduction processing step for generating the first multiple-color array data by re-synthesizing the 2-1th luminance data with the 1-1th color carrier data, and the second distribution equalization and resizing process includes:

a second filtering processing step for dividing the first multiple-color array data into a third luminance data that is a continuous data and a second color carrier data that is a continuous data alternately code-inverted and having different colors alternately arranged per pixel by performing a pixel-based filtering process to the first multiple-color array data along the second array direction;

a second luminance distribution equalization processing step for generating a fourth luminance data by correcting a luminance distribution of the third luminance data to be uniform in the second array direction;

a second luminance resizing processor for generating a fifth luminance data by performing a resizing process to the fourth luminance data in the second array direction;

a second color inversion demodulating step for generating a third color difference data that is a continuous data having the same colors serially arranged by demodulating the second color carrier data;

a second color difference resizing processing step for generating a fourth color difference data by performing a resizing process to the third color difference data in the second array direction;

a second color carrier modulating step for modulating the fourth color difference data into a third color carrier data alternately code-inverted so that the array of colors resumes its original periodicity; and a second color array reproduction processing step for generating the second multiple-color array data by re-synthesizing the third color carrier data with the fifth luminance data.

The invention providing the modes of the image processing method described so far is applicable to an image processing program and a recording medium.

(33) A program for image processes according to the invention is a program configured in a manner corresponding to the modes of the image processing method recited in (17) to (32). The program is configured to run a plurality of steps on a computer in a manner corresponding to the respective processes and processing steps.

(34) A recording medium for image processes according to the invention is a computer-readable recording medium on which the program recited in (33) is recorded.

Effect of the Invention

The invention performs the following processes to RAW data of a source image outputted by mixing an even number of pixels, for example, four pixels and thereby having pixels non-uniformly distributed two-dimensionally in a first array direction and a second array direction orthogonal to the first array direction;

dividing the source image RAW data into the continuous luminance data and color carrier data, performing the distribution equalization process to the continuous luminance data independently from the continuous color carrier data, and re-synthesizing the continuous luminance data after the distribution equalization process is performed thereto with the continuous color carrier data.

As a result, the occurrence of false colors is effectively prevented and a fine-resolution image naturally perceived is ensured in two-dimensional directions.

The source image RAW data outputted by mixing an even number of pixels, for example, four pixels and thereby having the pixel data distribution non-uniform in two-dimensional directions can be resized in a manner that a fine-resolution image naturally perceived is ensured and the occurrence of false colors is effectively prevented in two-dimensional directions. As a result, the invention enables to obtain high-quality images for a small RAW data recording mode that records data smaller than the source image RAW data, display of preview, or shooting moving images for HD movies.

BRIEF DESCRIPTION OF THE DRAWINGS

FIG. 5 is a schematic illustration of distribution equalization processing steps performed to RAW data obtained by mixing four pixels according to an example 1 of the invention.

FIG. 17 is a block diagram illustrating a vertical distribution equalization process that uses the line memory according to the example 1.

FIG. 18 is a structural block diagram (2) illustrating a vertical distribution equalization processor according to the example 1 wherein the luminance value of pixel data in an even-numbered line is subjected to a pseudo interpolation process in a manner shifted to lower side on coordinates and the luminance value of pixel data in an odd-numbered line is subjected to a pseudo interpolation process in a manner shifted to upper side on the coordinates.

FIG. 28A is a conceptual view of a Bayer array of RGB primary colors.

FIG. 28B illustrates a honeycomb array of RGB primary colors.

MODES FOR CARRYING OUT THE INVENTION

Figure 1:
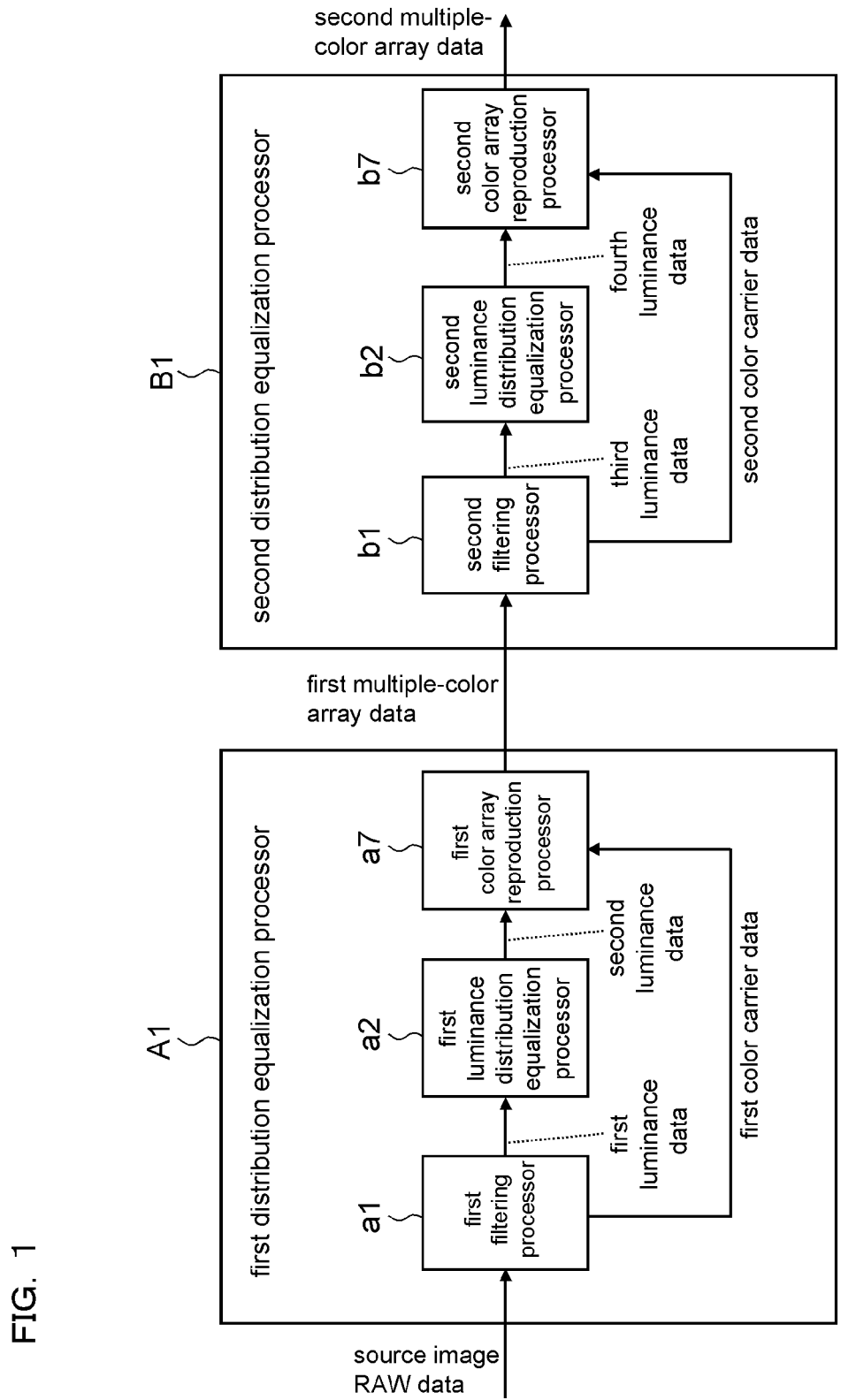
FIG. 1 is a block diagram illustrating a first basic structure of an image processing device according to the invention.

The image processing device according to the invention described in (1) (see FIG. 1) can be more technically advantageous in the following modes.

(2) In the image processing device described in 1) in the MEANS FOR SOLVING PROBLEMS, a buffer for transmitting the first multiple-color array data to the second distribution equalization processor B1 is further provided, wherein the buffer includes a frame memory having a memory space two-dimensionally extending. The first multiple-color array data is read from the frame memory in a direction orthogonal to a direction where the first multiple-color array data is written therein and transmitted to the second distribution equalization and resizing processor. According to this mode, the second distribution equalization processor B1 configured in a manner identical to the first distribution equalization processor A1 can be used. This simplifies the device structure.

(3) In the image processing device described in 1), a buffer for transmitting the first multiple-color array data to the second distribution equalization processor B1 is further provided, wherein the buffer includes a line memory having a plurality of lines. While the first multiple-color array data is being written in each of the plurality of lines of the line memory, the first multiple-color array data is read from the plural lines of the line memory and transmitted to the second distribution equalization processor. According to this mode, the second distribution equalization processor B1 configured in a manner different to the first distribution equalization processor A1 is used. The multiple-color array data for the plural lines is written in the line memory having a plurality of lines and read from the plural lines at the same time. This is expected to improve a processing speed.

(5) In the image processing device described in (4) in the MEANS FOR SOLVING PROBLEMS (see FIG. 2) wherein the resizing process is performed, a buffer for transmitting the multiple-color array data resized and having pixels uniformly distributed in the first array direction and outputted from the first distribution equalization and resizing processor A2 to the second distribution equalization and resizing processor B2 is further provided, wherein the buffer includes a frame memory having a memory space two-dimensionally extending. The first multiple-color array data is read from the frame memory in a direction orthogonal to a direction where the first multiple-color array data is written therein and transmitted to the second distribution equalization and resizing processor. According to this mode, the second distribution equalization and resizing processor B2 configured in a manner identical to the first distribution equalization and resizing processor A2 can be used. This simplifies the device structure.

(6) In the image processing device described in (4) wherein the resizing process is performed, a buffer for transmitting the multiple-color array data to the second distribution equalization and resizing processor B2 is further provided, and the buffer includes a frame memory having a plurality of lines. While the first multiple-color array data is being written in each of the plurality of lines of the line memory, the first multiple-color array data is read from the plural lines of the line memory and transmitted to the second distribution equalization and resizing processor B2. According to this mode, the second distribution equalization and resizing processor B2 configured in a manner different to the first distribution equalization and resizing processor A2 is used. The multiple-color array data for the plural lines is written in the line memory having a plurality of lines and read from the plural lines at the same time. This is expected to improve a processing speed.

(7) In the image processing devices described in (4) to (6) wherein the resizing process is performed, the first luminance resizing processor a3, the second color difference resizing processor a5, the second luminance resizing processor b3, and the second color difference resizing processor b5 perform a reducing process as the resizing process. The reducing process enables to process high-quality images in a small RAW data recording mode, display of preview, or shooting moving images such as HD movies.

(8) In the image processing devices described in (4) to (6) wherein the resizing process is performed, the first luminance resizing processor a3, the first color difference resizing processor a5, the second luminance resizing processor b3, and the second color difference resizing processor b5 perform an enlarging process as the resizing process.

Figure 3A:
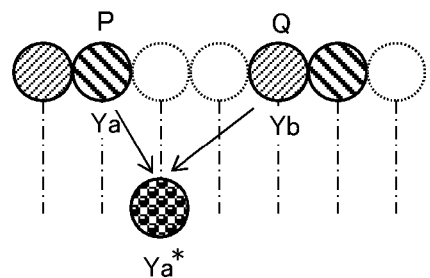
FIG. 3A is an illustration (1-1) of a distribution equalization process performed to luminance data by a first or second luminance distribution equalization processor of the image processing device according to the invention.

(9) A mode of the distribution equalization process performed to the luminance data by the first, second luminance distribution equalization processor a2, b2 in the devices of (4) to (8) is described referring to FIG. 3A. In the drawing, the luminance distribution equalization process is performed along a line horizontally extending by the first luminance distribution equalization processor a2. When the second luminance distribution equalization processor b2 performs the process, the illustration of FIG. 3A is rotated through 90 degrees.

Of two pixels adjacent to a target pixel to be processed P in the first or second array direction, one of the two pixels of a different color more distant from the target pixel to be processed P is used in the distribution equalization process as a support pixel Q. An interpolation process is performed between a luminance data Ya of the target pixel to be processed P and a luminance data Yb of the support pixel Q. The luminance data obtained by the interpolation process is called an interpolated luminance data Ya* of the target pixel to be processed P. The luminance data Ya of the target pixel to be processed P has a pixel data distribution non-uniform in two-dimensional directions because the RAW data is outputted by mixing an even number of pixels, for example, four pixels. By performing the interpolation process, the luminance data Ya of the target pixel to be processed P is approximated to luminance data of the source image having a uniform distribution before mixing plural pixels. As a result, the interpolated luminance data Ya* is obtained. A specific example of the interpolation process is described in (10).

Figure 3B:
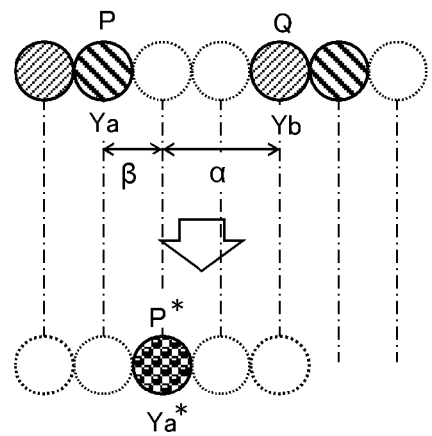
FIG. 3B is an illustration (1-2) of the distribution equalization process performed to luminance data by the first or second luminance distribution equalization processor of the image processing device according to the invention.

(10) In the image processing device described in (9) wherein the interpolation process is performed, the distribution equalization process performed to the luminance data by the first, second luminance distribution equalization processor a2, b2 may be a process described below referring to FIG. 3B.

Hypothetically, the target pixel to be processed P is allocated in the middle of the pixels adjacent thereto, and the pixel thus allocated is called a virtually allocated pixel P*. The luminance data of the target pixel to be processed P is Ya, and the luminance data of the support pixel Q is Yb. The support pixel Q is one of two pixels adjacent to the target pixel to be processed P in the horizontal or vertical direction which has a different color and which is more distant from the target pixel to be processed P than the other. A distance between the support pixel Q and the virtually allocated pixel P* is defined as α, and a distance between the target pixel to be processed P and the virtually allocated pixel P* is β. To obtain the interpolated luminance data Ya*, the luminance data Ya of the target pixel to be processed P and the luminance data Yb of the support pixel Q are divided proportionately by the distances α and β as expressed in the following division point formula.

$$Ya^* = (\alpha \cdot Ya + \beta \cdot Yb)/(\alpha + \beta)$$

Figure 3C:
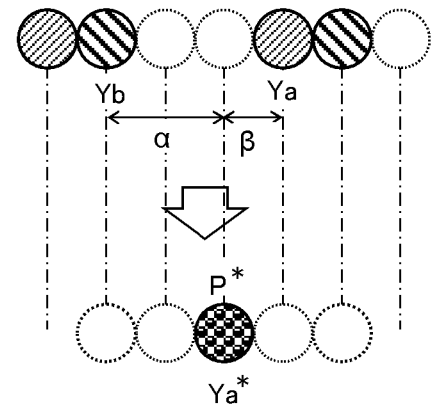
FIG. 3C is an illustration (1-3) of the distribution equalization process performed to luminance data by the first or second luminance distribution equalization processor of the image processing device according to the invention.

Of the distances α and β, α is a distance between very distantly spaced pixels, and β is a distance between very closely spaced pixels; therefore, α>β. The formula is applicable regardless of whether the virtually allocated pixel P* is set on the right side or left side of the target pixel to be processed P (FIG. 3C).

Figure 36:
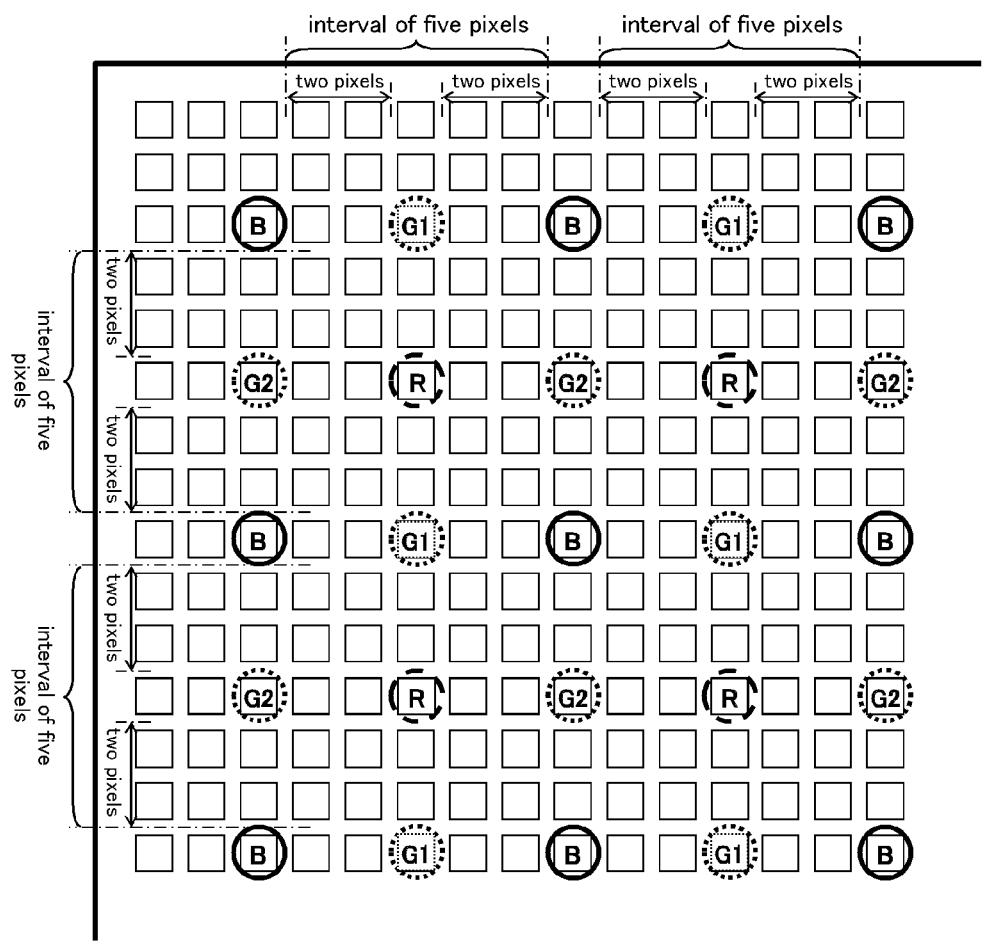
FIG. 36 is a drawing where the mixing results obtained by mixing the four different color elements in nine-pixel mixing are combined.
Figure 37:
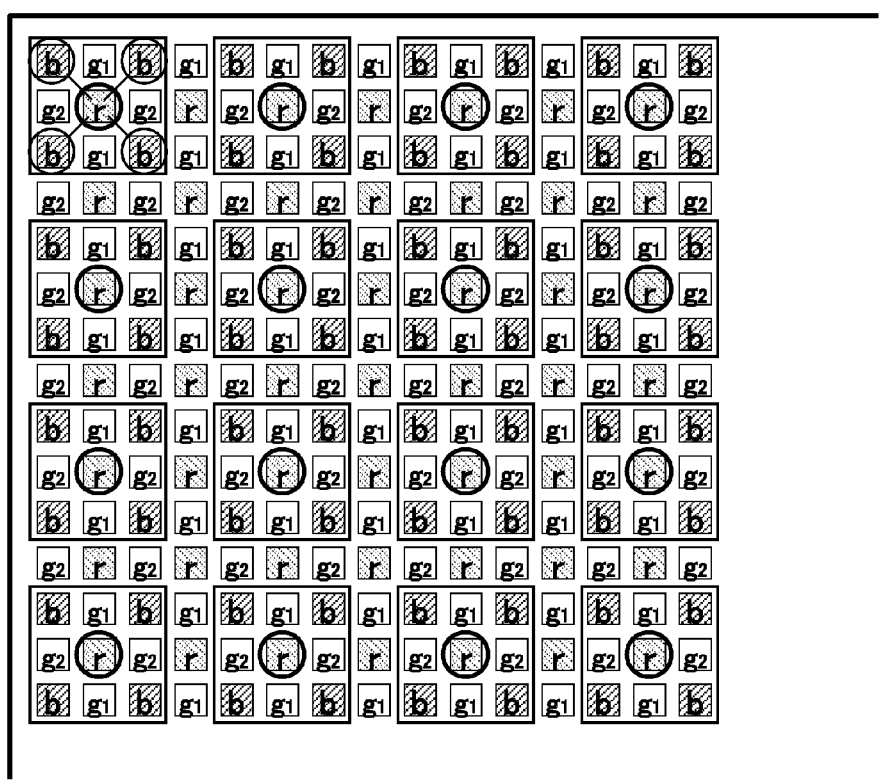
FIG. 37 is an illustration of a pixel mixing method when color elements to be mixed in four-pixel mixing are blue.
Figure 38:
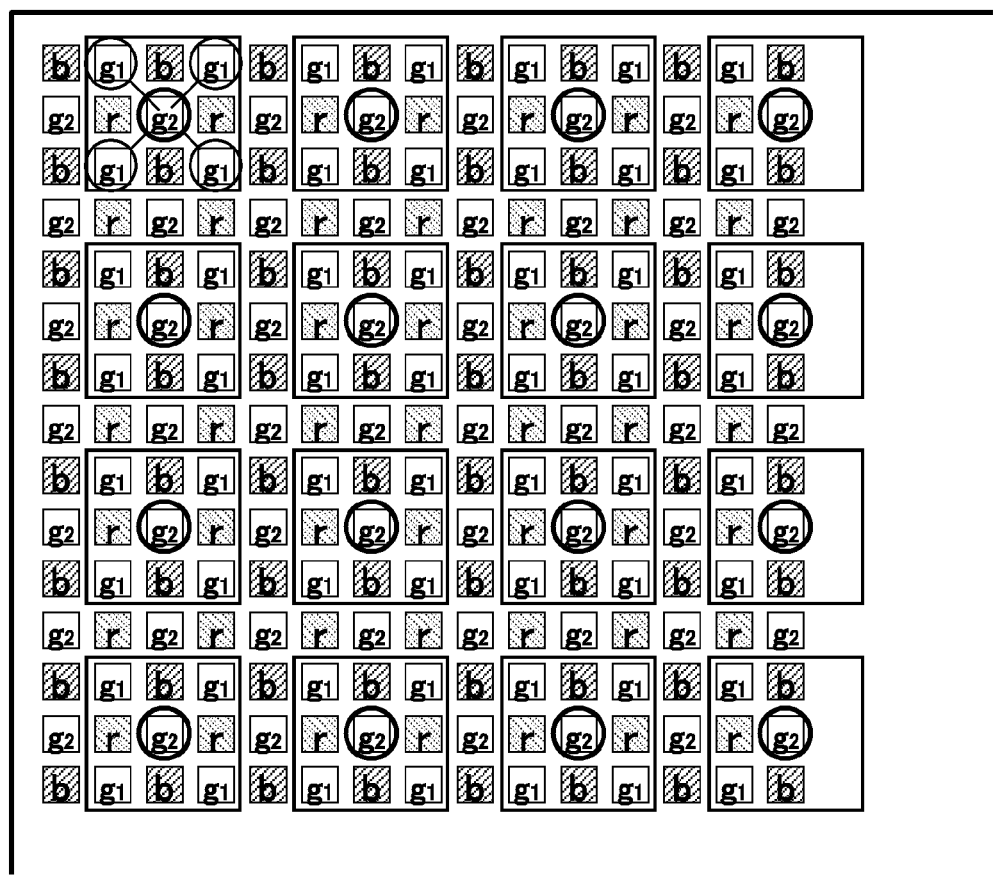
FIG. 38 is an illustration of a pixel mixing method when color elements to be mixed in four-pixel mixing are green 1.
Figure 39:
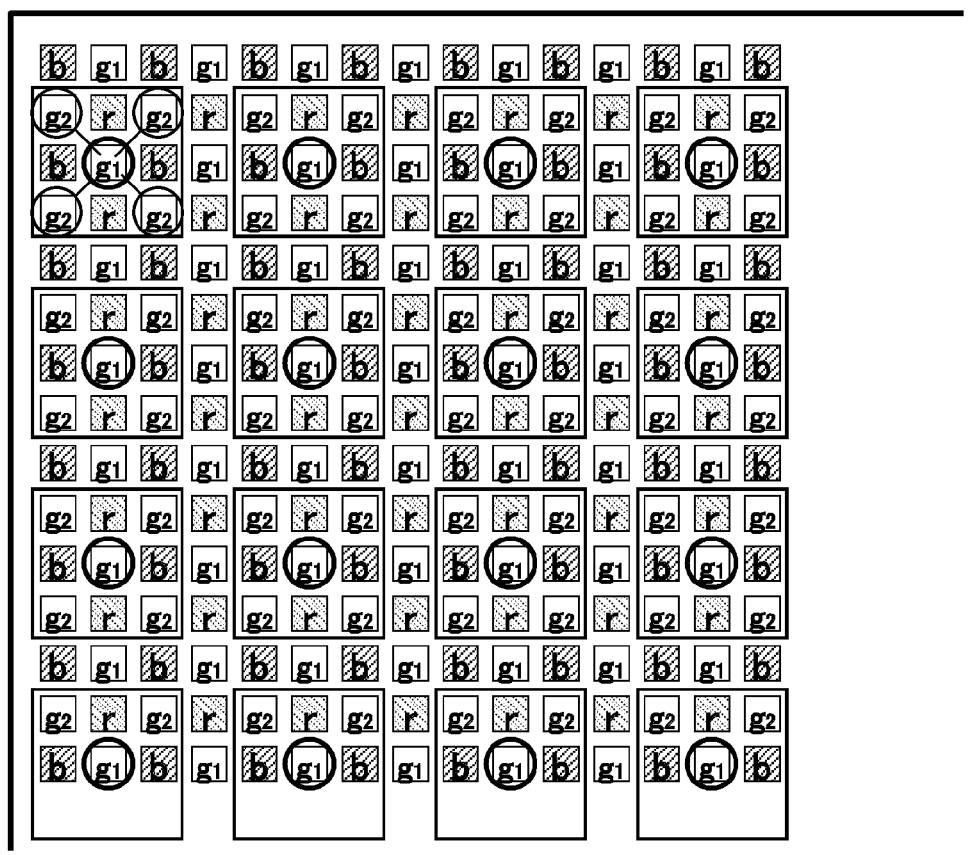
FIG. 39 is an illustration of a pixel mixing method when color elements to be mixed in four-pixel mixing are green 2.
Figure 40:
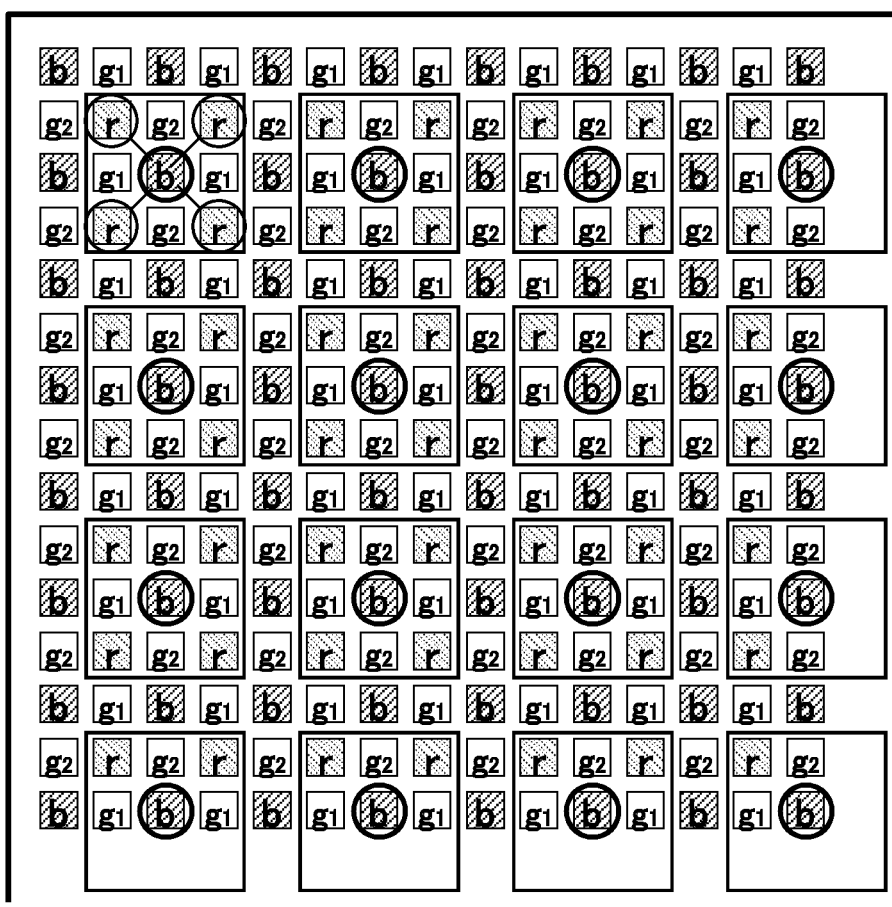
FIG. 40 is an illustration of a pixel mixing method when color elements to be mixed in four-pixel mixing are red.
Figure 41:
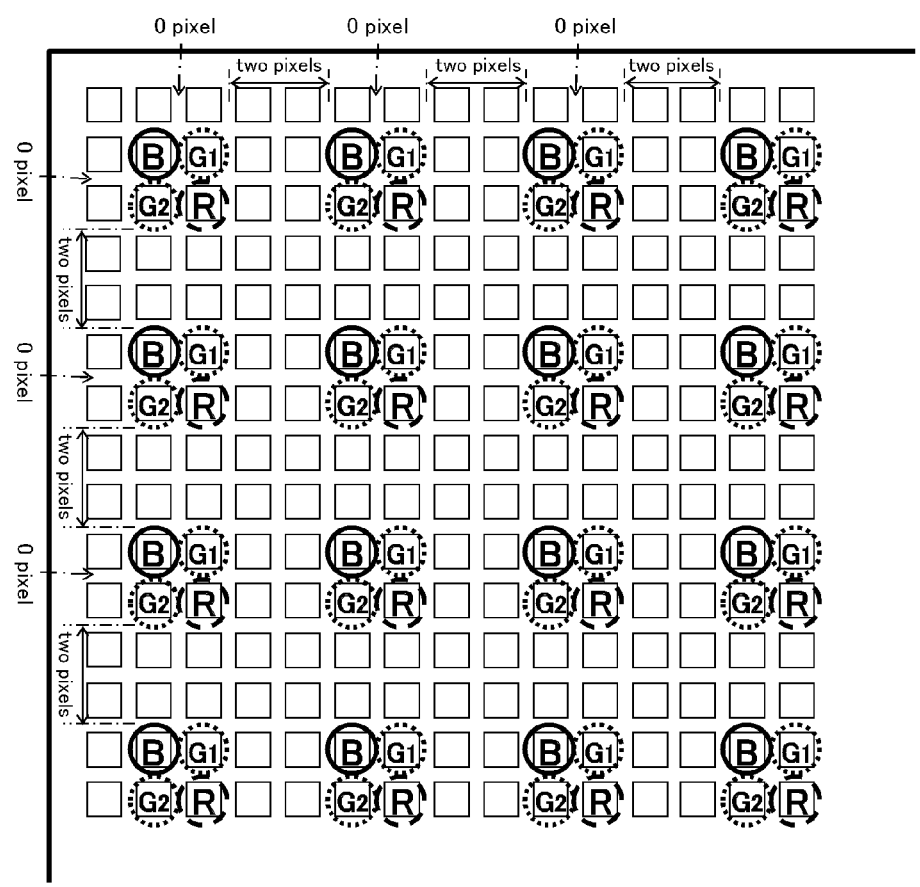
FIG. 41 is a drawing where the mixing results obtained by mixing the four different color elements in four-pixel mixing are combined.

When four pixels are mixed, for instance, a distance between two pixels adjacent to the target pixel to be processed P is four pixels. The "distance" is a distance between center points of the pixels, which is different to the "interval" described referring to FIGS. 36 and 41. The virtually allocated pixel P* is shifted toward the support pixel Q by one pixel. The virtually allocated pixel P* is distant by two pixels from the adjacent two pixels before the shift. Therefore, the virtually allocated pixel P*, when shifted, is located in the middle of the two adjacent pixels. This means that the distance α between the support pixel Q and the virtually allocated pixel P* is two pixels, and the distance β between the target pixel to be processed P and the virtually allocated pixel P* is one pixel (α=2, β=1).

Therefore, the interpolated data Ya* is, where the luminance data of the target pixel to be processed P is Ya and the luminance data of the support pixel Q is Yb, $$Ya^* = (2 \cdot Ya + 1 \cdot Yb)/3$$

A point to be noted is that the target pixel to be processed P carrying the luminance data Ya and the support pixel Q carrying the luminance data Yb are the pixels of different colors.

For example, of two different pixels B and G on a BG-repeated line of the RGB Bayer array, G on the right side of B is very close to B, B on the right side of G is very distant from G, and G of the target pixel to be processed P is virtually allocated in the middle of adjacent two pixels B and B. In that case, the distribution equalization process to be performed is expressed by Ya*=(2·Ya+1·Yb)/3, where the luminance data Ya of the color G of the target pixel to be processed and the luminance data Yb of the color B of the support pixel very distant on the right side are used. The color of the target pixel to be processed P carrying the luminance data Ya is G, which is different to the color B of the support pixel Q carrying the luminance data Yb. In a color array reproduction process subsequently performed, G is the color of the target pixel to be processed P carrying the interpolated luminance data Ya*.

In the given example described so far, the target pixel to be processed P is shifted to right to obtain the virtually allocated pixel P*. In an example described below, the target pixel to be processed P is shifted to left to obtain the virtually allocated pixel P*, which is described referring to FIG. 3C. Similarly, of two different pixels B and G on a BG-repeated line of the RGB Bayer array, G on the right side of B is very close to B, B on the right side of G is very distant from G, and B of the target pixel to be processed P is virtually allocated in the middle of G and G of two adjacent pixels. In that case, the distribution equalization process to be performed is expressed by Ya*=(2·Ya+1·Yb)/3, where the luminance data Ya of the color B of the target pixel to be processed and the luminance data Yb of the color G of the support pixel very distant on the left side are used. The color of the target pixel to be processed P carrying the luminance data Ya is B, which is different to the color G of the support pixel Q carrying the luminance data Yb. In the color array reproduction process subsequently performed, B is the color of the target pixel to be processed P carrying the interpolated luminance data Ya*

(11) In the image processing device described in (9) wherein the interpolation process is performed, the distribution equalization process performed by the first, second luminance distribution equalization processor a2, b2 may be a process described below referring to FIGS. 4A and 4B. Supposing that a uniform pixel data distribution is obtained by moving the target pixel to be processed P and the support pixel Q away from each other, of two pixels very distantly spaced from each other, one of the pixels on the left side is shifted to right and the other pixel on the right side is shifted to right so that the pixel data distribution becomes uniform. The ratio between an amount of shift to the right side and an amount of shift to the left side is discussed below.

Figure 4A:
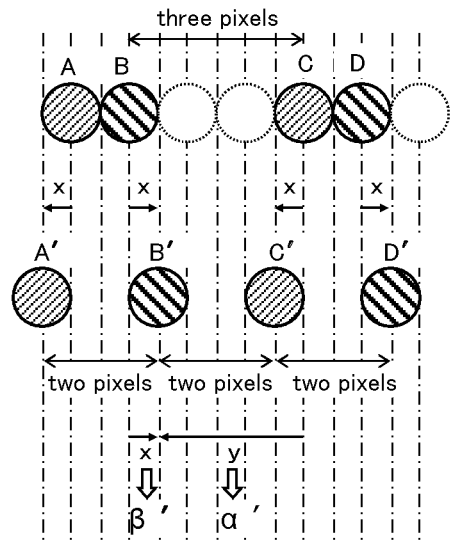
FIG. 4A is an illustration (2-1) of the distribution equalization process performed to luminance data by the first or second luminance distribution equalization processor of the image processing device according to the invention.

When four pixels are mixed as illustrated in FIG. 4A, two adjacent pixels are distant from each other by two pixels after the distribution equalization process is performed. Taking pixels A, B, C, and D for instance, of two adjacent pixels B and C very distantly spaced from each other, the pixel B on the left side is shifted to right by x, and the pixel C on the right side is shifted to left by x. The pixels A and D are shifted in the same manner; the pixel A to left by x, and the pixel D to right by x. As a result of these shifts, four pixels A', B', C', and D' are uniformly distributed.

Next, the amount of shift x is calculated. A relationship among a distance (three pixels) between the two adjacent pixels B and C very distantly spaced from each other before the distribution equalization process is performed, a distance (two pixels) between the two adjacent pixels B and C after the distribution equalization process is performed, and the amount of shift x is expressed by 2 pixels+2·x=3 pixels. Therefore, x=0.5 pixel.

Focusing on the pixel B, an amount of shift when B is shifted to B' is calculated by proportionate division between B and C. A distance between B and B' is x, and a distance between C and B' is y. x+y=3 pixels, x=0.5 pixel, and y=2.5 pixels. The ratio of x to y is 1:5. The coefficients α' and β' used in the proportionate division are α'>β'. Therefore, α':β'=5:1.

Figure 4B:
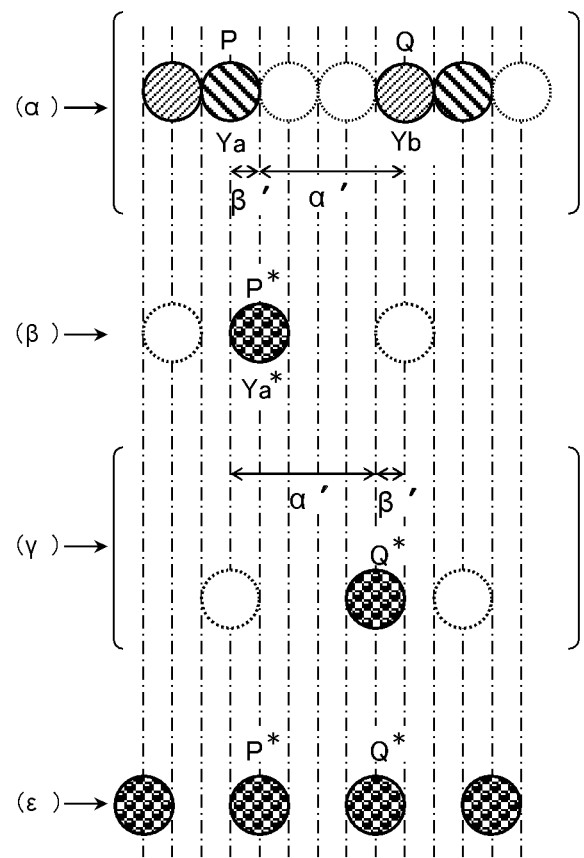
FIG. 4B is an illustration (2-2) of the distribution equalization process performed to luminance data by the first or second luminance distribution equalization processor of the image processing device according to the invention.

As illustrated with (α) and (β) in FIG. 4B, when the target pixel to be processed P is the virtually allocated pixel P*, the ratio of a distance α' between the support pixel Q and the virtually allocated pixel P* to a distance β' between the target pixel to be processed P and the virtually allocated pixel P* is different to that of α:β in (10). However, the equation of proportionate division is similarly, $$Ya^* = (\alpha' \cdot Ya + \beta' \cdot Yb)/(\alpha' + \beta')$$

In the four-pixel mixing, α':β' is 5:1, therefore, $$Ya^* = (5 \cdot Ya + 1 \cdot Yb)/6$$

Assuming that a target pixel to be processed Q is a virtually allocated pixel Q* as illustrated with (α), (γ), the ratio of a distance α' between the support pixel Q and the virtually allocated pixel Q* to a distance β' between the target pixel to be processed Q and the virtually allocated pixel Q* is similarly α':β'=5:1.

The illustration of (ε) is a result where (β), (γ), and a result of similarly processing a pixel adjacent to the pixel P on left and a pixel adjacent to the pixel Q on right. This is illustrated in a lower part of FIG. 4A.

(12) According to the devices described in (9) to (11) wherein the interpolation process is performed, when the interpolation process is performed by the luminance distribution equalization processor to the luminance data of the target pixel to be processed P, the occurrence of false colors is effectively prevented, while a fine-resolution image naturally perceived is still ensured. The interpolation process, however, unfavorably reduces high frequency components in the frequency characteristics of the luminance data of the pixels P and Q that are used in the interpolation process. On the other hand, there is no reduction in high frequency components in the luminance data of any pixels through-outputted without being subjected to the interpolation process. Such an image-quality asymmetry generated depending on whether the interpolation process is performed is a bottleneck in the pursuit of preventing the degradation of an image quality. Therefore, the first, second distribution equalization processor a2, b2 preferably emphasizes the high frequency components of the luminance data of the pixels P and Q used in the interpolation process prior to the interpolation process and then perform the interpolation process. When the high frequency components of the luminance data of the pixels P and Q used in the interpolation process are thus gain-increased to be emphasized, any possible reduction in the high frequency components by the interpolation process afterwards is balanced out on the whole. This succeeds in improving an image quality even after the high frequency components are reduced by the interpolation process.

(13) In the image processing devices described in (9) to (11) wherein the interpolation process is performed, the first and second luminance distribution equalization processors a2 and b2 may perform a high frequency emphasis process to the luminance data of the target pixel to be processed P after the interpolation process is performed to the luminance data of the target pixel to be processed P. Any reduction in the high frequency components of the interpolated luminance data of the target pixel to be processed P afterwards is balanced out on the whole when the reduced high frequency components are gain-increased to be emphasized afterwards. As a result, an image quality is still favorably improved regardless of the interpolation process.

(14) The image data to be processed by the image processing device is RAW data of a source image having a pixel data distribution non-uniform in the first and second array directions. In the image processing devices described in (1) to (13), the source image RAW data typically has a Bayer RGB periodicity, wherein BG-repeated line data and GR-repeated line data along the horizontal direction are alternately outputted in the vertical direction. The source image RAW data is not necessarily limited to such data but may include data of other forms, for example, RAW data of a honeycomb array, wherein RB-repeated line data and line data containing continuous G signals are alternately outputted in the vertical direction.

(15) In the image processing devices described in (1) to (13), the source image RAW data may be a RAW data obtained by using a single-plate color image sensor containing multiple-color pixels arranged by complementary color filters based on a periodicity. The RGB Bayer array contains primary colors. Further, a complementary color filter array containing yellow (Y), magenta (M), cyan (C), and green (G) may be used.

(16) In the image processing devices described in (1) to (13), the source image RAW data may be a RAW data obtained by a single-plate color image sensor containing multiple-color pixels arranged by complementary color filters based on a pixel-based periodicity on a line and one-color pixels arranged irrelevant to such a periodicity on another line. For example, arbitrary combinations of primary colors and complementary colors, or white (W) may be used.

(18) In the image processing method described in (17) in the MEANS FOR SOLVING PROBLEMS, a frame memory having a memory space two-dimensionally extending may be used as a buffer for transferring the first multiple-color array data to the second distribution equalization process, wherein the first multiple-color array data is read from the frame memory in a direction orthogonal to a direction where the first multiple-color array data is written therein and then transferred to the second distribution equalization and resizing process.

(19) In the image processing method described in (17), a line memory having a plurality of lines may be used as a buffer for transferring the first multiple-color array data to the second distribution equalization process. While the first multiple-color array data is being written in each of the plurality of lines of the line memory, the first multiple-color array data is read from the plural lines of the line memory and transmitted to the second distribution equalization process.

(21) In the image processing method described in (20) in the MEANS FOR SOLVING PROBLEMS wherein the resizing process is performed, a frame memory having a memory space two-dimensionally extending may be used as a buffer for transferring the first multiple-color array data resized and having pixels uniformly distributed in the first array direction and outputted from the first distribution equalization and resizing process to the second distribution equalization and resizing process, wherein the first multiple-color array data is read from the frame memory in a direction orthogonal to a direction where the first multiple-color array data is written therein and then transferred to the second distribution equalization and resizing process.

(22) In the image processing method described in (20), a frame memory having a plurality of lines may be used as a buffer for transferring the first multiple-color array data to the second distribution equalization and resizing process. While the first multiple-color array data is being written in each of the plurality of lines of the line memory, the first multiple-color array data is read from the plural lines of the line memory and transferred to the second distribution equalization and resizing process.

(23) In the image processing methods described in (20) to (22) wherein the resizing process is performed, the first luminance resizing processing step, the first color difference resizing processing step, the second luminance resizing processing step, and the second color difference resizing processing step perform a reducing process as the resizing process.

(24) In the image processing methods described in (20) to (22) wherein the resizing process is performed, the first luminance resizing processing step, the first color difference resizing processing step, the second luminance resizing processing step, and the second color difference resizing processing step perform an enlarging process as the resizing process.

(25) In the image processing methods described in (17) to (24), the distribution equalization process performed to the luminance data in the first, second luminance distribution equalization processing step may be a process in which the luminance data of the target pixel to be processed P is approximated to the luminance data of an arbitrary pixel of the source image before mixing plural pixels by performing the interpolation process. Of two pixels adjacent to the target pixel to be processed P, one of the two pixels of a different color more distant from the target pixel to be processed P is set as a support pixel Q, and an interpolated luminance data obtained by performing the interpolation process to the luminance data of the target pixel to be processed P and the luminance data of the support pixel Q is used as the luminance data of the target pixel to be processed P.

(26) In the image processing method described in (25) wherein the interpolation process is performed, the distribution equalization process performed to the luminance data in the first, second luminance distribution equalization processing step may be a process in which the luminance data of the target pixel to be processed P and the luminance data of the support pixel Q are proportionately divided by assigning a distance between the support pixel Q and a virtually allocated pixel P* hypothetically located in the middle of the adjacent pixels and a distance between the target pixel to be processed P and the virtually allocated pixel P* to the division point formula. As a result of the process, the interpolated luminance data is obtained from the data division result.

(27) In the image processing method described in (25) wherein the interpolation process is performed, the distribution equalization process performed to the luminance data in the first, second luminance distribution equalization processing step may be a process in which the target pixel to be processed P is set as a virtually allocated pixel P*based on the assumption that the distribution becomes uniform when the target pixel to be processed P and the support pixel Q are moved away from each other, and the luminance data of the target pixel to be processed P and the luminance data of the support pixel Q are proportionately divided by assigning a distance between the support pixel Q and the virtually allocated pixel P* and a distance between the target pixel to be processed P and the virtually allocated pixel P* to the division point formula, so that the interpolated luminance data is obtained from the data division result.

(28) In the image processing methods described in (25) to (27) wherein the interpolation process is performed, the first and second luminance distribution equalization processing steps may perform a high frequency emphasis process to the luminance data of the target pixel to be processed P before the interpolation process is performed to the luminance data of the target pixel to be processed P.

(29) In the image processing methods described in (25) to (27) wherein the interpolation process is performed, the first and second luminance distribution equalization processing steps may perform a high frequency emphasis process to the luminance data of the target pixel to be processed P after the interpolation process is performed to the luminance data of the target pixel to be processed P.

(30) In the image processing methods described in (17) to (29), the source image RAW data is a RAW data having a Bayer RGB periodicity, wherein in the RAW data, BG-repeated line data and GR-repeated line data along the horizontal direction are alternately outputted in the vertical direction.

(31) In the image processing methods described in (17) to (29), the source image RAW data may be a RAW data obtained by a single-plate color image sensor containing multiple-color pixels arranged by complementary color filters based on a periodicity.

(32) In the image processing methods described in (17) to (29), the source image RAW data may be a RAW data obtained by a single-plate color image sensor containing multiple-color pixels arranged by complementary color filters based on a pixel-based periodicity on a line and one-color pixels arranged irrelevant to such a periodicity on another line.

EXAMPLES

Hereinafter, examples of the image processing device and the image processing method according to the invention are described referring to the accompanied drawings.

Preliminary Description

Figure 27:
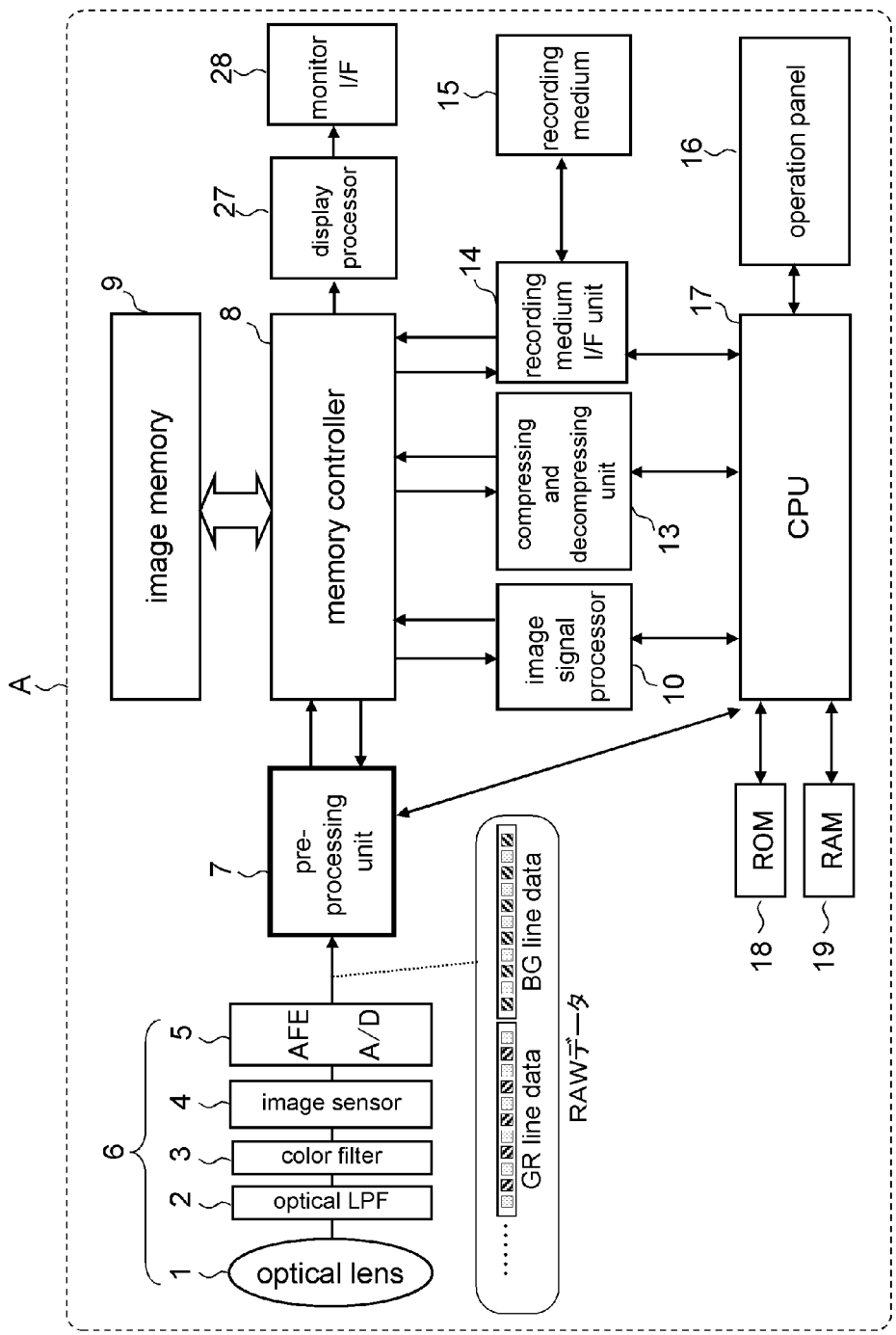
FIG. 27 is a block diagram illustrating a single-plate digital camera as an image pickup apparatus equipped with the image processing device according to the invention.
Figure 29:
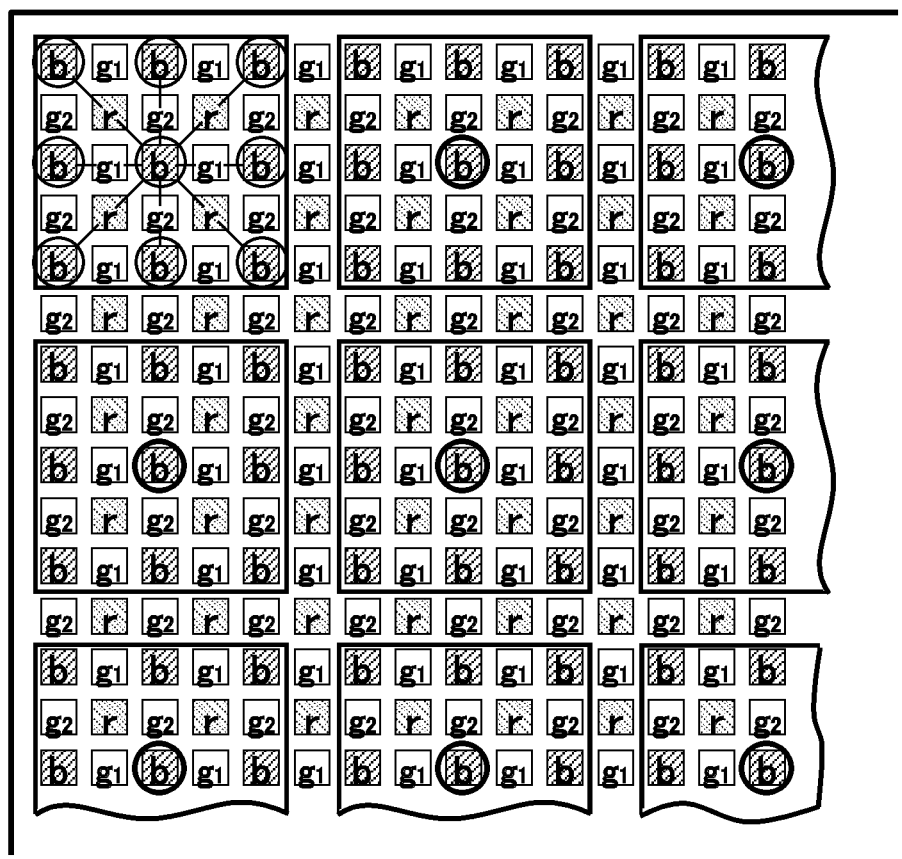
FIG. 29 is an illustration of a pixel mixing method when color elements to be mixed in nine-pixel mixing are blue.
Figure 30:
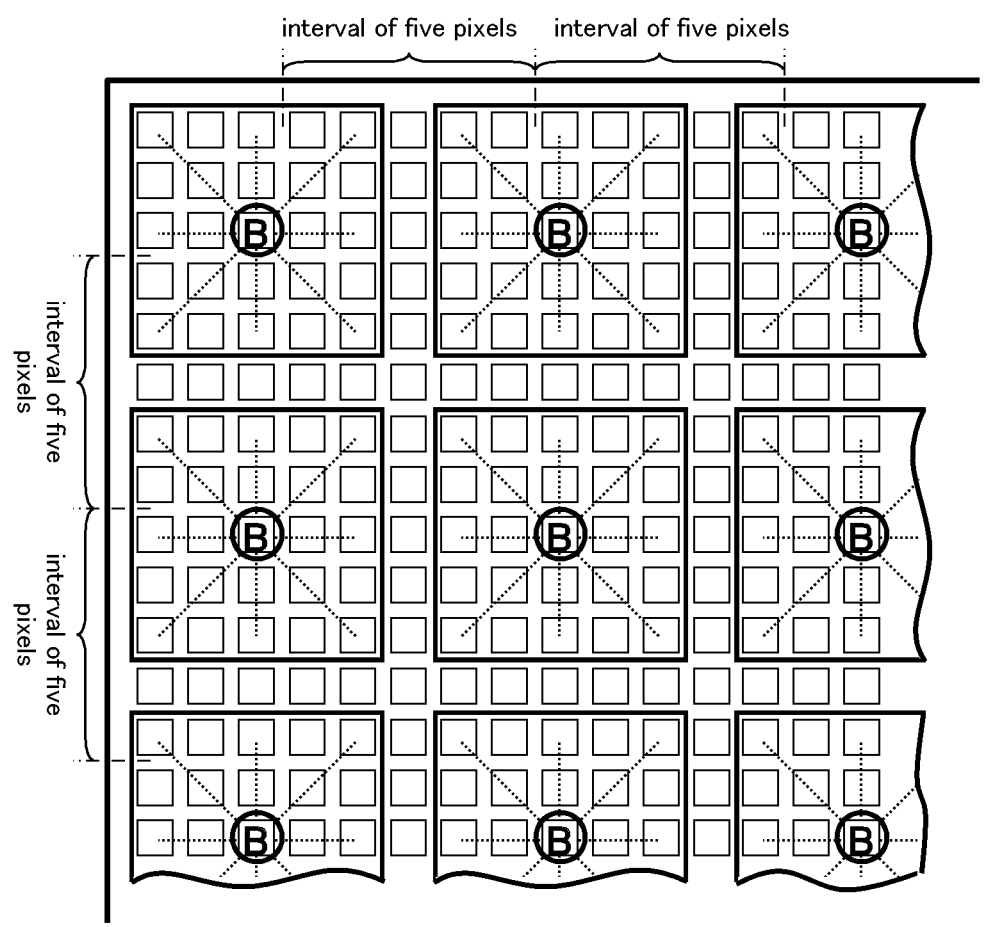
FIG. 30 is a drawing of a pixel mixing result when color elements to be mixed in nine-pixel mixing are blue.
Figure 31:
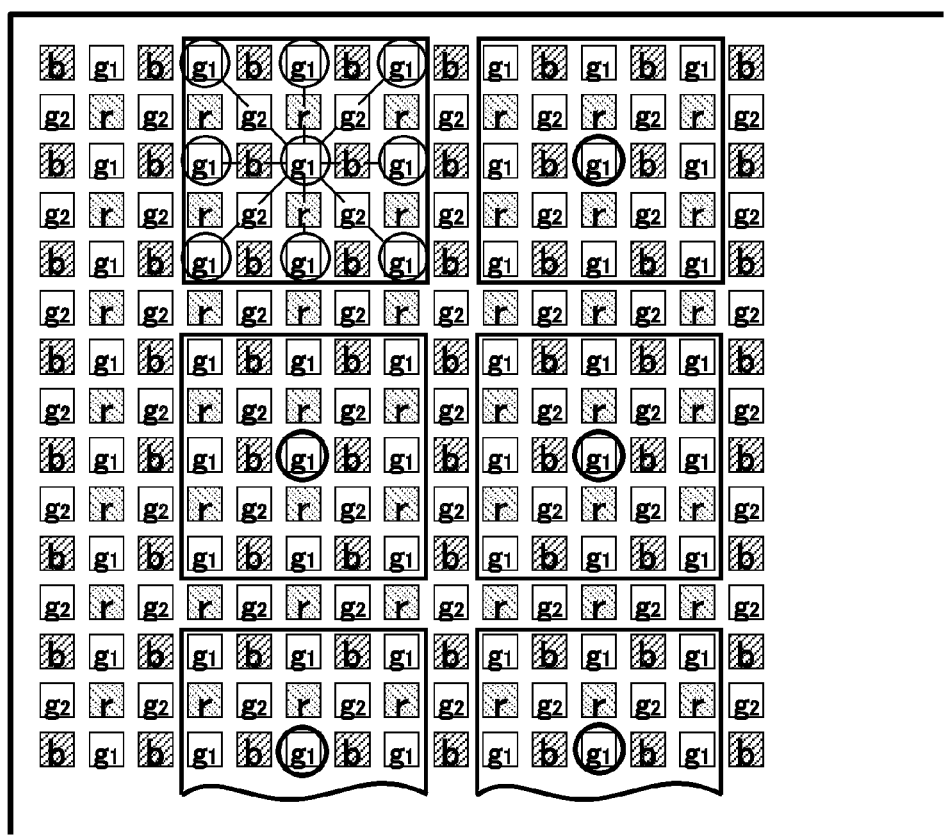
FIG. 31 is an illustration of a pixel mixing method when color elements to be mixed in nine-pixel mixing are green 1.
Figure 32:
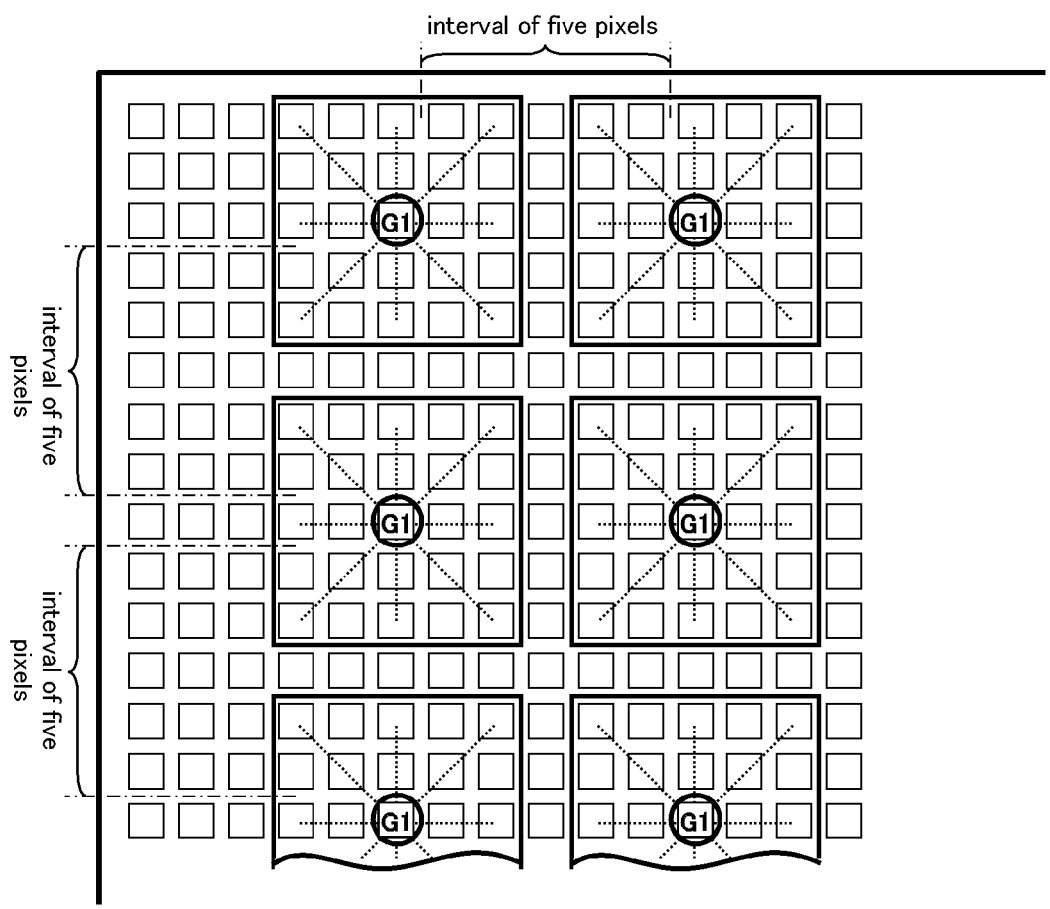
FIG. 32 is a drawing of a pixel mixing result when color elements to be mixed in nine-pixel mixing are green 1.
Figure 33:
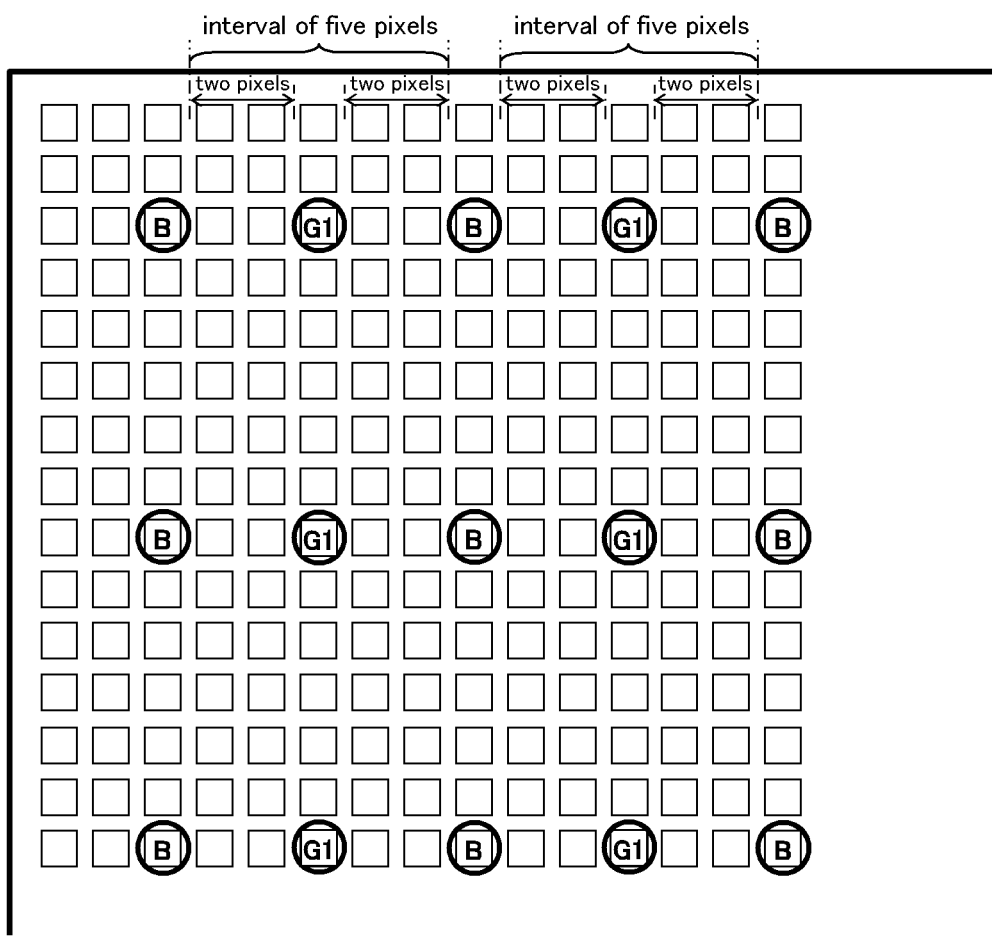
FIG. 33 is a drawing where the mixing results obtained by mixing the blue and green 1 color elements in nine-pixel mixing are combined.
Figure 34:
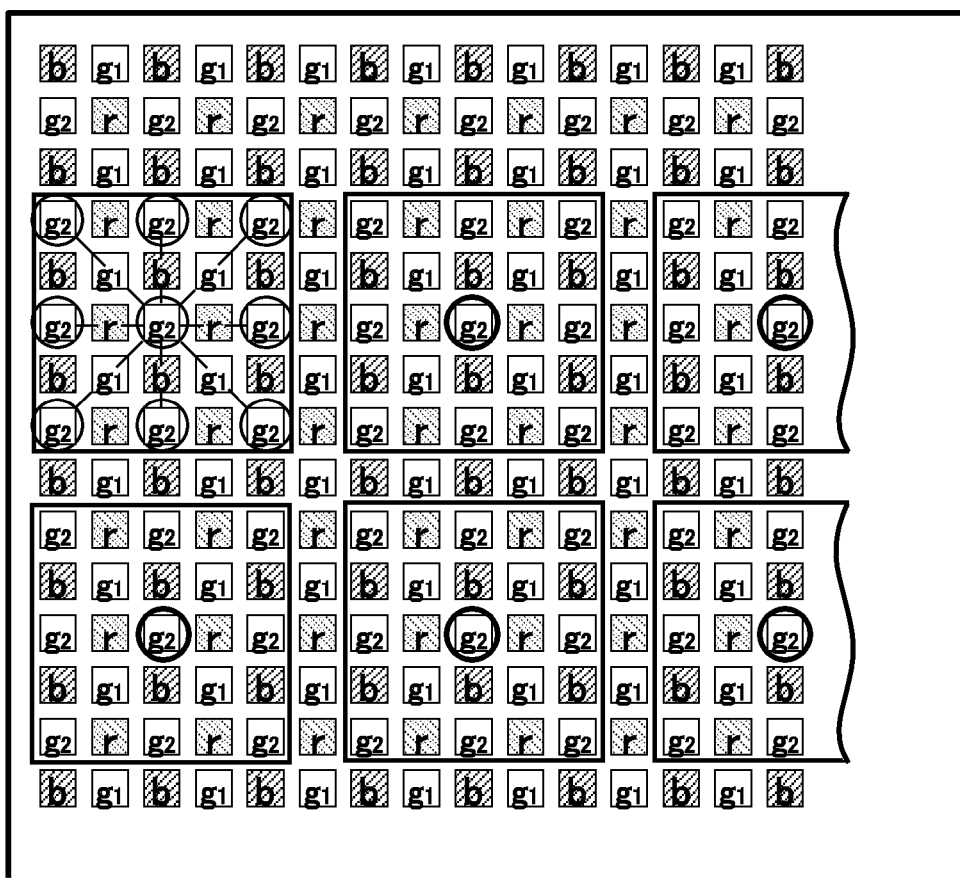
FIG. 34 is an illustration of a pixel mixing method when color elements to be mixed in nine-pixel mixing are green 2.
Figure 35:
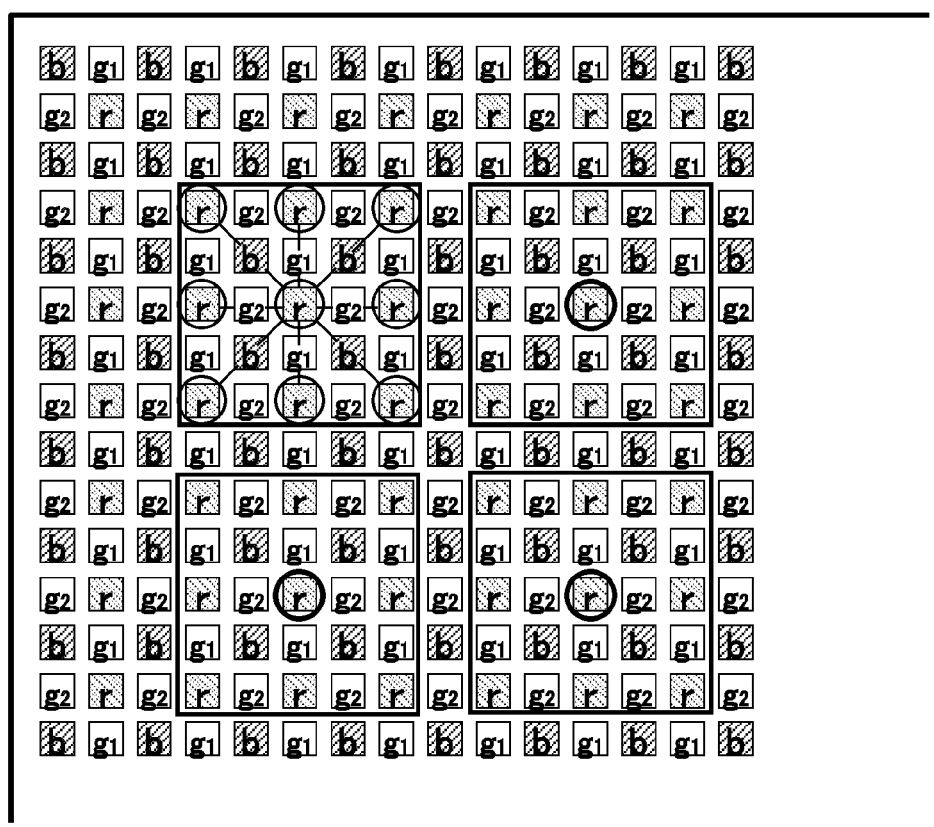
FIG. 35 is an illustration of a pixel mixing method when color elements to be mixed in nine-pixel mixing are red.

FIG. 27 illustrates an image pickup apparatus A, which is a single-plate digital camera to be loaded with the image processing device according to the invention. In an image pickup unit 6, light passing through an optical lens 1 further passes through an optical LPF (low pass filter) 2 and a color filter 3, entering an image sensor 4. On a light receiving surface of the CCD or CMOS image sensor 4, a large number of photo diodes are two-dimensionally arrayed. The optical LPF 2 removes high frequency components having frequencies higher than a sampling frequency that depends on pixel pitches of the image sensor 4. The color filter 3 has an array of colors having one of R, G, and B at positions thereof corresponding to the pixels of the image sensor 4. The color filter 3 performs color selection for light entering each of the photo diodes. FIG. 28A illustrates a Bayer array which is a color filter array of RGB primary colors. In the Bayer array, color elements are arranged in square matrix at constant pitches in horizontal and vertical directions. The color elements may be arranged in a honeycomb pattern. An image of a subject to be photographed is formed on the light receiving surface of the image sensor 4 and converted by the photo diodes into signal charge in an amount in ratio to an amount of incident light, and then read as a voltage signal (image signal) in accordance with the signal charge based on a drive pulse. The image sensor 4 has an electronic shuttering function that controls charge storage times of the respective photo diodes by the timing of a shutter gate pulse. The operation of the image sensor 4 (for example, exposure, reading signals) is controlled by a CPU 17. Referring to other reference numerals, 18 is a ROM (read-only memory) where various data needed for programs and controls are stored, and 19 is a RAM (random access memory) used as a workspace of the CPU 17. The image signal outputted from the image sensor 4 is transmitted to an AFE (analog front end) unit 5 to be subjected to processes such as analog gain control and CDS (correlated double sampling) and then AD-converted into digital image data.

In a JPEG recording mode, data of a source image outputted from the image sensor 4 is transmitted to an image processing unit 10 through a pre-processing unit 7. Using an image memory 9, the pre-processing unit 7 and the image processing unit 10 performs signal processes through a memory controller 8 based on commands outputted from the CPU 17, such as synchronization to obtain RGB information of the pixels, white balance adjustment, gamma correction, formation of luminance and color difference signals, contour emphasis, and variable magnification (enlargement or reduction) by electronic zooming. The signal-processed image data is transmitted to a compressing and decompressing unit 13 to be compressed in accordance with a JPEG compression format. The compressed image data is recorded on a recording medium 15 through a recording medium I/F (Interface) unit 14.

When outputting RAW data of a source image is outputted with a reduced number of effective output pixels in the image sensor 4, the RAW data is outputted by mixing pixel signals of the same color near a pixel of interest in a signal obtained from photo detectors of the same color Bayer-arrayed at every other pixel on the image sensor (nine-pixel mixing, four-pixel mixing). The source image RAW data is inputted to the pre-processing unit 7 in the form of continuous line data where illustrated BG-repeated line data and GR-repeated line data are alternately and repeatedly arranged.

In a RAW data recording mod, the image data is not subjected to signal processes such as synchronization and directly recorded on the recording medium 15 through the memory controller 8 and the recording medium I/F unit 14. The RAW data not subjected to signal processes, such as synchronization, is data having a mosaic-like pattern containing information of different colors in different pixels, with information of just one color in each pixel. The image data, which is not compressed, has a large file size. There is a mode designed for lossless compression of the RAW data.

Example 1

Hereinafter is described an example 1 of the image processing device and the image processing method in the image pickup apparatus A thus technically characterized. All of structural elements or main structural elements of the image processing device are provided in the pre-processing unit 7 or may be provided as a dedicated image processor. In such a dedicated image processor, the RAW data, when recorded as-is on the recording medium 15, is fetched from the recording medium 15 and processed.

FIG. 5 (a) schematically illustrates steps of a distribution equalization process performed by the pre-processing unit 7 to the RAW data obtained by mixing four pixels and outputted from the AFE unit 5 of the image pickup unit 6. As described earlier, the RAW data obtained by mixing four pixels is inputted to the pre-processing unit 7 in the form of continuous line data where illustrated BG-repeated line data and GR-repeated line data are alternately and repeatedly arranged.

As illustrated in FIG. 5 (a), a RAW data D11 obtained by mixing four pixels, which is a single-plate source image data (in the form of a plane), is subjected to two processes; a horizontal distribution equalization process H1 and a vertical distribution equalization process V1, so that the pixel data distribution of the RAW data D11 is corrected to be uniform in two-dimensional directions. The four-pixel-mixed RAW data is subjected to the horizontal distribution equalization process H1 to obtain a RAW data D12 having a horizontally uniform pixel data distribution (a first multiple-color array data). The four-pixel-mixed RAW data is further subjected to the vertical distribution equalization process V1 to obtain a RAW data D13 having a vertically uniform pixel data distribution (a second multiple-color array data).

The distribution equalization process is to correct a pixel data distribution, indicating which of data at different coordinate positions on the source image is carried by each one of pixel data serially inputted, to be uniform in the horizontal direction or the vertical direction. Though needless to say, it is noted here to avoid any misunderstanding that the distribution equalization process does not change (shift) the pixel positions (coordinate positions in a two-dimensional space) but is aimed at data interpolation of pixel data by simply using the coordinate positions in operations for the data interpolation. Because of the non-uniform distribution of pixel values (luminance and chromaticity) of target pixels to be processed in comparison to the coordinate space distribution, the pixel values of the target pixels to be processed are corrected by using the pixel values of pixels adjacent thereto, so that the distribution of the corrected pixel values becomes uniform in comparison to the coordinate space distribution (*1).

Below are described two different modes of the horizontal distribution equalization process H1 and the vertical distribution equalization process V1 respectively including two steps. FIGS. 5 (b) and (c) schematically illustrate the modes.

In the mode illustrated in FIG. 5 (b), a frame memory FM1 is used as a buffer for two processes, distribution equalization processes H11 and V11. All of the RAW data D12 after the horizontal distribution equalization process H11 is performed (first multiple-color array data) are tentatively written in the frame memory FM1. When the RAW data D12 is read from the frame memory FM1, the RAW data D12 is read therefrom in a direction orthogonal to a direction where the data is written and subjected to the vertical distribution equalization process V11 to obtain the RAW data D13 to be finally obtained (second multiple-color array data) having pixel data uniformly distributed. In this mode, the vertical distribution equalization process V11 and the horizontal distribution equalization process H11 perform an identical process.

In the mode illustrated in FIG. 5 (c), a line memory LM1 having a plurality of lines is used as a buffer for two distribution equalization processes H12 and V12, so that these two processes are preformed as pipeline processes (parallel processes). While the horizontal distribution equalization process H12 is being performed, the data outputted from the process is written in the line memory LM1. At the same time, the RAW data D12 for plural lines are read from the line memory LM1, and the data at horizontally equal positions on the plural lines are subjected to the vertical distribution equalization process V12 to obtain the RAW data D13 having pixel data uniformly distributed. The vertical distribution equalization process V12 in this mode performs a process different to the horizontal distribution equalization process H12. The image processing device illustrated in FIGS. 5 (b) and (c) is embedded in the pre-processing unit 7 of the image pickup apparatus A illustrated in FIG. 27.

Figure 6:
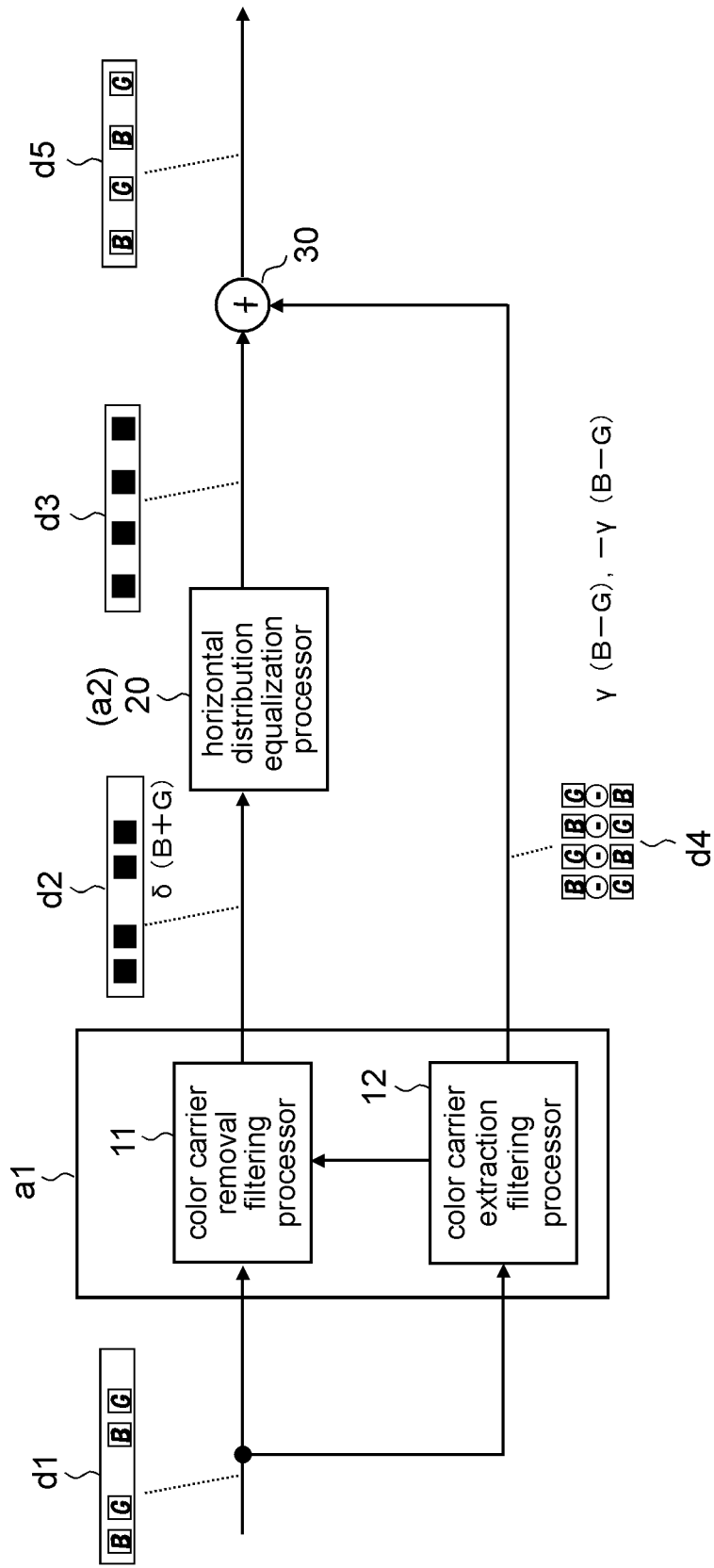
FIG. 6 is a block diagram illustrating a horizontal distribution equalization process according to the example 1.

Next, the horizontal distribution equalization process H1 is described in detail referring to FIG. 6. The horizontal distribution equalization process H1 is a one-dimensional pipeline process in which a pixel-based process is performed on lines. Provided are; a color carrier removal filtering processor 11 for extracting a line luminance data d2 from a BG- or GR-repeated line luminance data d1 of the four-pixel-mixed RAW data, a color carrier extraction filtering processor 12 for extracting a line color carrier data d4 having BG or GR repeated per line from the line data d1, a horizontal distribution equalization processor 20 for generating a line luminance data d3 by horizontally performing the distribution equalization process to the line luminance data d2, and a color array reproduction processor 30 for generating a line data d5 having pixels uniformly distributed in the horizontal direction by re-synthesizing the line luminance data d3 having pixels uniformly distributed with the line color carrier data d4 extracted beforehand.

The color carrier removal filtering processor 11 and the color carrier extraction filtering processor 12 correspond to the first filtering processor a1 illustrated in FIG. 1. The horizontal distribution equalization processor corresponds to the first luminance distribution equalization processor a2 illustrated in FIG. 1. The color array reproduction processor 30 corresponds to the first color array reproduction processor a7 illustrated in FIG. 1. The line data d1 corresponds to the first multiple-color array data, and the line luminance data d2 corresponds to the first luminance data. The line color carrier data d4 corresponds to the first color carrier data, and the line luminance data d3 corresponds to the second luminance data. The line data d5 corresponds to the RAW data 12 that is the first multiple-color array data. Though FIG. 6 illustrates the BG-repeated line data of the four-pixel-mixed RAW data, the GR-repeated line data is similarly processed.

Referring to FIG. 6, a description is given to an example in which a Bayer array image obtained by mixing four pixels is processed by the horizontal distribution equalization process. This process is performed to capture moving images by using the high-pixel image sensor 4. As illustrated in FIG. 6, the inputted source image RAW data obtained by mixing four pixels is data having a mosaic-like pattern reflecting pixel positions of the Bayer array, which is read per line from the image sensor 4. The data inputted per line includes two different data; BG line data d1 having information of B and information of G repeated per pixel, and GR line data d1 having information of G and information of R repeated per pixel, though not illustrated in the drawing. When these two different data d1 are processed by the color carrier removal filtering processor 11 to remove color carriers near the Nyquist frequency that changes based on the cycle of two pixels, the line luminance data d2 having an average value of B and G, $\{\delta(B+G)\}$, is generated for the BG-repeated line, and the line luminance data d2 having an average value of G and R, $\{(G+R)\}$, is generated for the GR-repeated line not illustrated in the drawing ($\delta=\frac{1}{2}$).

The two different line data d1 respectively having BG and GR repeated is processed by the color carrier extraction filtering processor 12 to extract the color carriers near the Nyquist frequency that changes based on the cycle of two pixels. Then, the line color carrier data d4 of BG modulated by the Nyquist frequency is outputted for the BG-repeated line, and the line color carrier data d4 of GR modulated by the Nyquist frequency is outputted for the GR-repeated line not illustrated in the drawing.

In the two different line luminance data d2 respectively having BG and GR repeated, the pixel data distribution is corrected by the horizontal distribution equalization processor 20. Then, the resulting line luminance data d2 is outputted as the line luminance data d3 respectively having BG or GR uniformly distributed.

Figure 7:
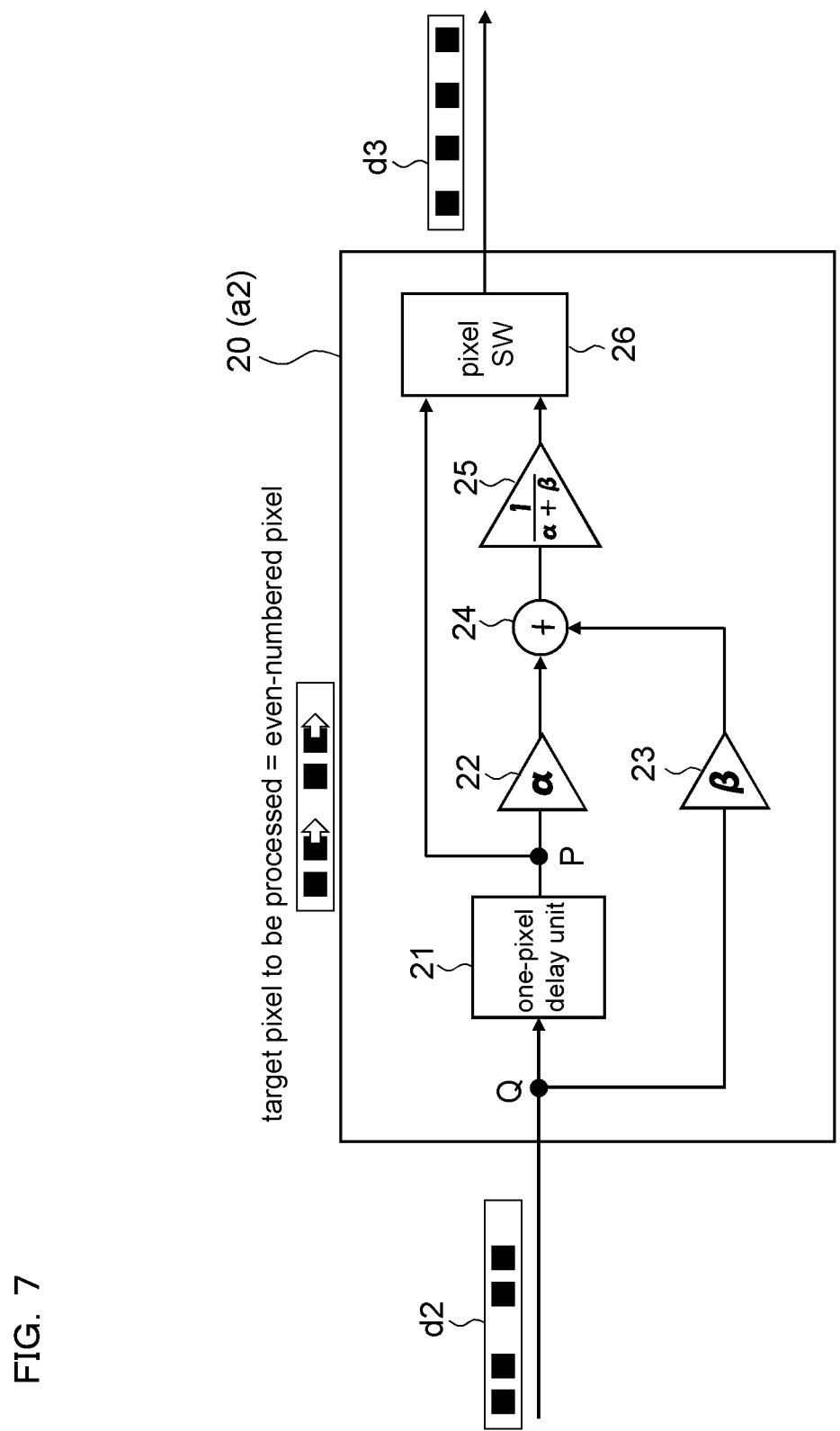
FIG. 7 is a structural block diagram (1) illustrating a horizontal distribution equalization processor according to the example 1 wherein the luminance value of even-numbered pixel data is subjected to a pseudo interpolation process in a manner shifted to right side on coordinates.

Next, the horizontal distribution equalization processor 20 is described in detail. FIG. 7 illustrates the horizontal distribution equalization processor 20 wherein, of a group of pixel data after the pixel mixing, the luminance value of horizontally even-numbered pixel data is subjected to a pseudo interpolation process in a manner shifted to right side on coordinates.

The line luminance data d2 inputted to the horizontal distribution equalization processor 20 is a continuous line data where the BG-repeated line data and the GR-repeated line data are alternately repeated. The line luminance data d2 obtained by mixing four pixels has a non-uniform pixel data distribution. In the drawing, the non-uniform pixel data distribution is known from two pixels very distantly spaced and two pixels very closely spaced. A point to be noted here is that the respective pixel data are all inputted at equal time intervals.

The line luminance data d2 is inputted to a one-pixel delay unit 21. The one-pixel delay unit 21 is provided because of the need to match the timings of two pixel data described referring to FIG. 3; the target pixel to be processed P and the support pixel Q with a time difference of one clock therebetween, when the luminance value of the target pixel to be processed P is subjected to the interpolation process by using these two pixel data. The data outputted from the one-pixel delay unit 21 is multiplied by a coefficient α by a multiplier 22, and the input of the one-pixel delay unit 21 is multiplied by a coefficient β by a multiplier 23. These multiplied data are inputted to an adder 24 to be added and then divided by (α+β) by a divider 25. A pixel switching unit 26 for output selects one of the data outputted from the one-pixel delay unit 21 and the data divided by (α+β) outputted from the divider 25 alternately at every other pixel.

Hereinafter is described the distribution equalization process wherein the luminance value of even-numbered pixel data is subjected to the pseudo interpolation process in a manner shifted to right side on coordinates. When odd-numbered pixel data of the inputted line luminance data d2 is inputted to the one-pixel delay unit 21 (when the odd-numbered pixel data of the inputted line luminance data d2 is delayed by the one-pixel delay unit 21 and then outputted therefrom), the pixel switching unit 26 selects the odd-numbered pixel data and through-outputs the selected pixel data without performing the interpolation process. This is illustrated in FIG. 3B; the luminance value of a pixel P⁻ (odd-numbered) next to the target pixel to be processed P (even-numbered) on the left is immediately therebelow, remaining unchanged.

When the even-numbered pixel data of the inputted line luminance data d2 is inputted to the one-pixel delay unit 21, the delayed even-numbered pixel data outputted from the one-pixel delay unit 21 is multiplied by the coefficient α by the multiplier 22. The odd-numbered pixel, for which the delay process is skipped, is multiplied by the coefficient β by the multiplier 23. These two pixel data are added by the adder 24 and divided by (α+β) by the divider 25, and the resulting data thereby obtained (uniformly distributed luminance by liner interpolation) is selected by and outputted from the pixel switching unit 26. This is illustrated in FIG. 3B; the target pixel to be processed P (even-numbered) is interpolated to the luminance value Ya* by using the own luminance value Ya and the luminance value Yb of the support pixel Q. Between the target pixel to be processed P and the support pixel Q, there is a difference by one pixel timing-wise. Because the support pixel Q is delayed to the target pixel to be processed P by one pixel, the pixel data is delayed by one pixel by the one-pixel delay unit 21 (target pixel to be processed P is retained) until the support pixel Q is inputted. Then, the target pixel to be processed P is subjected to the interpolation process once the support pixel Q is inputted. The luminance value Ya of the target pixel to be processed P is multiplied by the coefficient α (=2), and the luminance value Yb of the support pixel Q is multiplied by the coefficient β (=1). Then, the resulting luminance values are added and divided to obtain the interpolated luminance value Ya*. FIG. 3 illustrates the spatial distribution of pixel data in the source image RAW data, which is different to the temporal distribution of pixel data. Spatially, there are three pixels between the target pixel to be processed P and the support pixel Q, however, these pixels are temporally distant from each other by one pixel like any other pixels. By employing the pseudo shift to right side on coordinates, this process can interpolate the luminance value of the horizontally even-numbered pixel data in a group of pixel data after the pixel mixing.

The coefficient α used by the multiplier 22 and the coefficient β used by the multiplier 23 are logically α:β=2:1 because the non-uniform distribution of pixel data generated by mixing four pixels is corrected by linear interpolation between two adjacent pixels. To simplify the division by the divider 25, (α+β) may be set to the power-of-two ($2^n$), 16, for example, α:β=10:1 or α:β=11:5 as an approximate value.

Figure 8:
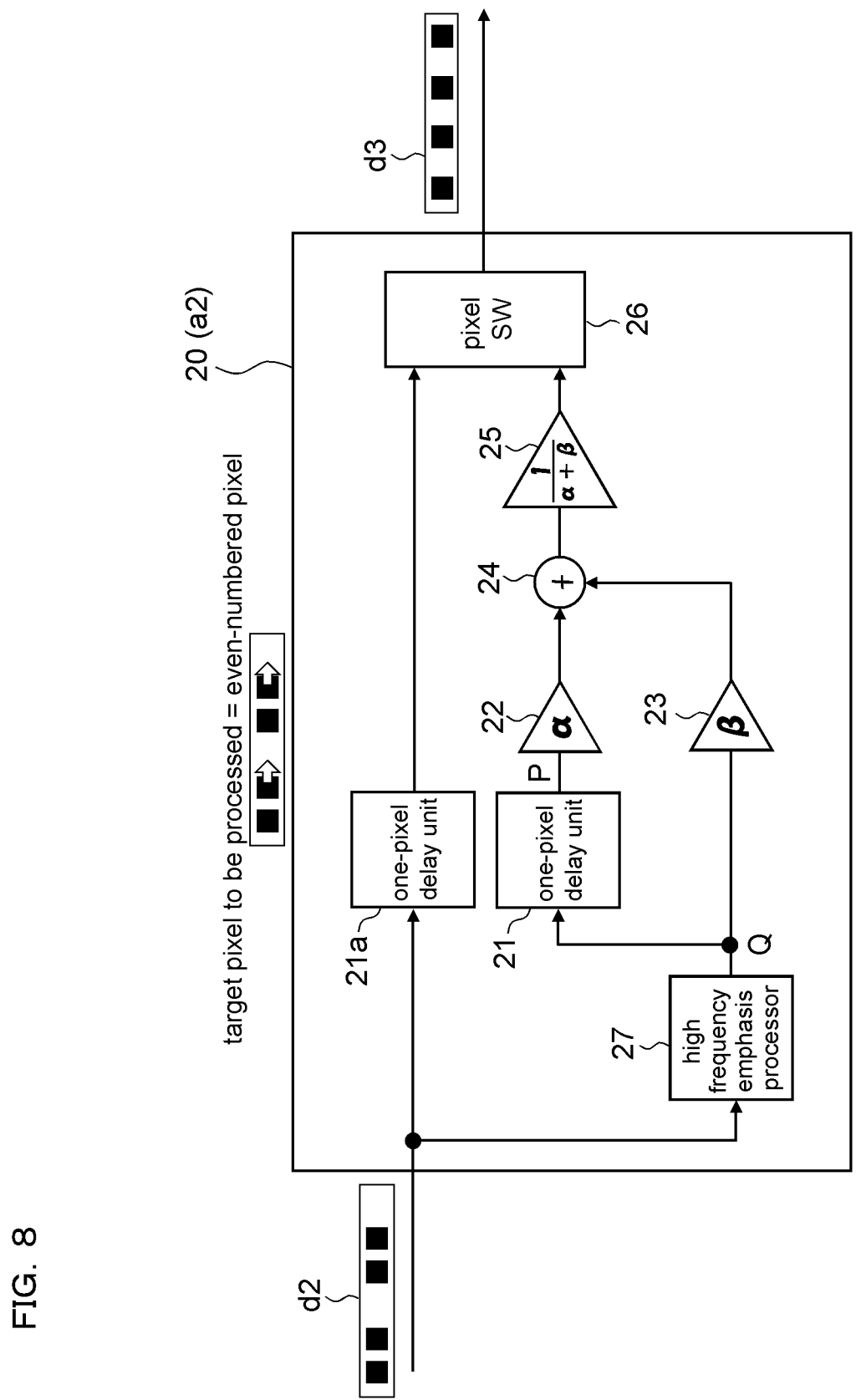
FIG. 8 is a structural block diagram (2) illustrating the horizontal distribution equalization processor according to the example 1 wherein the luminance value of even-numbered pixel data is subjected to the pseudo interpolation process in a manner shifted to right side on coordinates.

FIG. 8 illustrates the horizontal distribution equalization processor 20 wherein the luminance value of even-numbered pixel data is subjected to the pseudo interpolation process in a manner shifted to right side on coordinates with a desirably high resolution being ensured in the horizontal direction by emphasizing high-frequency components.

The line luminance data d2 where the pixels are non-uniformly distributed is inputted to a one-pixel delay unit 21a and a high frequency emphasis processor 27. The one-pixel delay unit 21a delays the line luminance data d2 by one pixel and inputs the resulting line luminance data d2 to the pixel switching unit 26 for output. The high frequency emphasis processor 27 increases a high-frequency gain of the line luminance data d2 and inputs the resulting line luminance data d2 to the one-pixel delay unit 21 and the multiplier 23. The one-pixel delay unit 21 delays the data outputted from the high frequency emphasis processor 27 by one pixel and then inputs the resulting data to the multiplier 22. The multiplier 22 multiplies the data outputted from the one-pixel delay unit 21 by the coefficient α and inputs the resulting data to the adder 24. The multiplier 23 multiplies the data outputted from the high frequency emphasis processor 27 (inputted by the one-pixel delay unit 21) by the coefficient β and inputs the resulting data to the adder 24. The adder 24 adds the data outputted from the multiplier 22 and the data outputted from the multiplier 23 and inputs the resulting data to the divider 25. The divider 25 divides the data outputted from the adder 24 by (α+β) and inputs the resulting data to the pixel switching unit 26 for output. The pixel switching unit 26 for output selects one of the data outputted from the one-pixel delay unit 21a and the data outputted from the divider 25 alternately at every other pixel.

The only data subjected to the high frequency emphasis is the pixel data associated with the interpolation process in which the coefficients α and β are used. Any other pixel data not subjected to the interpolation process is transmitted through the pixel switching unit 26 without being subjected to the high frequency emphasis. When the high frequency emphasis processor 27 is thus provided on the input side, a line for through output is not drawn from the output side of the one-pixel delay unit 21 but is drawn from the input side of the high frequency emphasis processor 27. Further, the one-pixel delay unit 21a is provided on the through-output line to deal with any delay caused by inserting the high frequency emphasis processor 27.

Hereinafter is described the distribution equalization process wherein the luminance value of even-numbered pixel data is subjected to the pseudo interpolation process in a manner shifted to right side on coordinates. When odd-numbered pixel data of the inputted line luminance data d2 is outputted from the one-pixel delay unit 21a, the pixel switching unit 26 selects the odd-numbered pixel data and through-outputs the selected pixel data. When even-numbered pixel data of the inputted line luminance data d2 is outputted from the one-pixel delay unit 21, the even-numbered pixel data outputted from the one-pixel delay unit 21a is multiplied by the coefficient α by the multiplier 22, and the odd-numbered pixel data processed by the high frequency emphasis processor 27 and inputted to the one-pixel delay unit 21 is multiplied by the coefficient β by the multiplier 23. These two pixel data are added by the adder 24 and divided by (α+β) by the divider 25. The resulting data obtained by the divider 25 (uniformly distributed luminance by liner interpolation) is inputted to the pixel switching unit 26. The pixel switching unit 26 selects the data outputted from the one-pixel delay unit 21a and the division result obtained by the divider 25 and outputs the selected data.

According to the process wherein the high frequency components of the luminance data of the pixels P and Q used for the interpolation process are gain-increased prior to the interpolation process. Therefore, any possible reduction in the high frequency components by the interpolation process afterwards is balanced out on the whole. By employing the pseudo shift to right side on coordinates, this process can interpolate the luminance value of the horizontally even-numbered pixel data in a group of pixel data after the pixel mixing without undermining a desirably high resolution in the horizontal direction. As a result, an image quality is improved regardless of any reduction of the high frequency components due to the interpolation process performed.

The coefficient α used by the multiplier 22 and the coefficient β used by the multiplier 23 are logically α:β=2:1 because the non-uniform distribution of the pixel data due to the four-pixel mixing is corrected by linear interpolation between two adjacent pixels. To simplify the division by the divider 25, (α+β) may be set to the power-of-two ($2^n$), 16, for example, α:β=10:1 or α:β=11:5 as an approximate value.

Figure 9:
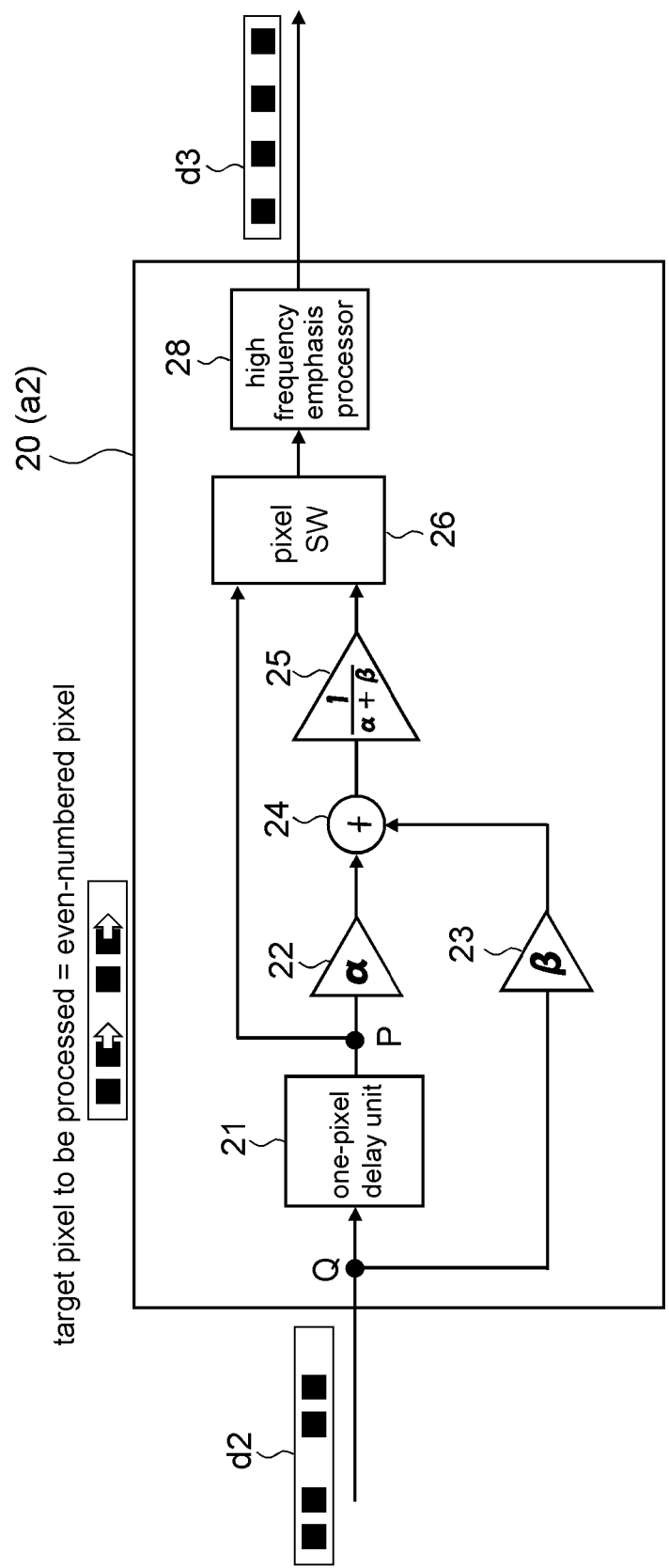
FIG. 9 is a structural block diagram (3) illustrating the horizontal distribution equalization processor according to the example 1 wherein the luminance value of even-numbered pixel data is subjected to the pseudo interpolation process in a manner shifted to right side on coordinates.

FIG. 9 illustrates the horizontal distribution equalization processor 20 wherein the luminance value of even-numbered pixel data is subjected to the pseudo interpolation process in a manner shifted to right side on coordinates with a desirably high resolution being ensured in the horizontal direction by emphasizing high-frequency components. The illustration of FIG. 9 is different to that of FIG. 8 in that the interpolated pixel data alone, which is selectively extracted from the continuous pixel data uniformly distributed by interpolation performed at every other pixel, is subjected to the high frequency emphasis process by a high frequency emphasis processor 28 provided subsequent to the pixel switching unit 26.

Figure 10:
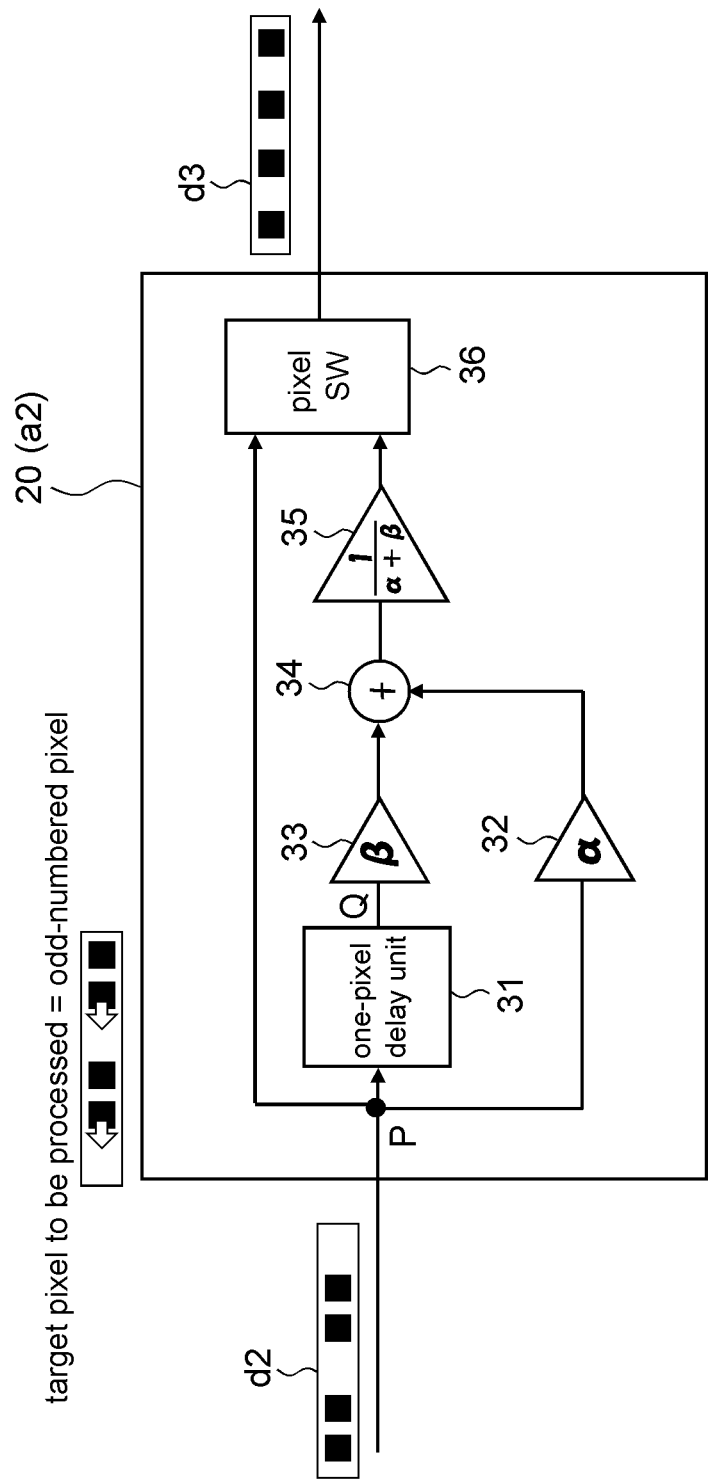
FIG. 10 is a structural block diagram (1) illustrating the horizontal distribution equalization processor according to the example 1 wherein the luminance value of odd-numbered pixel data is subjected to a pseudo interpolation process in a manner shifted to left side on coordinates.

FIG. 10 illustrates the horizontal distribution equalization processor 20 wherein, of a group of pixel data after the pixel mixing, the luminance value of odd-numbered pixel data in the horizontal direction is subjected to the pseudo interpolation process in a manner shifted to left side on coordinates. The line luminance data d2 pixels non-uniformly distributed is inputted to a one-pixel delay unit 31, a multiplier 32, and a pixel switching unit 36. The multiplier 32 multiplies the data inputted to the one-pixel delay unit 31 by the coefficient α. The one-pixel delay unit 31 delays the line luminance data d2 by one pixel. The data outputted from the one-pixel delay unit 31 is inputted to a multiplier 33. The multiplier 33 multiplies the data outputted from the one-pixel delay unit 31 by the coefficient β. The data outputted from the multiplier 33 and the data outputted from the multiplier 34 are inputted to an adder 34. The adder 34 adds the data outputted from the multiplier 33 and the data outputted from the multiplier 34 and inputs the resulting data to a divider 35. The divider 35 divides the resulting data inputted from the multiplier 34 by (α+β). The divider 35 inputs the resulting data to the pixel switching unit 36. The pixel switching unit 36 selects one of the data inputted from the one-pixel delay unit 31 and the divided data outputted from the divider 35 alternately at every other pixel and outputs the selected data.

Hereinafter is described the distribution equalization process wherein the luminance value of odd-numbered pixel data is subjected to the pseudo interpolation process in a manner shifted to left side on coordinates. When even-numbered pixel data of the inputted line luminance data d2 is inputted to the one-pixel delay unit 31, the pixel switching unit 36 selects the even-numbered pixel data and through-outputs the selected pixel data. This is illustrated in FIG. 5C; the luminance value of a pixel Q (even-numbered) next to the target pixel to be processed P (odd-numbered) on the left is immediately therebelow, remaining unchanged.

When odd-numbered pixel data of the inputted line luminance data d2 is inputted to the one-pixel delay unit 31, the odd-numbered pixel data inputted to the one-pixel delay unit 31 is multiplied by the coefficient α by the multiplier 32, and the even-numbered pixel data outputted from the one-pixel delay unit 31 is multiplied by the coefficient β by the multiplier 33. These two pixel data are added by the adder 34, and the resulting data is divided by (α+β) by the divider 35. The resulting data thereby obtained (uniformly distributed luminance by liner interpolation) is selected by and outputted from the pixel switching unit 36. This is illustrated in FIG. 3C; the target pixel to be processed P (odd-numbered) is interpolated to the luminance value Ya* by using the own luminance value Ya and the luminance value Yb of the support pixel Q. Between the target pixel to be processed P and the support pixel Q, there is a difference by one pixel timing-wise. Because the target pixel to be processed P is delayed to the support pixel Q by one pixel, the support pixel Q is retained by the one-pixel delay unit 31 until the target pixel to be processed P is inputted. Then, the target pixel to be processed P is subjected to the interpolation process once the target pixel to be processed P is inputted. The luminance value Ya of the target pixel to be processed P is multiplied by the coefficient α (=2), and the luminance value Yb of the support pixel Q is multiplied by the coefficient β (=1). Then, the resulting values are added and divided to obtain the interpolated luminance value Ya*. By employing the pseudo shift to left side on coordinates, this process can interpolate the luminance value of the horizontally odd-numbered pixel data in a group of pixel data after the pixel mixing.

The coefficient α used by the multiplier 32 and the coefficient β used by the multiplier 33 are logically α:β=2:1 because the non-uniform distribution of the pixel data due to the four-pixel mixing is corrected by linear interpolation between two adjacent pixels. To simplify the division by the divider 35, (α+β) may be set to the power-of-two ($2^n$), 16, for example, α:β=10:1 or α:β=11:5 as an approximate value. Of the approximate values, a higher accuracy is obtained from α:β=11:5 than α: β=10:6.

Figure 11:
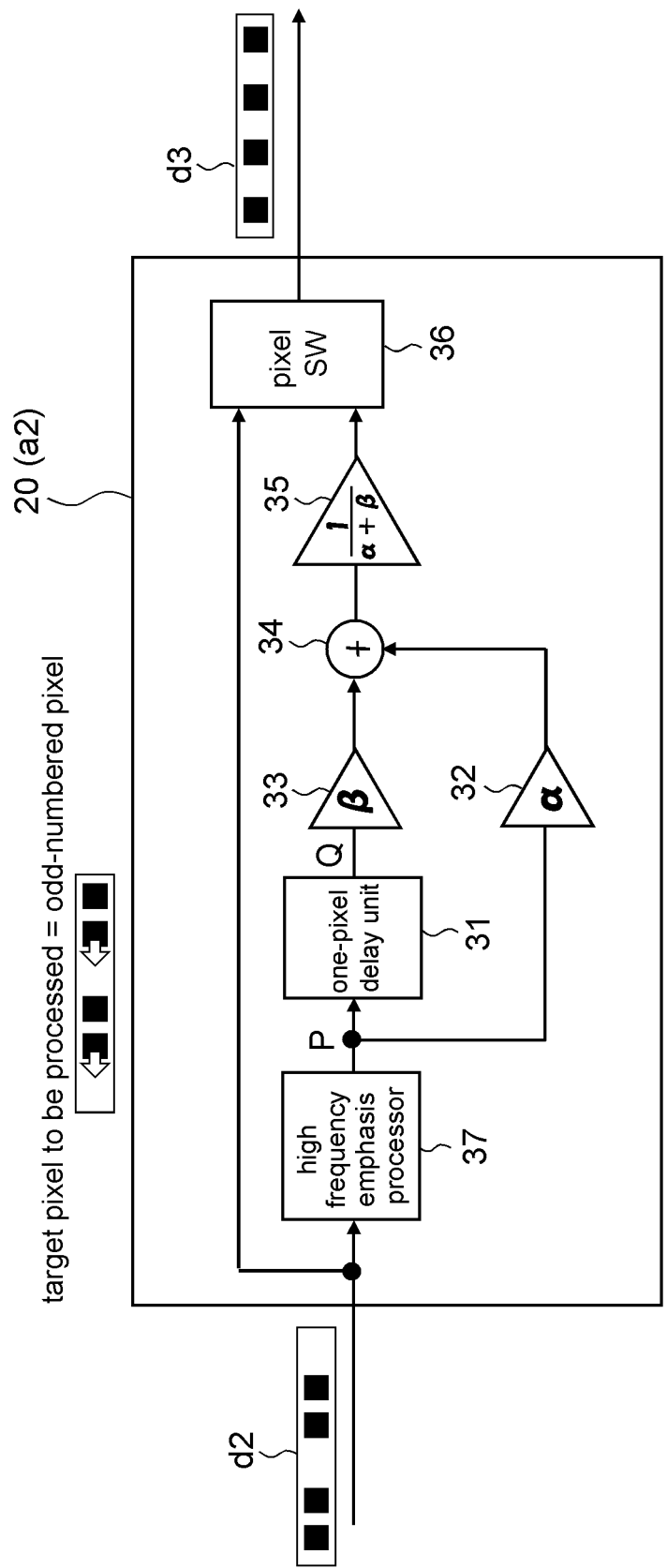
FIG. 11 is a structural block diagram (2) illustrating the horizontal distribution equalization processor according to the example 1 wherein the luminance value of odd-numbered pixel data is subjected to the pseudo interpolation process in a manner shifted to left side on coordinates.

FIG. 11 illustrates the horizontal distribution equalization processor 20 wherein the luminance value of odd-numbered pixel data is subjected to the pseudo interpolation process in a manner shifted to left side on coordinates with a desirably high resolution being ensured in the horizontal direction by emphasizing high-frequency components. After the high frequency components of the line luminance data d2 having pixels non-uniformly distributed are gain-increased by a high frequency emphasis processor 37, the resulting line luminance data d2 is inputted to the one-pixel delay unit 31. The data inputted to the one-pixel delay unit 31 is also inputted to the multiplier 32 and multiplied by the coefficient α. The data outputted from the one-pixel delay unit 31 is multiplied by the coefficient β by the multiplier 33 and inputted to the adder 34. The adder 34 adds the multiplied data obtained by the multipliers 33 and 34 and inputs the added data to the divider 35. The divider 35 divides the added data obtained by the adder 34 by (α+β) and inputs the divided data to the pixel switching unit 36 for output. The pixel switching unit 36 selects one of the data inputted from the high frequency emphasis processor 37 and the divided data obtained by the divider 35 alternately at every other pixel.

In the illustration of FIG. 8, the one-pixel delay unit 21a is inserted in the through line. In the illustration of FIG. 11, however, the support pixel Q precedes the target pixel to be processed P, making it unnecessary to provide the one-pixel delay unit for timing adjustment. The distribution equalization process, wherein the luminance value of odd-numbered pixel data is subjected to the pseudo interpolation process in a manner shifted to left side on coordinates is similar to the process illustrated in FIG. 10.

Thus processed, the high frequency components of the luminance data of the pixels P and Q used for the interpolation process are gain-increased to be emphasized prior to the interpolation process. Therefore, any possible reduction in the high frequency components by the interpolation process performed afterwards is balanced out on the whole. By employing the pseudo shift to left side on coordinates, this process can interpolate the luminance value of the horizontally odd-numbered pixel data in a group of pixel data after the pixel mixing without undermining a desirably high resolution in the horizontal direction. This succeeds in improving an image quality even after the high frequency components are reduced by the interpolation process.

Figure 12:
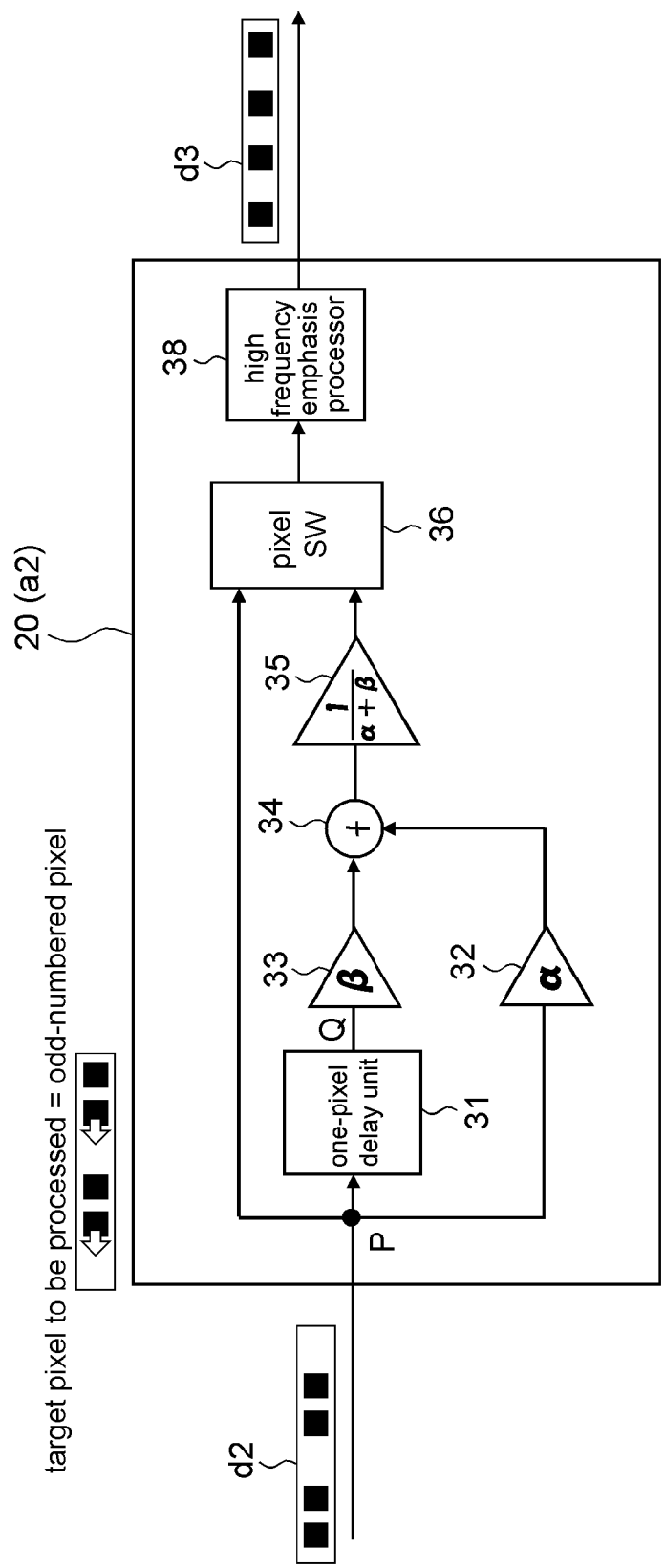
FIG. 12 is a structural block diagram (3) illustrating the horizontal distribution equalization processor according to the example 1 wherein the luminance value of odd-numbered pixel data is subjected to the pseudo interpolation process in a manner shifted to left side on coordinates.

FIG. 12 illustrates the horizontal distribution equalization processor 20 wherein the luminance value of odd-numbered pixel data is subjected to the pseudo interpolation process in a manner shifted to left side on coordinates with a desirably high resolution being ensured in the horizontal direction by emphasizing high-frequency components. The illustration of FIG. 12 is different to the illustration of FIG. 11 in that the interpolated pixel data alone, which is selectively extracted from the continuous pixel data uniformly distributed by interpolation performed at every other pixel, is subjected to the high frequency emphasis process by a high frequency emphasis processor 38 provided subsequent to the pixel switching unit 36.

Figure 13:
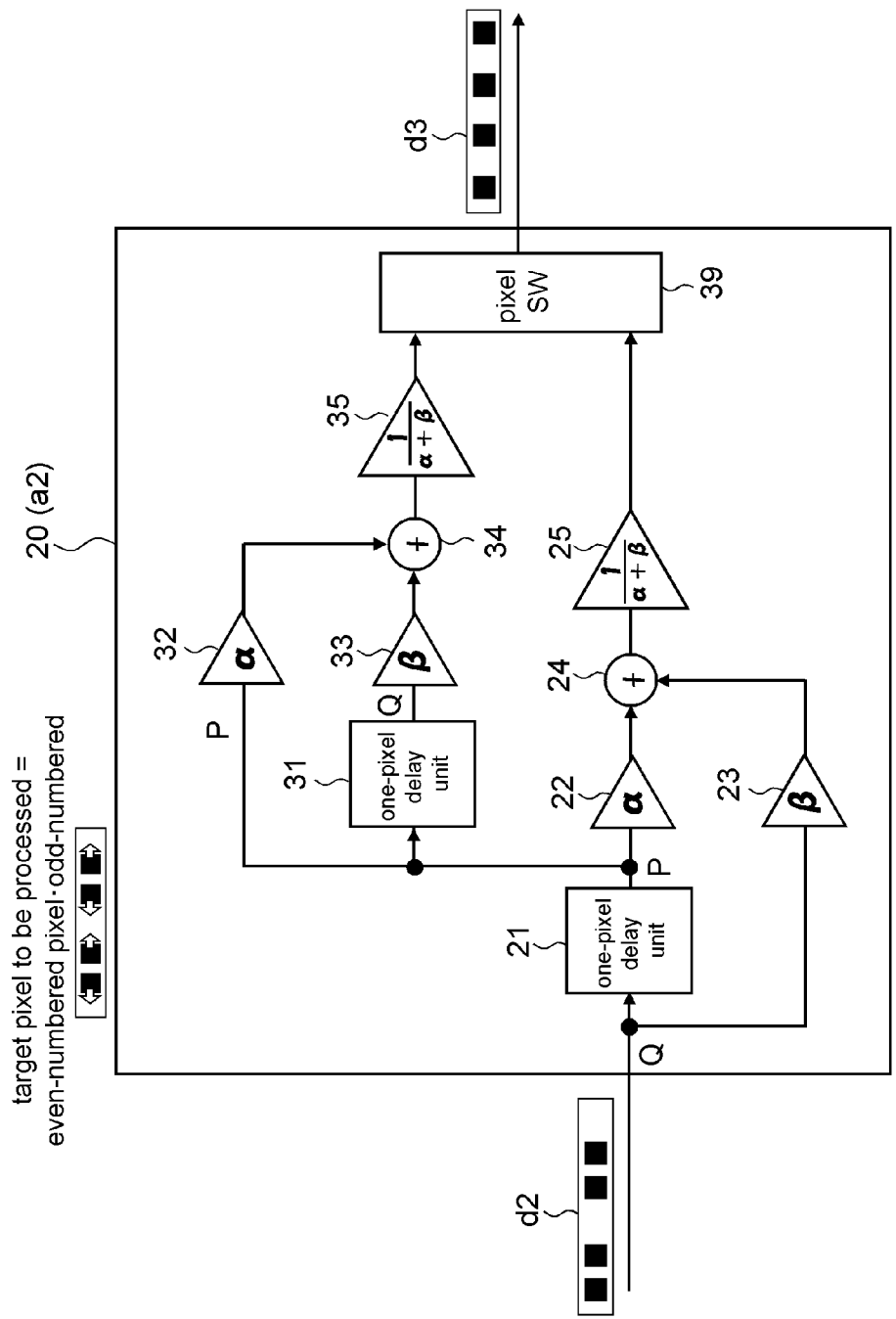
FIG. 13 is a structural block diagram (1) illustrating the horizontal distribution equalization processor according to the example 1 wherein the luminance value of even-numbered pixel data is subjected to the pseudo interpolation process in a manner shifted to right side on coordinates and the luminance value of odd-numbered pixel data is subjected to the pseudo interpolation process in a manner shifted to left side on coordinates.

FIG. 13 illustrates the horizontal distribution equalization processor 20 wherein, of a group of pixel data after the pixel mixing, the luminance value of even-numbered pixel data in the horizontal direction is subjected to the pseudo interpolation process in a manner shifted to right side on coordinates and the luminance value of odd-numbered pixel data in the horizontal direction is subjected to the pseudo interpolation process in a manner shifted to left side on coordinates. The horizontal distribution equalization processor 20 has a basic structure where the illustrations of FIGS. 7 and 10 are combined. Describing the structural characteristics, two one-pixel delay units are provided as the one-pixel delay unit; first one-pixel delay unit 21, and second one-pixel delay unit 31. These two one-pixel delay units are provided to deal with two different situations described below. As described referring to FIGS. 4A and 4B, there is a difference by one clock timing-wise between the target pixel to be processed P and the support pixel Q; the target pixel to be processed P precedes the support pixel Q, or the support pixel Q precedes the target pixel to be processed P. When the luminance value of the target pixel to be processed P is subjected to the interpolation process by using the data of these pixels both, the horizontal distribution equalization processor 20 structurally characterized as illustrated in FIG. 13 can perform the interpolation process dealing with these two different situations.

The line luminance data d2 having the non-uniform pixel data distribution is inputted to the first one-pixel delay unit 21 and the multiplier 23. The first one-pixel delay unit 21 delays the line luminance data d2 by one pixel and inputs the obtained result to a second one-pixel delay unit 22, the multiplier 22, and the multiplier 32. The multiplier 22 multiplies the data outputted from the first one-pixel delay unit 21 by the coefficient α and inputs the obtained result to the first adder 24. The multiplier 23 multiplies the line luminance data d2 by the coefficient β and inputs the obtained result to the first adder 24. The first adder 24 adds the data outputted from the multipliers 22 and 23 and inputs the obtained result to the divider 25. The divider 25 divides the data outputted from the adder 24 by (α+β) and inputs the obtained result to the pixel switching unit 39 for output.

The second one-pixel delay unit 31 further delays the data outputted from the first one-pixel delay unit 21 and then inputs the obtained result to the multiplier 33. The multiplier 33 multiplies the data outputted from the second one-pixel delay unit 31 by the coefficient β and inputs an obtained result to the second adder 34. The multiplier 32 multiplies the data outputted from the first one-pixel delay unit 21 by the coefficient α and inputs the obtained result to the second adder 34. The second adder 34 adds the data outputted from the multipliers 32 and 33 and inputs the obtained result to the second divider 35. The second divider 35 divides the data outputted from the second adder 44 by (α+β) and inputs the obtained result to the pixel switching unit 39 for output. The pixel switching unit 39 selects the data outputted from the first divider 25 and the data outputted from the second divider 35 alternately at every other pixel and outputs the selected data.

Hereinafter is described the distribution equalization process illustrated in FIG. 13 wherein the luminance value of even-numbered pixel data is subjected to the pseudo interpolation process in a manner shifted to right side on coordinates and the luminance value of odd-numbered pixel data is subjected to the pseudo interpolation process in a manner shifted to left side on coordinates. When odd-numbered pixel data of the inputted line luminance data d2 is outputted from the first one-pixel delay unit 21, the pixel switching unit 39 selects the data outputted from the second divider 35 and outputs the selected data. When even-numbered pixel data of the inputted line luminance data d2 is outputted from the first one-pixel delay unit 21, the pixel switching unit 39 selects the data outputted from the first divider 25 and outputs the selected data.

Of a group of pixel data after the pixel mixing, this process can interpolate the luminance value of the horizontally even-numbered pixel data by employing the pseudo shift to right side on coordinates and interpolate the luminance value of the horizontally odd-numbered pixel data by employing the pseudo shift to left side on coordinates.

The coefficient α of the multipliers 22 and 32 and the coefficient β of the multipliers 23 and 33 are logically α:β=5:1 because the non-uniform distribution of the pixel data due to the four-pixel mixing is corrected by linear interpolation between two adjacent pixels. To simplify the division by the dividers 25 and 35, (α+β) may be set to 32 or 64 each one of them is the power-of-two ($2^n$), for example, α:β=27:5 or α:β=53:11 as an approximate value. Comparing α:β=27:5 to α:β=28:4 and α:β=26:6, α:β=27:5 is more accurate. Comparing α:β=53:11 to α:β=54:10 and α:β=52:12, α:β=53:11 is more accurate. α:β=53:11 is more accurate than α:β=27:5.

Figure 14:
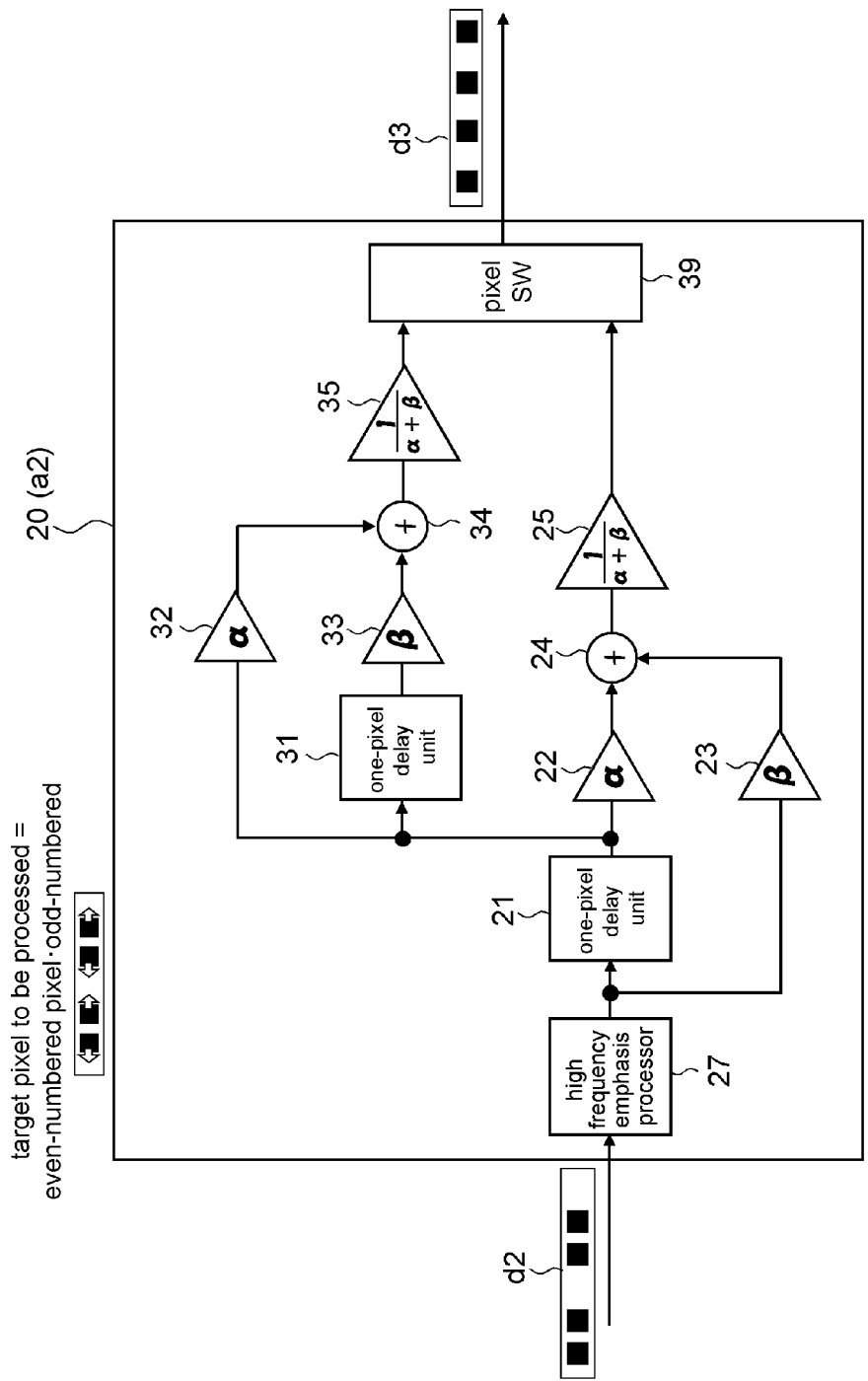
FIG. 14 is a structural block diagram (2) illustrating a horizontal distribution equalization processor according to the example 1 wherein the luminance value of even-numbered pixel data is subjected to a pseudo interpolation process in a manner shifted to right side on coordinates and the luminance value of odd-numbered pixel data is subjected to the pseudo interpolation process in a manner shifted to left side on the coordinates.

FIG. 14 illustrates the horizontal distribution equalization processor 20 wherein the luminance value of even-numbered pixel data is subjected to the pseudo interpolation process in a manner shifted to right side on coordinates and the luminance value of odd-numbered pixel data is subjected to the pseudo interpolation process in a manner shifted to left side on coordinates with a desirably high resolution being ensured in the horizontal direction by emphasizing high-frequency components. The horizontal distribution equalization processor 20 having a basic structure similar to that of FIG. 13 gain-increases the high frequency components of inputted data using the high frequency emphasis processor 27.

Figure 15:
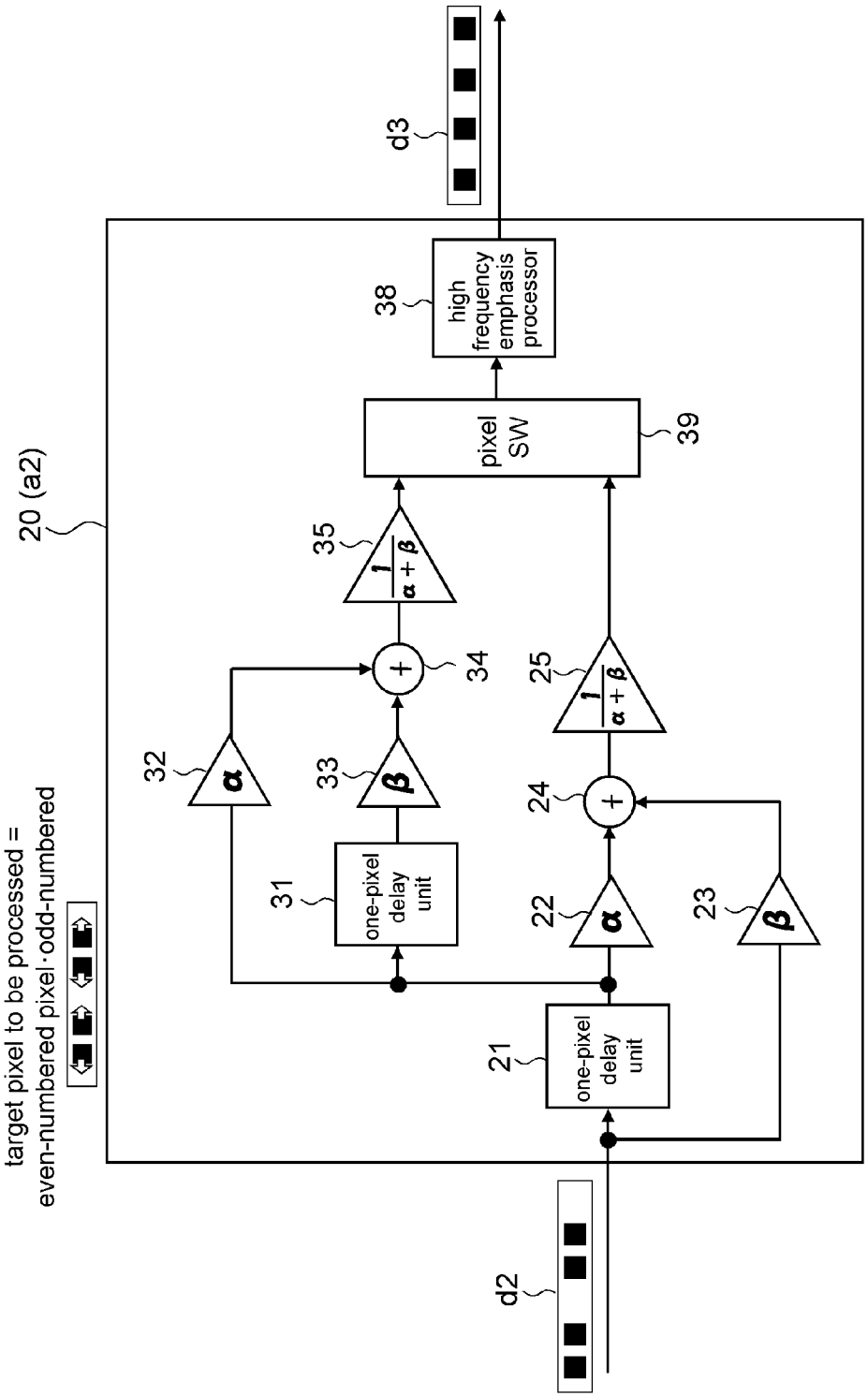
FIG. 15 is a structural block diagram (3) illustrating the horizontal distribution equalization processor according to the example 1 wherein the luminance value of even-numbered pixel data is subjected to the pseudo interpolation process in a manner shifted to right side on coordinates and the luminance value of odd-numbered pixel data is subjected to the pseudo interpolation process in a manner shifted to left side on the coordinates.

FIG. 15 also illustrates the horizontal distribution equalization processor 20 wherein the luminance value of even-numbered pixel data is subjected to the pseudo interpolation process in a manner shifted to right side on coordinates and the luminance value of odd-numbered pixel data is subjected to the pseudo interpolation process in a manner shifted to left side on coordinates with a desirably high resolution being ensured in the horizontal direction by emphasizing high-frequency components. The horizontal distribution equalization processor 20 having a basic structure similar to that of FIG. 13 gain-increases the high frequency components of inputted data using a high frequency emphasis processor 38.

Referring to FIG. 6 again, the line luminance data d3 having the pixel data distribution corrected to be uniform by the horizontal distribution equalization processor 20 is added to and thereby re-synthesized with the color carrier data d4 by the color array reproduction processor 30. Thus processed, the line luminance data d2 is outputted as the line luminance data d5 having pixels uniformly distributed and information of B and information of G repeated per pixel, and also outputted as the line data having pixels uniformly distributed and information of G and information of R repeated per pixel not illustrated in the drawing.

Expressing the data re-synthesis in the BG-repeated line using numerical expressions, provided that the luminance data is {δ(B+G)} and the color carrier data is {γ(B−G),−γ(B−G)} where δ=0.5 and γ=0.5, the luminance data is {0.5(B+G)}, and the color carrier data is 0.5(B−G),−0.5(B−G). Adding the luminance data per pixel, 0.5{(B+G)+(B−G)},0.5{(B+G)−(B−G)}, . . . , repeatedly. Thus, the BG-repeated line data having B, G, B, G, . . . repeated is reproduced.

Expressing the data re-synthesis in the GR-repeated line using numerical expressions, similarly, provided that the luminance data is {δ(G+R)} and the color carrier data is {γ(G−R),−γ(G−R)} where δ=0.5 and γ=0.5, the luminance data is {0.5(G+R)}, and the color carrier data is 0.5(G−R),−0.5(G−R). Adding the luminance data per pixel, 0.5{(G+R)+(G−R)},0.5{(G+R)−(G−R)}, . . . , repeatedly. Thus, the BG-repeated line data having G, R, G, R, . . . repeated is reproduced.

The luminance data and the color carrier data are gain-adjusted before the addition process by using δ and γ as the coefficients for the respective data so that the gain of the synthesized data is equal to that of the inputted data. The purpose of this process is to generate an independent RGB color component from the two signal components of the luminance signal and the color carrier signal. Therefore, Therefore, the gain adjustment is not necessarily performed prior to the addition process but may be performed after the independent RGB component is generated.

Figure 42A:
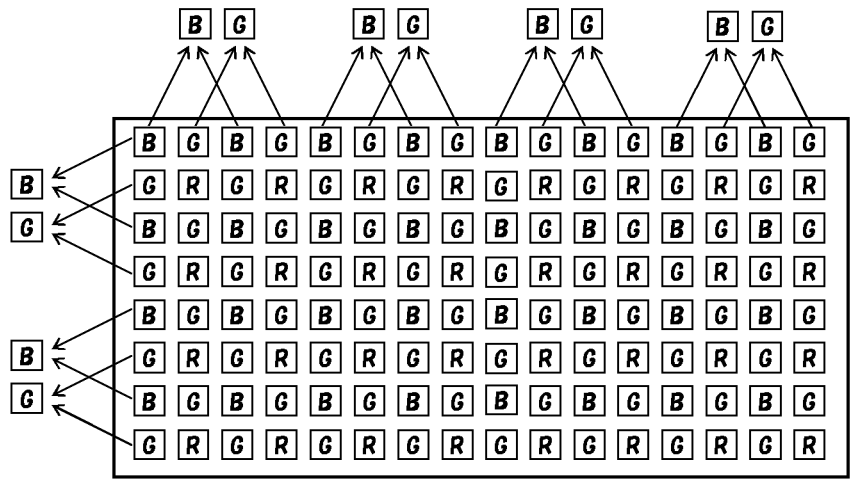
FIG. 42A is a drawing (1) where the illustrations of FIGS. 37 to 41 are combined.
Figure 42B:
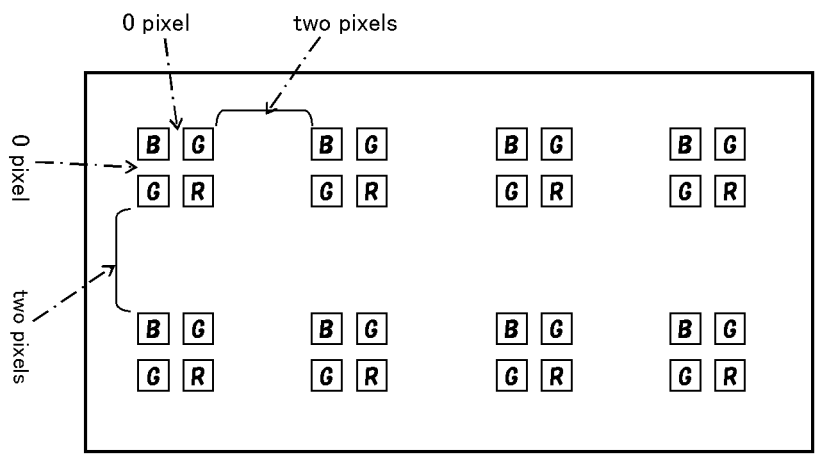
FIG. 42B is a drawing (2) where the illustrations of FIGS. 37 to 41 are combined.
Figure 42C:
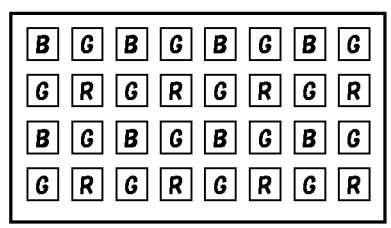
FIG. 42C is a drawing (3) where the illustrations of FIGS. 37 to 41 are combined.
Figure 43A:
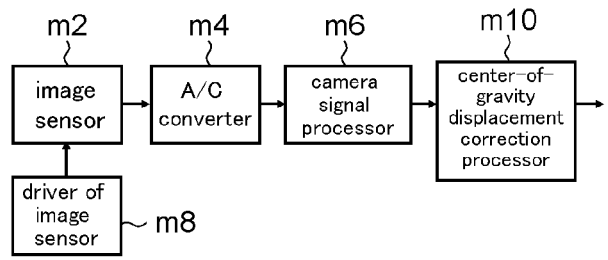
FIG. 43A is an illustration (1) of a conventional technique for correcting pixel data distribution.
Figure 43B:
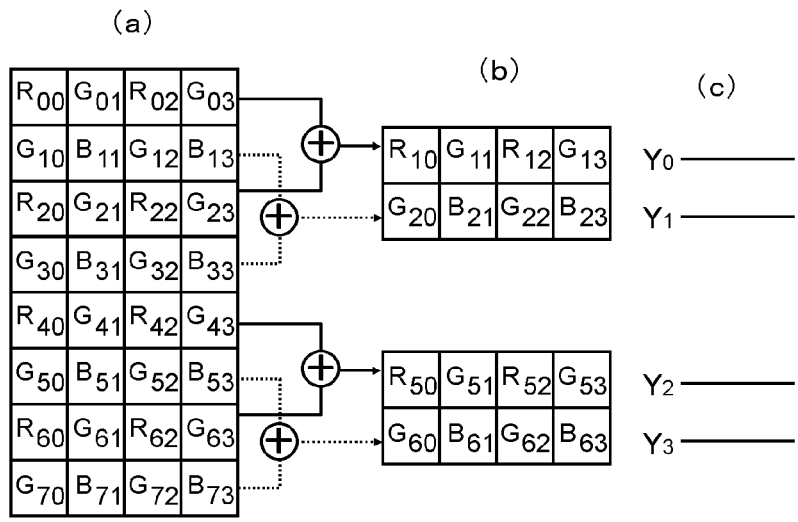
FIG. 43B is an illustration (2) of the conventional technique for correcting pixel data distribution.
Figure 43C:
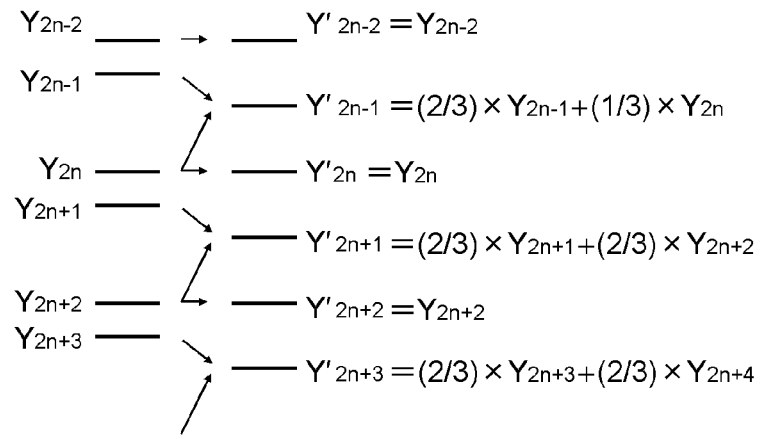
FIG. 43C is an illustration (3) of the conventional technique for correcting pixel data distribution.

The horizontal resizing process in the RGB Bayer array was so far described. However, the invention is applicable to the honeycomb array. When the data is extracted per line in the honeycomb array in the illustration of FIG. 42B, R and B are periodically repeated in odd-numbered lined, however, even-numbered lines are G-continuous lines. Though no color modulating components exist in the even-numbered lines, the G signal may be handled as the line luminance data and used for the process in the method according to the invention. In the G-continuous even-numbered lines where no modulating components exist, the color array reproduction processor 30 re-synthesizes the data with the output gain set to 0 by the color carrier extraction filtering processor 12. Then, a resized RB line data where R and B are repeated per pixel is outputted, and a resized G line data where information of G continues is outputted.

The function of horizontal distribution equalization illustrated in FIG. 6 is used to perform the two steps illustrated in FIG. 5 (b); distribution equalization processes H11 and V11. When the data is read from the frame memory FM1, the data is read in the vertical direction orthogonal to the direction where the data is written and inputted to the distribution equalization process V11. Thus, the vertical distribution equalization process V11 performs the same process as the horizontal distribution equalization process H11. Because the same process as the horizontal distribution equalization process H11 is performed as the vertical distribution equalization process V11, the distribution equalization process is simplified.

A detailed description is given to an example where the line memory LM1 having a plurality of lines is used as an inter-stage buffer between the resizing processes H12 and V12 as illustrated in FIG. 5 (c).

Figure 16A:
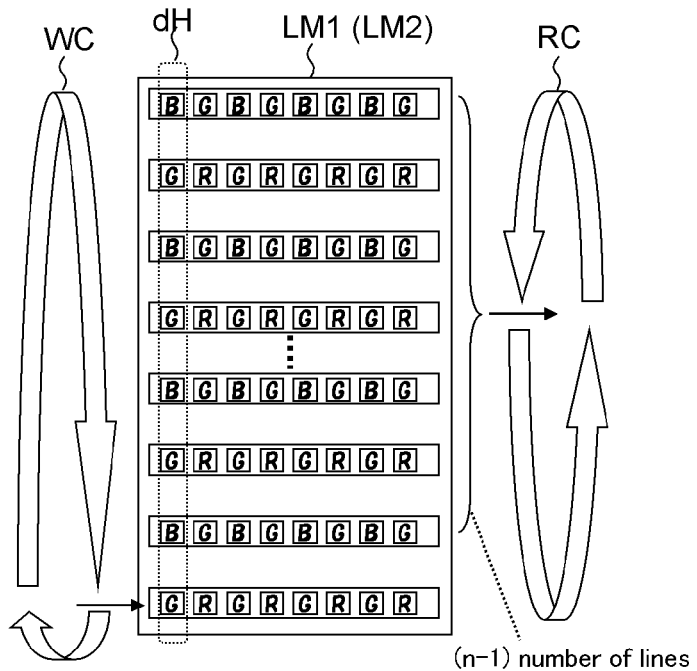
FIG. 16A is an illustration (1) of writing and reading operations in a line memory provided as an inter-stage buffer of two resizing processing steps according to the example 1.
Figure 16B:
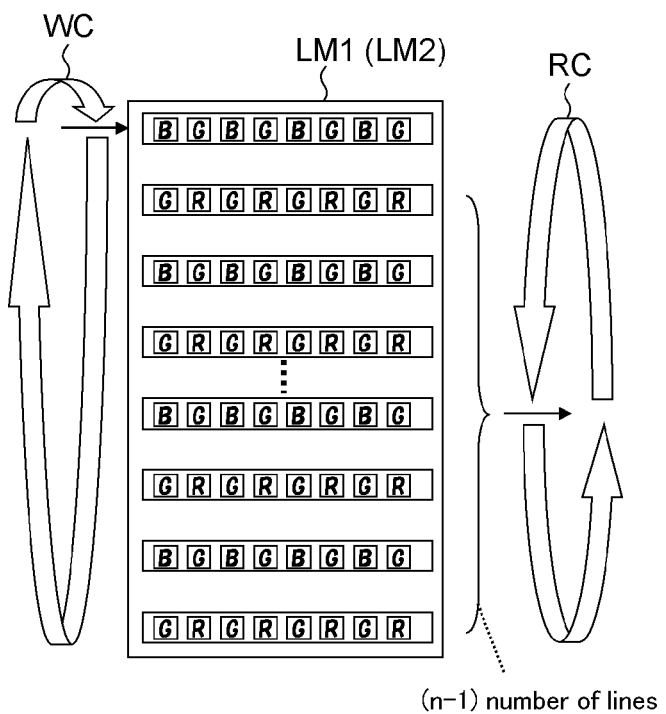
FIG. 16B is an illustration (2) of writing and reading operations in the line memory provided as an inter-stage buffer of two resizing processing steps according to the example 1.

FIG. 16A illustrates an operation for data writing and reading with respect to the line memory LM1. FIG. 16B illustrates an operation for data writing and reading with respect to the line memory LM1 when a next line data is processed. A reference symbol LM1 is a line memory having n number of lines. A reference symbol WC is a data-write cycle with respect to the line memory LM1, in which the data is written in each of the n number of lines cyclically in a ring-like orbit. A reference symbol RC is a data-read cycle with respect to the line memory LM1, in which the memory data of (n−1) number of lines in all of the n number of lines are collectively selected and read cyclically in a ring-like orbit in a manner similar to the data writing. According to the described operation, the data-write lines and the data-read lines are separated so that the data writing and the data reading are asynchronously performed.

Of the RAW data D12 to which the horizontal distribution equalization process is already completed, the RAW data of plural lines are collectively read from the line memory LM1. Then, the vertical distribution equalization process V12 is vertically performed to data dH at horizontally equal positions on the plural lines to finally obtain the RAW data d13 having pixels uniformly distributed. The vertical distribution equalization process V12 performed then is different to the horizontal distribution equalization process H12 in that pixels of interest in the plural lines are arbitrarily processed while being subjected to the vertical distribution equalization process, and the processed data is pipeline-outputted in the horizontal direction. By using the line memory LM1 having plural lines, plural color array data for plural lines are written and the data for plural lines are read at the same time. This improves a processing speed.

FIG. 17 illustrates details of the vertical distribution equalization process V12 illustrated in FIG. 15 (c) when the line memory LM1 of FIGS. 16A and 16B is used. The vertical distribution equalization process V12 performs the pipeline process for one line in the horizontal direction while vertically performing the distribution equalization process to the pixels of interest. Similarly to the horizontal distribution equalization process H12 illustrated in FIG. 6, this vertical distribution equalization process V12 include two different processes; luminance signal process, and color carrier extraction process.

The illustrated example processes a vertical processing target unit dH1, dH2 each containing nine pixels at horizontally equal positions in the vertical direction in nine lines of the inputted RAW data. More specifically, provided are; a color carrier removal filtering processor 41 for vertically extracting three different kinds of vertical luminance data d12 (Y1, Y2, and Y3) on a line of interest and lines above and below the line of interest in the vertical direction from nine lines of the RAW data, a color carrier extraction filtering processor 42 for extracting a color carrier data d14 of the line of interest in the vertical direction, a vertical distribution equalization processor 43 for generating a line luminance data d13 by vertically performing the distribution equalization process using the three different kinds of vertical luminance data d12 (Y1, Y2, and Y3), and a color array reproduction processor 44 for generating a RAW line data d15 having pixels vertically uniformly distributed by re-synthesizing the line luminance data d13 having the pixel data distribution corrected to be vertically uniform with the color carrier data d14.

The color carrier removal filtering processor 41 and the color carrier extraction filtering processor 42 correspond to the second filtering processor b1 illustrated in FIG. 1, the vertical distribution equalization processor 43 corresponds to the luminance distribution equalization processor b2 illustrated in FIG. 1, and the color array reproduction processor 44 corresponds to the second color array reproduction processor b7 illustrated in FIG. 1. The vertical luminance data d12 (Y1, Y2, and Y3) corresponds to the third luminance data, the color carrier data d14 corresponds to the second color carrier data, the line luminance data d13 corresponds to the fourth luminance data, and the RAW line data d15 corresponds to the second multiple-color array data.

A description is given below to an example in which a Bayer array image is processed by the function of vertical distribution equalization. Similarly to the illustration of FIG. 6, this process is performed to capture moving images of the processed RAW data.

As illustrated in the vertical processing target unit dH1, dH2 of FIG. 17, the RAW data obtained by four pixels after the horizontal distribution equalization process is performed thereto is data having a mosaic-like pattern reflecting pixel positions of the Bayer array in which the pixel data distribution is not uniform in the vertical direction. Because of the simultaneous data input with respect to plural lines, the four-pixel-mixed RAW data after the horizontal distribution equalization process is performed thereto is cyclically written in the line memory LM1 per line and cyclically read for plural lines as illustrated in FIG. 16.

Of the data at horizontally equal positions in the vertical direction on the respective lines of inputted data for nine lines after the horizontal distribution equalization process is performed, the vertical processing target unit dH1 is an array of BG data having information of B and information of G repeated per pixel in the vertical direction, and an array of GR data having information of G and information of R repeated per pixel in the vertical direction. These two data arrays are repeatedly arranged in the horizontal direction.

These two vertical data arrays have information of color carriers near the Nyquist frequency that changes based on the cycle of two pixels in the vertical direction. To generate the three different kinds of vertical luminance data d12 (Y1, Y2, and Y3) on the line of interest and lines thereabove and therebelow, the color carrier removal filtering processor 41 for color carrier removal performs the filtering process by using the data of seven pixels in the vertical processing target unit dH1. The three different kinds of vertical luminance data d12 (Y1, Y2, and Y3) representing B and G average values are outputted from the vertical processing target unit dH1, and the three different kinds of vertical luminance data d12 (Y1, Y2, and Y3) representing G and R average values are outputted from the next vertical processing target unit dH2.

As to the two different vertical processing target units dH1, dH2, the color carrier data d14 of the (B−G) component modulated by the Nyquist frequency are outputted from the BG-repeated lines, and the color carrier data d14 of the (G−R) component modulated by the Nyquist frequency are outputted from the GR-repeated lines.

To correct the pixel data distribution to be vertically uniform in the luminance data and the color carrier data, the color carrier extraction filtering processor 42 performs a filtering process having vertically symmetrical coefficients centered on the fifth line in the middle of nine lines. The vertical distribution equalization processor 43 vertically performs the distribution equalization process to the pixel data distribution in each of the three different vertical luminance data d1 (Y1, Y2, and Y3) extracted in the vertical direction.

Fig. illustrates the vertical distribution equalization processor 43 wherein the luminance value of pixel data in an even-numbered line is subjected to the pseudo interpolation process in a manner shifted to lower side on coordinates and the luminance value of pixel data in an odd-numbered line is subjected to the pseudo interpolation process in a manner shifted to upper side on coordinates by using the three different vertical luminance data d1 (Y1, Y2, and Y3) extracted in the vertical direction.

The principle of the process hereinafter described is similar to that of the horizontal process described earlier, only that a time of delay is a one-line period instead of a one-pixel delay, and the three different vertical luminance data d1 (Y1, Y2, and Y3) are inputted to vertically perform the distribution equalization process.

In the vertical luminance data d12 (Y1, Y2, and Y3) in which the pixel data distribution is non-uniform in the vertical direction, a line of interest is called Y2, a line above the line of interest is called Y1, and a line below the line of interest is called Y3. The inputted luminance data Y1 is multiplied by the coefficient $\beta$ by a multiplier 46, and the inputted luminance data Y2 is multiplied by the coefficient $\alpha$ by a multiplier 45. The results thereby obtained are added by an adder 47, and the obtained result is divided by ($\alpha+\beta$) by a first divider 48.

Then, the inputted luminance data Y3 is multiplied by the coefficient $\beta$ by a multiplier 50, and the luminance data Y2 is multiplied by the coefficient $\alpha$ by a multiplier 49. The results thereby obtained are added by an adder 51, and the obtained result is divided by ($\alpha+\beta$) by a second divider 52. A line switching unit 53 for output selects one of the data outputted from the first divider 48 and the data outputted from the second divider 52 for pixels per line.

Hereinafter is described the distribution equalization process wherein the luminance value of pixel data in an even-numbered line is subjected to the pseudo interpolation process in a manner shifted to lower side on coordinates and the luminance value of pixel data in an odd-numbered line is subjected to the pseudo interpolation process in a manner shifted to upper side on coordinates. When the inputted line luminance data Y2 is the data of an odd-numbered line, the line switching unit 53 selects the data outputted from the first divider 48 and outputs the selected data for a one-line period. When the inputted line luminance data Y2 is the data of an even-numbered line, the line switching unit 53 selects the data outputted from the second divider 52 and outputs the selected data for a one-line period. This process can interpolate the luminance value of pixel data in the even-numbered line by employing the pseudo shift to lower side on coordinates and interpolate the luminance value of pixel data in the odd-numbered line by employing the pseudo shift to upper side on coordinates.

Because the non-uniform distribution of pixel data in the vertical direction due to the four-pixel mixing is corrected by linear interpolation between two adjacent line data, the coefficient $\alpha$ used by the multipliers 45 and 62 and the coefficient $\beta$ used by the multipliers 46 and 63 are logically $\alpha:\beta=5:1$. To simplify the division by the divider 48, 65, ($\alpha+\beta$) may be set to the power-of-two ($2^n$), 32 or 64, for example, $\alpha:\beta=27:5$ or $\alpha:\beta=53:11$ as an approximate value.

The line switching unit 53 for output selects the output line as described below when the luminance value of the pixel data in an even-numbered line is subjected to the pseudo interpolation process in a manner shifted to lower side on coordinates. When the data of the line of interest of Y2 is the luminance data of an odd-numbered line, the data is through-outputted via a signal line illustrated with a two-dot chain line. When the data of the line of interest of Y2 is the luminance data of an even-numbered line, the data outputted from the second divider 52 is selected. These two processes are performed alternately for pixels per line. An output signal wire of the divider 48 is not used. Because the non-uniform distribution of pixel data is corrected by linear interpolation between two adjacent line data, the coefficient $\alpha$ of the multiplier 49 and the coefficient $\beta$ of the multiplier 50 are logically $\alpha:\beta=2:1$. To simplify the division by the divider 52, ($\alpha+\beta$) may be set to the power-of-two ($2^n$), 16, for example, $\alpha:\beta=10:6$ or $\alpha:\beta=11:5$ as an approximate value.

The line switching unit 53 for output selects the output line as described below when the luminance value of the pixel data in an odd-numbered line is subjected to the pseudo interpolation process in a manner shifted to upper side on coordinates. When the data of the line of interest of Y2 is the luminance data of an even-numbered line, the data is through-outputted via a signal line illustrated with a two-dot chain line. When the data of the line of interest of Y2 is the luminance data of an odd-numbered line, the data outputted from the first divider 48 is selected. These two processes are performed alternately for pixels per line. An output signal wire of the divider 52 is not used. Because the non-uniform distribution of pixel data is corrected by linear interpolation between two adjacent line data, the coefficient $\alpha$ of the multiplier 45 and the coefficient $\beta$ of the multiplier 46 are logically $\alpha:\beta=2:1$. To simplify the division by the divider 48, ($\alpha+\beta$) may be set to the power-of-two ($2^n$), 16, for example, $\alpha:\beta=10:6$ or $\alpha:\beta=11:5$ as an approximate value.

Back to the illustration of FIG. 17, the line luminance data d13 having the pixel data distribution corrected to be vertically uniform by the vertical distribution equalization processor 43 is added to and thereby re-synthesized with the color carrier data d14 by the color array reproduction processor 44. As a result, the BG-repeated line data d15 having pixels vertically uniformly distributed is obtained for the vertical processing target unit dH1, in which information of B and information of G are vertically repeated per pixel (GR line data d15). As a result of the process, the RAW data having the pixel data distribution corrected to be uniform in the horizontal and vertical directions both is obtained.

The image data thus obtained (d15) by performing the distribution equalization process to the RAW data is inputted to the image signal processor 10 illustrated in FIG. 27 to be signal-processed, so that the image data is converted into an image to be ultimately obtained, for example, a moving image.

Figure 19A:
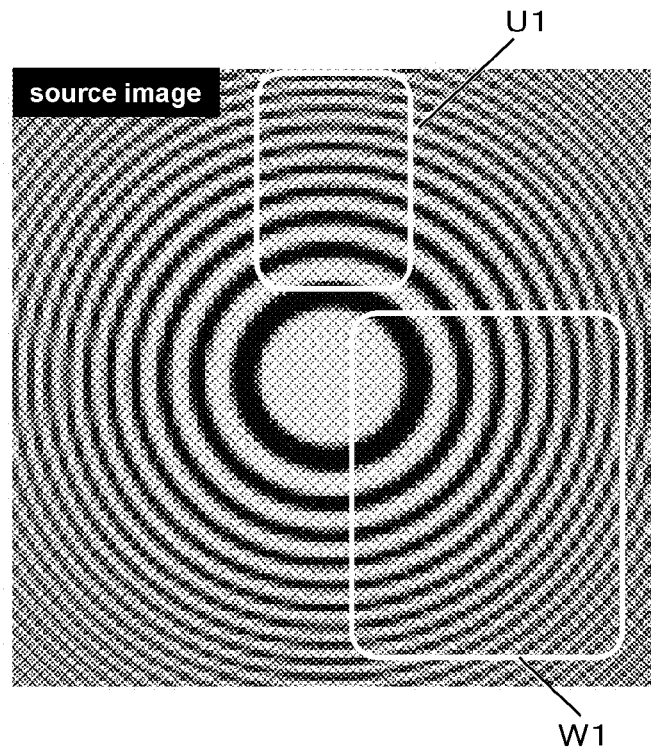
FIG. 19A is an illustration (1-1) of a distribution equalization result of the RAW data according to the example 1 obtained by subjecting a CZP (circular zone plate) image to the distribution equalization process in horizontal and vertical directions.
Figure 19B:
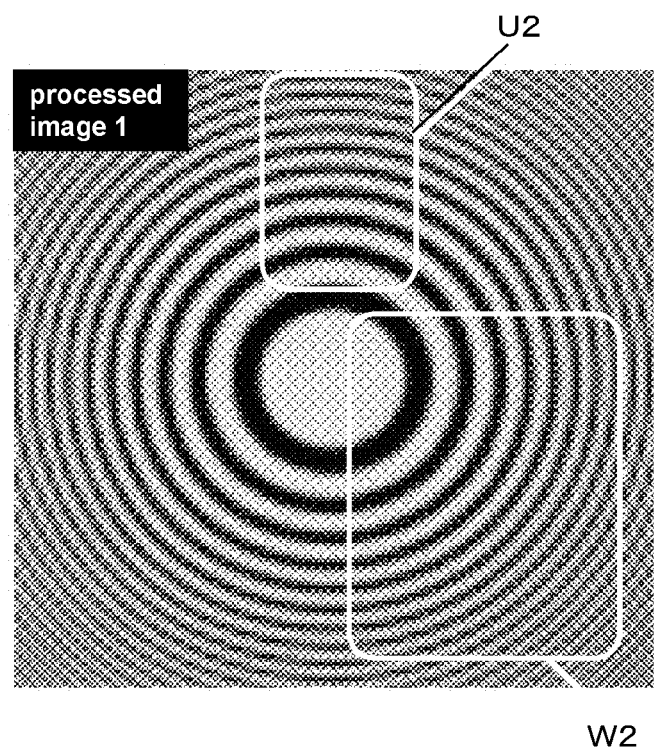
FIG. 19B is an illustration (1-2) of a distribution equalization result of the RAW data according to the example 1 obtained by subjecting a CZP (circular zone plate) image to the distribution equalization process in horizontal and vertical directions.

FIGS. 19A and 19B illustrate distribution equalization results of four-pixel-mixed RAW data of the Bayer array actually obtained by subjecting CZP (circular zone plate) images to the distribution equalization process according to the invention in the horizontal and vertical directions. The processed image of FIG. 19A is the Bayer array RAW data obtained by mixing four pixels on the image sensor (source image: high frequency components not emphasized). The processed image of FIG. 19B is the Bayer array RAW data obtained by mixing four pixels on the image sensor after the distribution equalization process according to the invention is performed thereto (high frequency components emphasized).

Figure 20A:
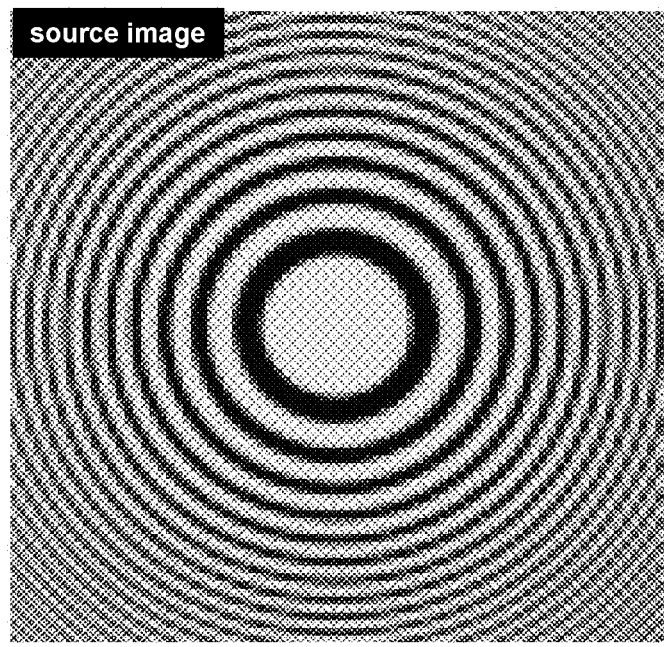
FIG. 20A is an illustration (2-1) of a distribution equalization result of the RAW data according to the example 1 obtained by subjecting a CZP image to the distribution equalization process in horizontal and vertical directions.
Figure 20B:
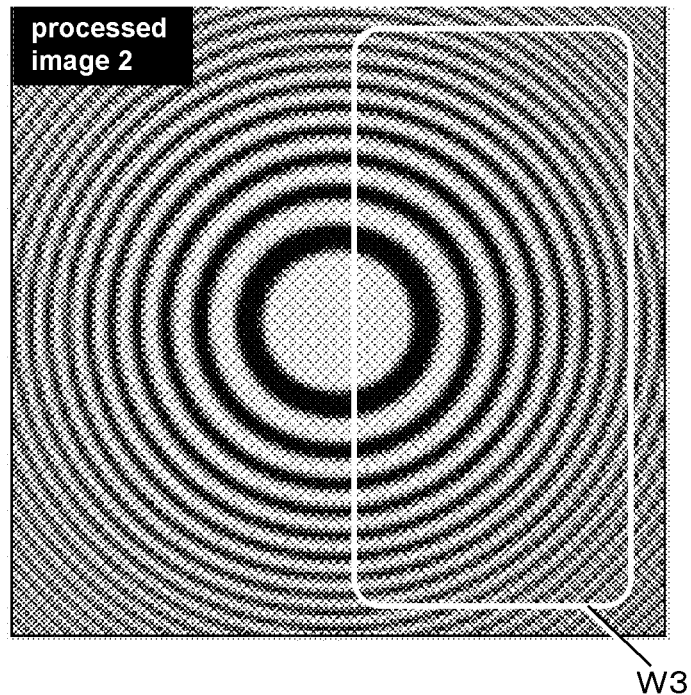
FIG. 20B is an illustration (2-2) of a distribution equalization result of the RAW data according to the example 1 obtained by subjecting a CZP image to the distribution equalization process in horizontal and vertical directions.

Comparing a region U1 and a region W1 illustrated in FIG. 19A respectively to a region U2 and a region W2 illustrated in FIG. 19B, it is known that the RAW data, in which aliasing-caused jaggy generated by mixing four pixels is reduced, can be obtained from the four-pixel-mixed RAW data. After the high frequency components are emphasized, aliasing-caused jaggy due to the four-pixel mixing is further reduced as illustrated in a region W3 of FIG. 20B. This ensures a smooth and continuous image quality.

According to the example described so far, the occurrence of false luminance signals and false colors is reduced, and a finely-resolved image is obtained by processing the source image RAW data outputted by an even number of pixels, for example, four pixels and thereby having the pixel data distribution non-uniform in the two-dimensional directions.

Example 2

Figure 21:
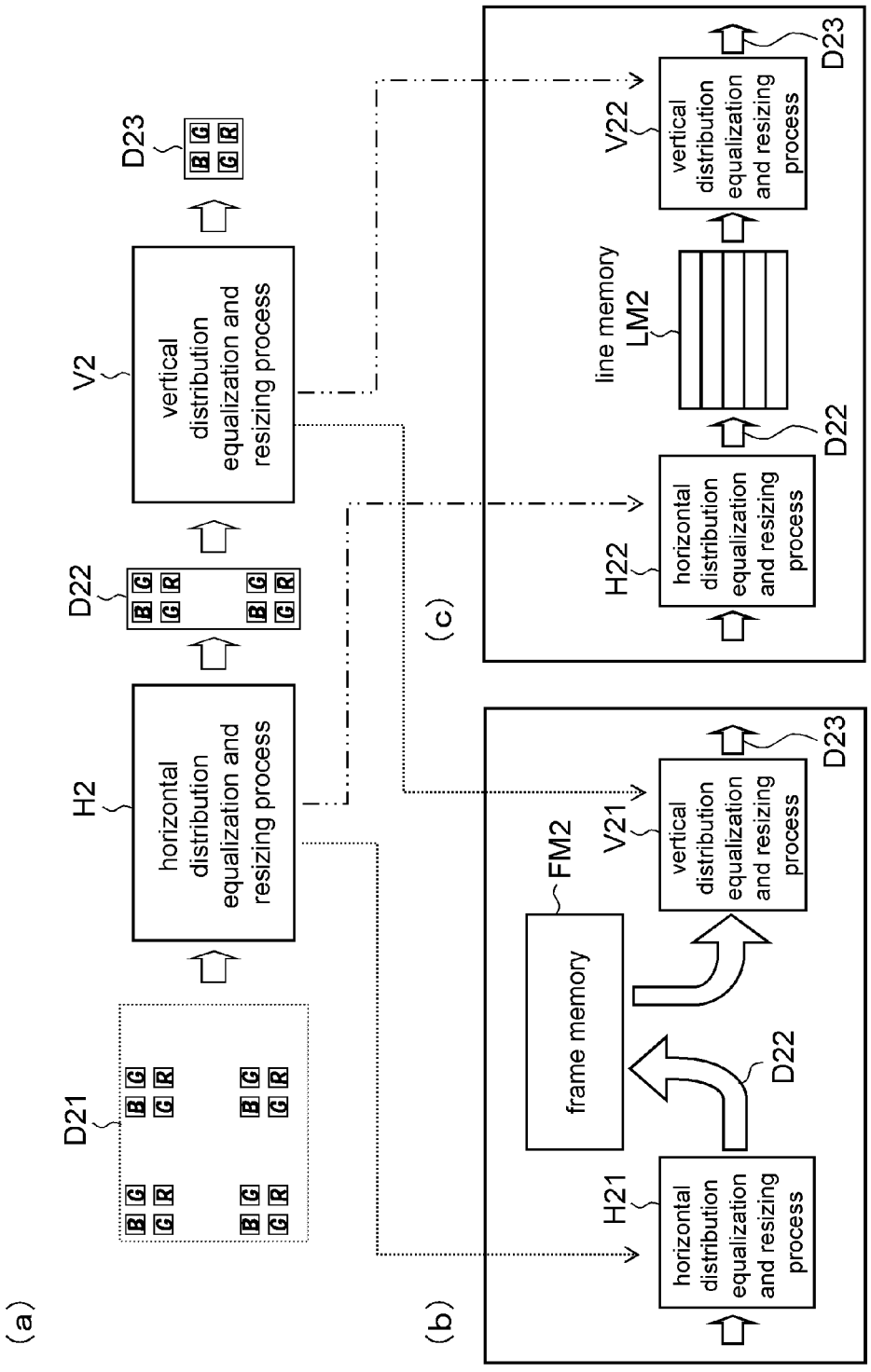
FIG. 21 is a schematic illustration of distribution equalization and resizing processing steps for RAW data obtained by mixing four pixels according to an example 2 of the invention.

Hereinafter is described an example 2 of the image processing device and the image processing method. FIG. 21 (*a*) schematically illustrates a distribution equalization and resizing process performed to four-pixel-mixed RAW data by a pre-processor 7 of an image pickup apparatus A illustrated in FIG. 27.

As illustrated in FIG. 21 (*a*), a RAW data D21 obtained by mixing four pixels, which is a single-plate source image data (in the form of a plane), is subjected to two processes; horizontal distribution equalization and resizing process H2, and vertical distribution equalization and resizing process V2. Then, a RAW data D22 resized and having pixels uniformly distributed in the horizontal direction is obtained from the four-pixel-mixed RAW data D21 after the horizontal distribution equalization and resizing process H2 is performed. Further, a RAW data D23 resized and having pixels uniformly distributed in the vertical direction is obtained from the four-pixel-mixed RAW data D21 after the vertical distribution equalization and resizing process V2 is performed.

Below are described two different modes of the horizontal distribution equalization and resizing process H2 and vertical distribution equalization and resizing process V2 respectively including two steps. FIGS. 21 (b) and (c) respectively schematically illustrate the two modes.

In the mode illustrated in FIG. 21 (b), a frame memory FM2 is used as a buffer for two distribution equalization and resizing processes H21 and V21. All of the RAW data D22 after the horizontal distribution equalization and resizing process H2 is performed thereto are tentatively written in the frame memory FM2. When the RAW data D22 is read from the frame memory FM2, the RAW data D22 is read in the vertical direction orthogonal to a direction where the data is written and subjected to the vertical distribution equalization and resizing process V21 to obtain the RAW data D23 resized and having the pixel data distribution corrected to be uniform. According to the mode, the vertical distribution equalization and resizing process V11 performs the same process as the horizontal distribution equalization and resizing process H21.

According to the mode illustrated in FIG. 21 (c), a line memory LM2 having a plurality of lines is used as a buffer for two distribution equalization and resizing processes H22 and V22 so that these two processes are performed as pipeline processes (parallel processes). While the horizontal distribution equalization and resizing process H22 is being performed, the data outputted from the process is written in the line memory LM2. At the same time, the RAW data D22 for plural lines are read from the line memory LM2, and the data at horizontally equal positions on the plural lines are subjected to the vertical distribution equalization and resizing process V22 vertically performed to obtain the RAW data D23 having the pixel data distribution corrected to be uniform in the vertical direction. The described vertical distribution equalization and resizing process V22 is a process different to the horizontal distribution equalization and resizing process H22.

Figure 22:
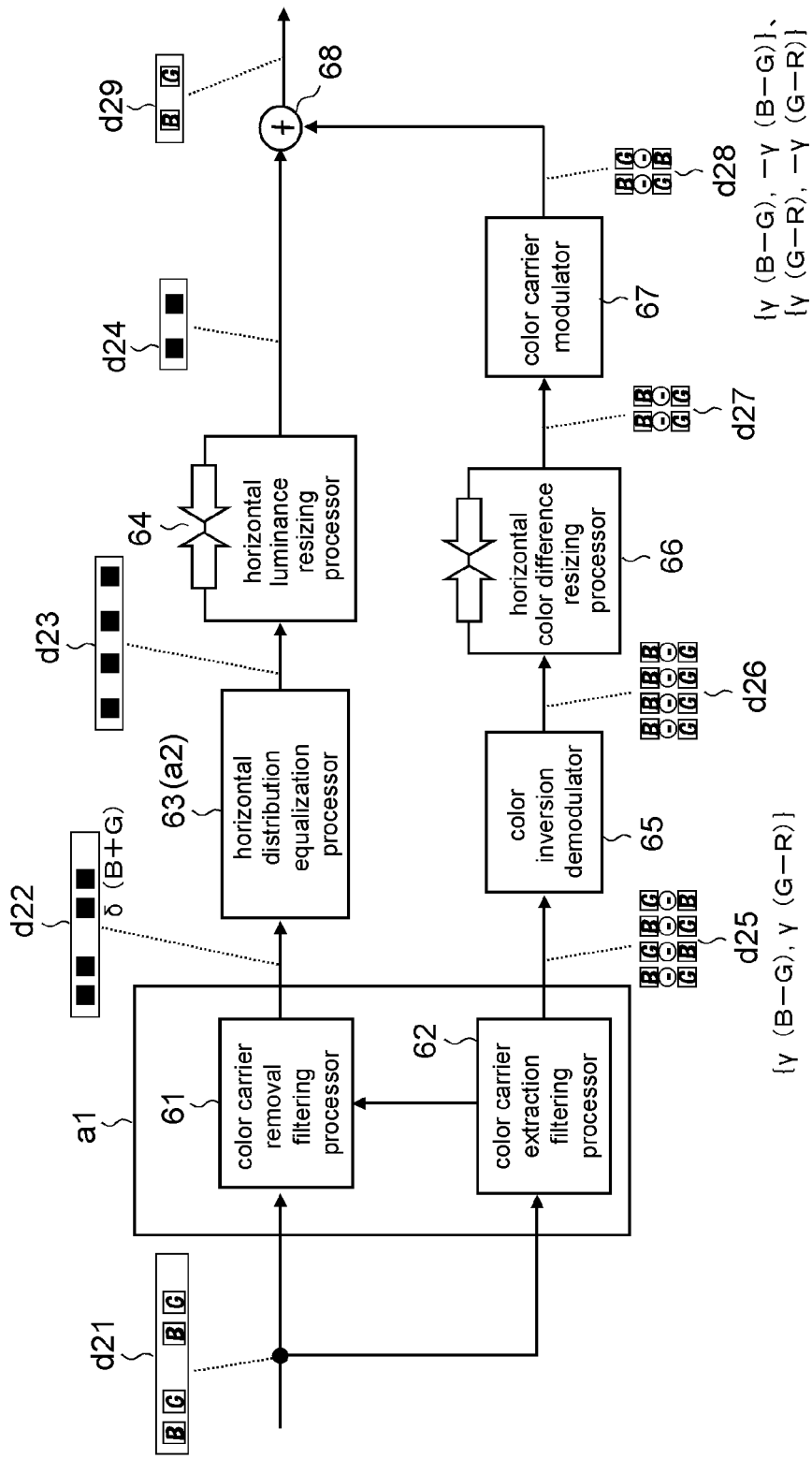
FIG. 22 is a block diagram illustrating a horizontal distribution equalization and resizing process according to the example 2.

The horizontal distribution equalization and resizing process H2 is described in detail referring to FIG. 22. The horizontal distribution equalization and resizing process H2 is a one-dimensional pipeline process in which a pixel-based process is performed on lines. Provided are; a color carrier removal filtering processor 61 for extracting a line luminance data d22 that is a continuous data from a BG-/GR-repeated line data d21 of the four-pixel-mixed RAW data, a color carrier extraction filtering processor 62 for extracting a line color carrier data d25 that is a continuous data having BG/GR repeated per line from the line data d21, a horizontal distribution equalization processor 63 for generating a line luminance data d3 by horizontally performing the distribution equalization process to the line luminance data d22 (corresponding to the first luminance distribution equalization processor a2 illustrated in FIG. 2), a horizontal luminance resizing processor 64 for generating a line luminance data d24 by performing a reducing process to the line luminance data d23 having the pixel data distribution corrected to be uniform, a color inversion demodulator 65 for generating a line color difference data d26 that is a continuous data by demodulating for color inversion the modulated line color carrier data d25, a horizontal color difference resizing processor 66 for generating a line color difference data d27 by performing the reducing process to the line color difference data d26, a color carrier modulator 67 for reconverting the resized line color difference data d27 into a BG-/GR-repeated line color carrier data d28, and a color array reproduction processor 68 for generating a line data d29 having pixels horizontally uniformly distributed by re-synthesizing the line luminance data d24 outputted from the horizontal luminance resizing processor 64 with the line color carrier data d28.

Figure 2:
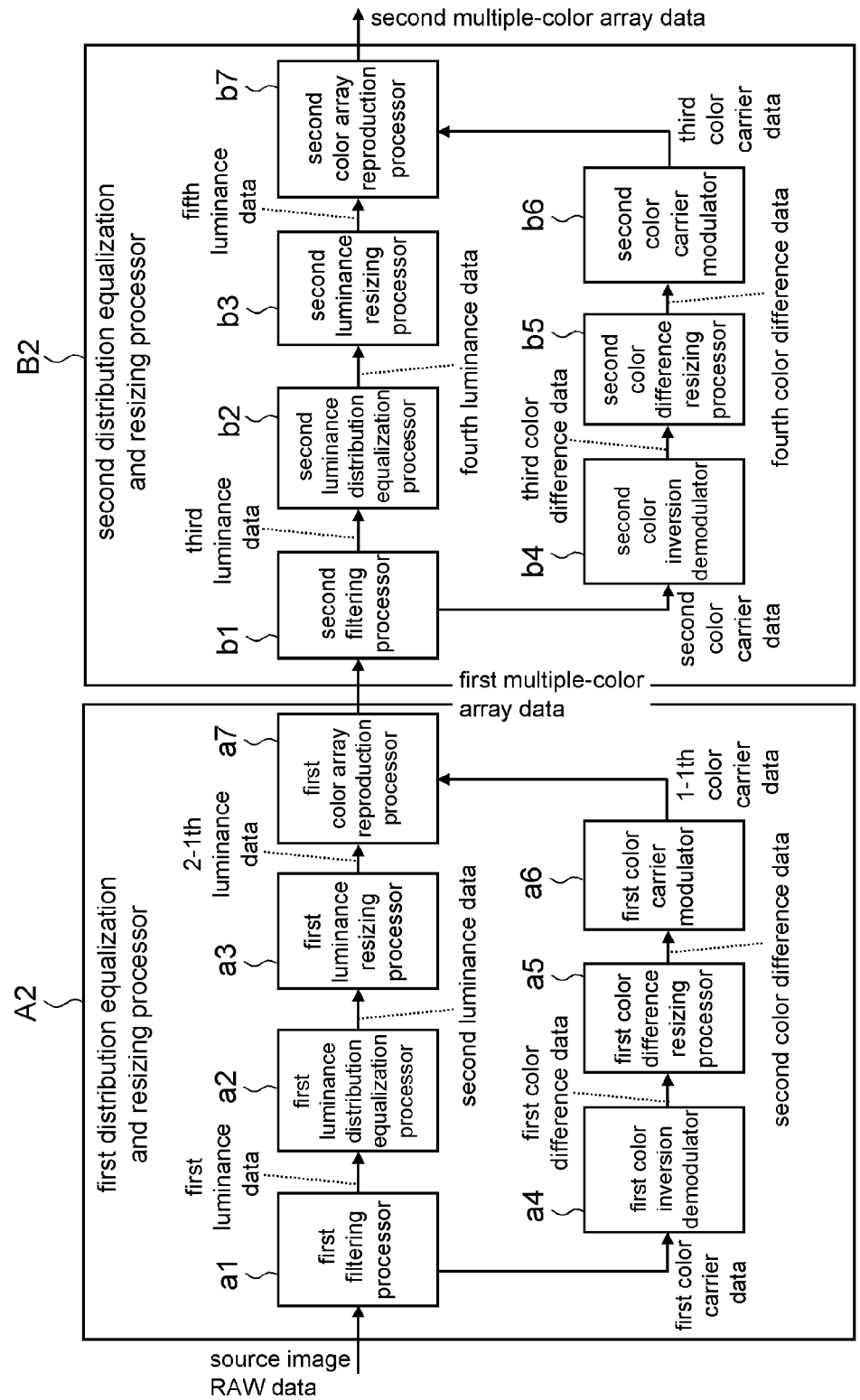
FIG. 2 is a block diagram illustrating a second basic structure of the image processing device according to the invention.

The color carrier removal filtering processor 61 and the color carrier extraction filtering processor 62 correspond to the first filtering processor a1 illustrated in FIG. 2. The horizontal distribution equalization processor 63 corresponds to the first luminance distribution processor a2 illustrated in FIG. 2. The horizontal luminance resizing processor 64 corresponds to the first luminance resizing processor a3 illustrated in FIG. 2. The color inversion demodulator 65 corresponds to the first color inversion demodulator a4 illustrated in FIG. 2. The horizontal color difference resizing processor 66 corresponds to the first color difference resizing processor a5 illustrated in FIG. 2. The color carrier modulator 67 corresponds to the first color carrier modulator a6 illustrated in FIG. 2. The color array reproduction processor 68 corresponds to the first color difference resizing processor a7 illustrated in FIG. 2. The line data d21 corresponds to the first multiple-color array data. The line luminance data d22 corresponds to the first luminance data. The line color carrier data d25 corresponds to the first color carrier data. The line luminance data d23 corresponds to the second luminance data. The line luminance data d24 corresponds to the 2-1th luminance data. The line color difference data d26 corresponds to the first color difference data. The line color difference data d27 corresponds to the second color difference data. The line color carrier data d28 corresponds to the 1-1th color carrier data. The line data d29 corresponds to the first multiple-color array data.

Hereinafter is described an example in which a Bayer array image obtained by mixing four pixels is processed by using the horizontal distribution equalization and resizing processing function illustrated in FIG. 22. This process is performed to obtain moving images by using the high-pixel image sensor 4.

The inputted four-pixel-mixed RAW data is data having a mosaic-like pattern reflecting the Bayer array pixel positions. The RAW data is conventionally read from the image sensor 4 per line. The inputted data per line includes two kinds of data; a BG line data d21 having information of B and information of G repeated per pixel, and a GR line data d21 having information of G and information of R repeated per pixel not illustrated in the drawing. These two kinds of data are processed by the color carrier removal filtering processor 61 to remove color carriers near the Nyquist frequency that changes based on the cycle of two pixels. Then, the line luminance data d22 having an average value of B and G, $\{\delta(B+G)\}$, is outputted from the BG-repeated lines, and the line luminance data d22 having an average value of B and R, $\{\delta(G+R)\}$, is outputted from the GR-repeated lines not illustrated in the drawing ($\delta=\frac{1}{2}$). In the two different BG/GR line luminance data d22, the pixel data distribution is corrected by the horizontal distribution equalization processor 63 to output the line luminance data d23 of BG/GR having the pixel data distribution corrected to be uniform. The detailed technical characteristics of the horizontal distribution equalization processor 63 are similar to those of the horizontal distribution equalization processor 20 described earlier referring to FIG. 6.

The two different BG/GR line data 21 is processed by the color carrier extraction filtering processor 62 to extract the color carriers near the Nyquist frequency that changes based on the cycle of two pixels. As a result, the BG line color carrier data d25 modulated by the Nyquist frequency is outputted from the BG-repeated lines, and the GR line color carrier data d25 modulated by the Nyquist frequency is outputted from the GR-repeated lines not illustrated in the drawing.

The two different BG/GR line color carrier data d25 is data code-inverted per pixel, meaning that different colors are alternately arranged per pixel. Then, the line color carrier data d25 is code-inverted per pixel by the color inversion demodulator 65 so that the same colors are serially arranged. Then, the resulting data is outputted as the BG/GR line color difference data d26 that is a continuous data.

The line luminance data d23 having the pixel data distribution corrected to be uniform by the horizontal distribution equalization processor 63 is thinned by linear interpolation by the horizontal luminance resizing processor 64 in accordance with a reducing ratio. As a result, the line luminance data d24 resized and having the pixel data distribution corrected to be uniform is obtained. The line color difference data d26 is thinned by linear interpolation in accordance with the reducing ratio by the horizontal color difference resizing processor 66. As a result, the resized line color difference data d27 is obtained. These data are horizontally reduced in size in accordance with an equal reducing ratio.

The line color difference data d27 that is a continuous data having the same colors serially arranged and reduced in the horizontal direction, $\{\gamma(B-G),\gamma(G-R)\}$, is processed by the color carrier modulator 67. This data is code-inverted again per pixel, which is as an equivalent process in order to modulate the data using the Nyquist frequency that changes based on the cycle of two pixels. As a result, the line color carrier data d28 in which the periodicity of the color array is resumed, d28 $\{\gamma(B-G), -\gamma(B-G)\}$, and $\{\gamma(G-R),-\gamma(G-R)\}$, are obtained.

The line luminance data d24 resized and having the pixel data distribution corrected to be uniform is subjected to the re-synthesizing process (added to the resized line color carrier data d28) and outputted as the line luminance data d29 resized and having the pixel data distribution corrected to be uniform in which information of B and information of G are repeated per pixel. The line luminance data d24 resized and having the pixel data distribution corrected to be uniform is also outputted as the line data resized and having the pixel data distribution corrected to be uniform in which information of G and information of R are repeated per pixel not illustrated in the drawing.

Expressing the data re-synthesis in the BG-repeated line using numerical expressions, provided that $\delta=0.5$ and $\gamma=0.5$, the line luminance data resized and having the pixel data distribution corrected to be uniform, $\{\delta(B+G)\}$, and the line color carrier data, $\{\gamma(B-G),-\gamma(B-G)\}$, respectively result in the line luminance data resized and having the pixel data distribution corrected to be uniform, $\{0.5(B+G)\}$, and the line color carrier data, $\{0.5(B-G),-0.5(B-G)\}$. Adding the luminance data and the color carrier data per pixel, $0.5\{(B+G)+(B-G)\}$, $0.5\{(B+G)-(B-G)\}$, . . . are repeated. Thus, the line data d29 resized and having the pixel data distribution corrected to be uniform is obtained, in which B, G, B, G, . . . are repeated.

Expressing the data re-synthesis in the GR-repeated line using numerical expressions, provided that $\delta=0.5$ and $\gamma=0.5$, the line luminance data resized and having the pixel data distribution corrected to be uniform, $\{\delta(G+R)\}$, and the line color carrier data, $\{\gamma(G-R),-\gamma(G-R)\}$, respectively result in the line luminance data resized and having the pixel data distribution corrected to be uniform, $\{0.5(G+R)\}$, and the line color carrier data, $\{0.5(G-R),-0.5(G-R)\}$. Adding the luminance data and the color carrier data per pixel, $0.5\{(G+R)+(G-R)\}$, $0.5\{(G+R)-(G-R)\}$, . . . are repeated. Thus, the line data d29 resized and having the pixel data distribution corrected to be uniform is obtained, in which R, G, R, G, . . . are repeated.

The luminance data and the color carrier data are gain-adjusted before the addition process by using $\delta$ and $\gamma$ as the coefficients, respectively, so that the gain of the synthesized data is equal to that of the inputted data. The purpose of this process is to generate an independent color component for RGB from the two signal components of the luminance signal and the color carrier signal. Therefore, the gain adjustment is not necessarily performed prior to the addition process but may be performed after the independent RGB component is generated.

The distribution equalization process and the resizing process horizontally performed in the RGB Bayer array was so far described. However, the invention is applicable to the honeycomb array in a manner similar to the example 1.

The function of distribution equalization process and the resizing process illustrated in FIG. 22 can be used when the two steps, distribution equalization and resizing processes H21 and V21 illustrated in FIG. 21 (b) are performed. When the data is read from the frame memory FM2, the data is read in the vertical direction orthogonal to the data-write direction and inputted to the distribution equalization and resizing process V21. Thus, the vertical distribution equalization and resizing process V21 performs the same process as the horizontal distribution equalization and resizing process H21. Because these processes perform the same process, the distribution equalization process and resizing is simplified.

Figure 23:
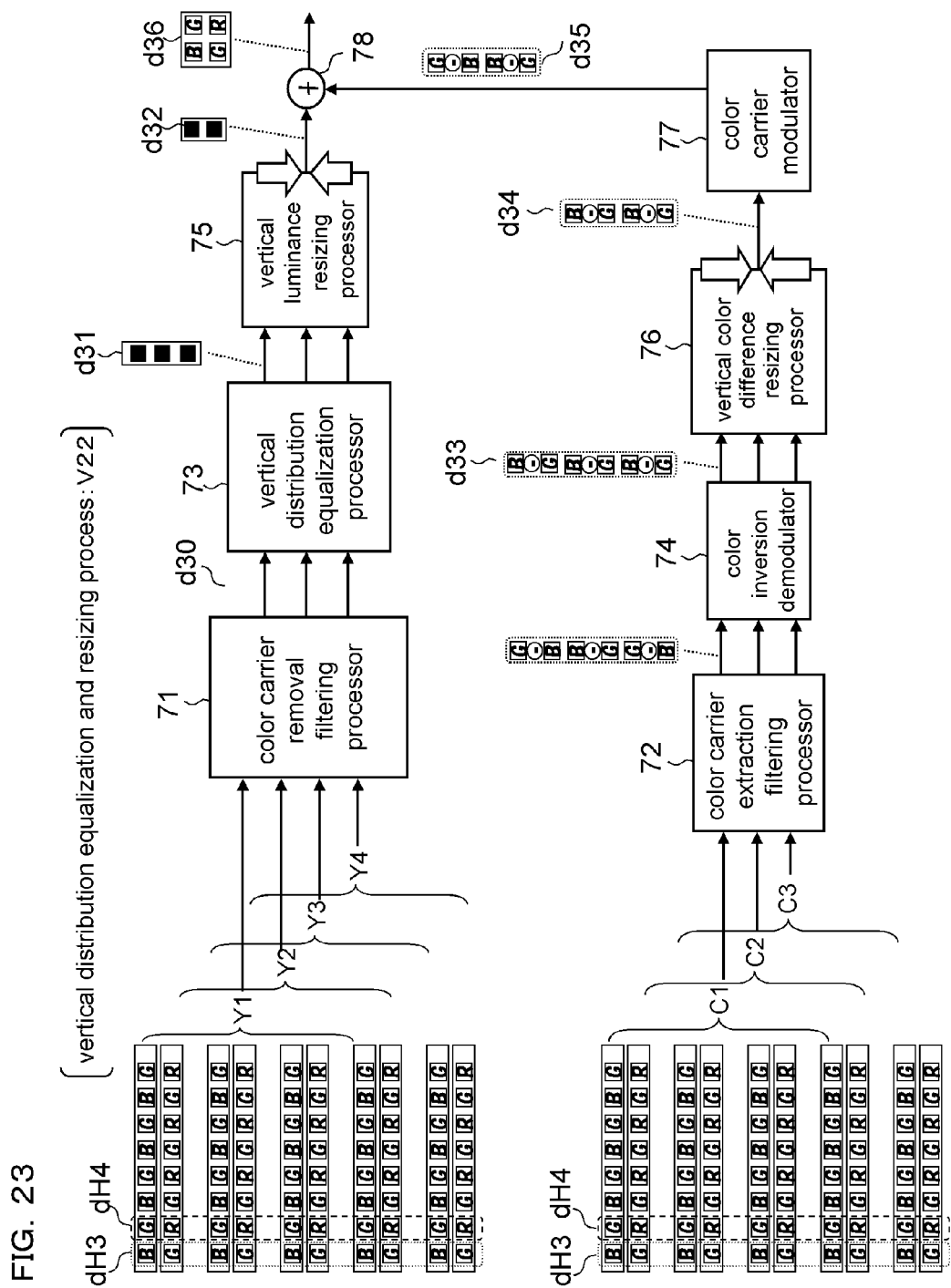
FIG. 23 is a block diagram illustrating a vertical distribution equalization and resizing process that uses a line memory according to the example 2.

Hereinafter is described in detail an example in which the line memory LM2 having plural lines is used as an inter-stage buffer of the two steps, distribution equalization and resizing processes H22 and V22 as illustrated in FIG. 21 (c). FIG. 23 illustrates data writing and reading operations with respect to the line memory LM2. These operations are controlled in a manner similar to the example 1.

FIG. 23 illustrates details of the vertical distribution equalization and resizing process V22 of FIG. 21 (c) by using the line memory LM2 of FIG. 21 (c) configured similarly to the line memory LM1 according to the example 1 illustrated in FIG. 16. Similarly to the example 1, the vertical distribution equalization and resizing process V22 performs a pipeline process for one line in the horizontal direction while vertically performing the distribution equalization process to the pixels of interest.

Similarly to the horizontal distribution equalization and resizing process H21 illustrated in FIG. 22, the vertical distribution equalization and resizing process V22 illustrated in FIG. 23 performs two different processes, that are the luminance signal process and the color carrier extraction process. The example 2 provides a plurality of luminance signal processes and a plurality of color carrier extraction processes in the vertical direction to perform the resizing process after the distribution process is performed.

The illustrated example processes a vertical processing target unit dH3, dH4 each containing 10 pixels at horizontally equal positions in the vertical direction in 10 lines of the inputted RAW data. Provided are; a color carrier removal filtering processor 71 for extracting at least four different kinds of vertical luminance data d30 (Y1, Y2, Y3, and Y4) on a line of interest and lines above and below the line of interest in the vertical direction from 10 lines of the RAW data, a color carrier extraction filtering processor 72 for extracting at least three different kinds of color carrier data C1, C2, and C3 on the line of interest and lines thereabove and therebelow in the vertical direction, a vertical distribution equalization processor 73 for outputting three different kinds of line luminance data d31 respectively having pixels vertically uniformly distributed by vertically performing the distribution equalization process in three stages to the four different kinds of vertical luminance data d30 (Y1, Y2, Y3, and Y4), a color inversion demodulator 74 for outputting three different kinds of color difference data d33 continuous in the vertical direction by demodulating for color inversion the three different kinds of color carrier data C1, C2, and C3 modulated in the vertical direction, a vertical luminance resizing processor 75 for outputting a line luminance data d32 resized and having the pixel data distribution corrected to be uniform in the vertical direction by vertically reducing the three kinds of line luminance data d31 vertically continuous and having the pixel data distribution corrected to be uniform in the vertical direction, a vertical color difference resizing processor 76 for outputting a GB line color difference data d34 by vertically reducing the three different kinds of color difference data d33 vertically continuous, a color carrier modulator 77 for outputting a vertical line color carrier data d35 by reconverting the resized color difference data d34 into color carrier data, and a color array reproduction processor 78 for generating a RAW data d36 to be finally obtained resized and having the pixel data distribution corrected to be uniform in the vertical direction by re-synthesizing the line luminance data d32 resized and having the pixel data distribution corrected to be uniform in the vertical direction.

The color carrier removal filtering processor 71 and the color carrier extraction filtering processor 72 correspond to the first filtering processor b1 illustrated in FIG. 2. The vertical distribution equalization processor 73 corresponds to the second luminance distribution equalization processor b2 illustrated in FIG. 2. The color inversion demodulator 74 corresponds to the second color inversion demodulator b4 illustrated in FIG. 2. The vertical luminance resizing processor 75 corresponds to the second luminance resizing processor b3 illustrated in FIG. 2. The vertical color difference resizing processor 76 corresponds to the second color difference resizing processor b5 illustrated in FIG. 2. The color carrier modulator 77 corresponds to the second color carrier modulator b6 illustrated in FIG. 2. The color array reproduction processor 78 corresponds to the second color array reproduction processor b7 illustrated in FIG. 2. The vertical luminance data d30 (Y1, Y2, Y3, and Y4) corresponds to the third luminance data, the color carrier data C1, C2, and C3 correspond to the second color carrier data, the line luminance data d31 corresponds to the fourth luminance data, the color difference data d33 corresponds to the third color carrier data, the line luminance data d32 corresponds to the fifth luminance data, the line color difference data d34 corresponds to the fourth color difference data, the vertical line color carrier data d35 corresponds to the third color carrier data, and the RAW data d36 corresponds to the second multiple-color array data.

Hereinafter is described an example in which a Bayer array image is processed by using the horizontal distribution equalization and resizing processing function illustrated in FIG. 23. This process is performed to record moving images of the processed RAW data.

As illustrated in the vertical processing target unit dH3, dH4 of FIG. 23, the four-pixel-mixed RAW data after the horizontal distribution equalization process is performed thereto is data having a mosaic-like pattern reflecting pixel positions of the Bayer array and having pixels vertically non-uniformly distributed. Because of the simultaneous data input with respect to plural lines, the four-pixel-mixed RAW data is cyclically written in the line memory LM1 per line as illustrated in FIG. 16 and cyclically read for plural lines similarly to the illustration of FIG. 16 according to the example 1. In the described example, the line memory LM2 having 11 lines is used, and the data of 10 lines are collectively outputted.

Of the vertical data at horizontally equal positions on the lines of the inputted data for 10 lines after the horizontal distribution equalization process is performed thereto, the vertical processing target unit dH3 is an array of BG data having information of B and information of G repeated per pixel in the vertical direction, and the vertical processing target unit dH4 is an array of GR data having information of G and information of R repeated per pixel in the vertical direction. These two data arrays are repeated in the horizontal direction.

These two vertical data arrays have information of color carriers near the Nyquist frequency that changes based on the cycle of two pixels in the vertical direction. To generate the four different kinds of vertical luminance data d30 (Y1, Y2, Y3, and Y4) on a line of interest and lines thereabove and therebelow in the vertical direction, The color carrier removal filtering processor 71 for color carrier removal performs the filtering process by using the data of seven pixels of the vertical processing target unit dH3. The four different kinds of vertical luminance data d30 (Y1, Y2, Y3, and Y4) representing B and G average values are outputted from the vertical processing target unit dH3, and the four different kinds of vertical luminance data d30 (Y1, Y2, Y3, and Y4) representing G and R average values are outputted from the next vertical processing target unit dH4.

The color carrier extraction filtering processor 72 provided to vertically extract color carriers near the Nyquist frequency that changes based on the cycle of two pixels outputs the color carrier data of the (B−G) component modulated by the Nyquist frequency as to the BG array, while outputting the color carrier data of the (G−R) component modulated by the Nyquist frequency as to the GR-repeated line. According to the example, the three different kinds of color carrier data C1, C2, and C3 on a line of interest and lines thereabove and therebelow are generated so that the vertical luminance resizing processor 75 subsequently performs the process by using linear interposition. The data C1, C2, and C3 are obtained by filtering the data of seven pixels shifted downward by one pixel from the top of the vertical processing target unit dH3.

To correct the pixel data distribution to be vertically uniform in the luminance data and the color carrier data, the color carrier removal filtering processor 71 and the color carrier extraction filtering processor 72 perform filtering processes having vertically symmetrical coefficients centered on the fifth line from the top of 10 lines as a line of interest.

The vertical distribution equalization processor 73 vertically performs the distribution equalization process by using the four different kinds of vertical luminance data d30 (Y1, Y2, Y3, and Y4) extracted in the vertical direction, thereby generating the three different kinds of line luminance data d31 each having the pixel data distribution corrected to be uniform and continuous in the vertical direction.

Figure 24:
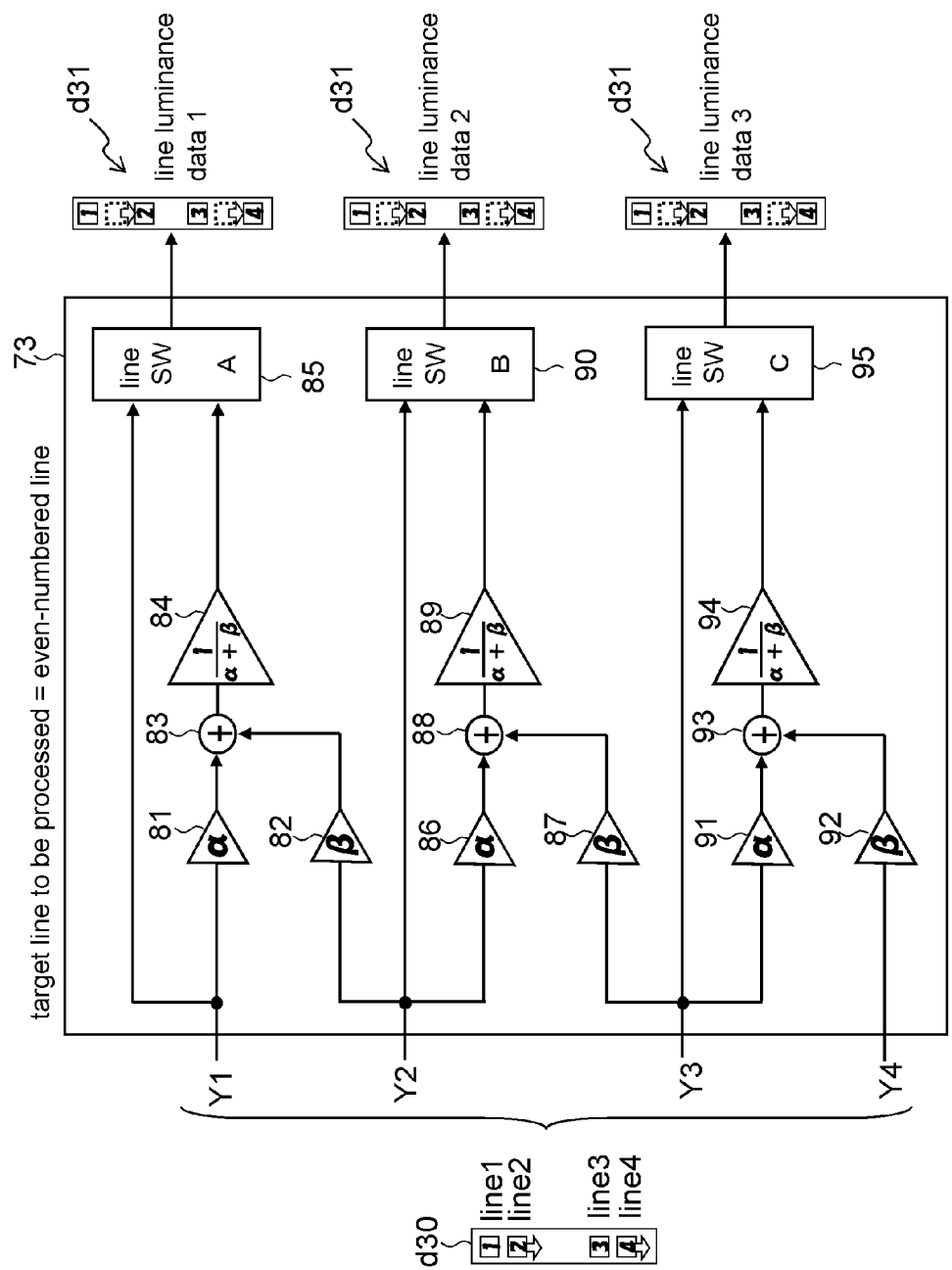
FIG. 24 is a block diagram illustrating a vertical distribution equalization processor according to the example 2 wherein the luminance value of pixel data in an even-numbered line is subjected to the pseudo interpolation process in a manner shifted to lower side on coordinates.

The distribution equalization process performed to correct the non-uniform pixel data distribution due to four-pixel mixing is basically similar to that of the example 1. In the example 1, the luminance data having the pixel data distribution corrected to be uniform on the line of interest alone is outputted in a single stage. In this example, the line luminance data having the pixel data distribution corrected to be uniform in the vertical direction for three lines including the line of interest and lines thereabove and therebelow are outputted so that the vertical luminance resizing processor 75 subsequently performs the process in which linear interpolation is used. FIG. 24 illustrates the vertical distribution equalization processor 73 wherein the luminance value of pixel data in an even-numbered line in the vertical direction is subjected to the pseudo interpolation in a manner shifted to lower side on coordinates.

The data Y1, Y2, Y3, and Y4 for four adjacent lines from the top down in the vertical direction of the image are inputted as data where pixel data is periodically but non-uniformly distributed.

The data Y1 is inputted to a line switching unit 85 and also inputted to a multiplier 81. The multiplier 81 multiplies the data Y1 by the coefficient α and inputs the multiplied data Y1 to an adder 83. The data Y2 is inputted to a multiplier 82. The multiplier 82 multiplies the data Y1 by the coefficient β and inputs the multiplied data Y1 to the adder 83. The adder 83 adds the multiplied data obtained by the multipliers 81 and 83 and inputs the added data to a divider 84. The divider 84 divides the added data by (α+β) and inputs the divided data to the line switching unit 85. The line switching unit 85 selects one of the data Y1 through-outputted and the divided data obtained by the divider 84 alternately in every other line and outputs the selected data.

The data Y2 is inputted to a line switching unit 90 and also inputted to a multiplier 86. The multiplier 86 multiplies the data Y2 by the coefficient α and inputs the multiplied data Y2 to an adder 88. The data Y3 is inputted to a multiplier 87. The multiplier 87 multiplies the data Y3 by the coefficient β and inputs the multiplied data Y3 to the adder 88. The adder 88 adds the multiplied data obtained by the multipliers 86 and 87 and inputs the added data to a divider 89. The divider 89 divides the inputted added data by (α+β) and inputs the divided data to the line switching unit 90. The line switching unit 90 selects one of the data Y2 through-outputted and the divided data obtained by the divider 89 alternately in every other line and outputs the selected data.

The data Y3 is inputted to a line switching unit 95 and also inputted to a multiplier 91. The multiplier 91 multiplies the data Y3 by the coefficient α and inputs the added data Y3 to an adder 93. The data Y4 is inputted to a multiplier 92. The multiplier 92 multiplies the data Y4 by the coefficient β and inputs the multiplied data Y4 to the adder 93. The adder 93 adds the multiplied data obtained by the multipliers 91 and 92 and inputs the added data to a divider 94. The divider 94 divides the inputted added data by (α+β) and inputs the divided data to the line switching unit 95. The line switching unit 95 selects one of the data Y3 through-outputted and the divided data obtained by the divider 94 alternately in every other line and outputs the selected data.

Hereinafter is described the distribution equalization process vertically performed to even-numbered lines of a source image. Of the inputted line luminance data d30, a line luminance data Line 2 and a line luminance data Line 4 of even-numbered lines in an upper part of a source image are subjected to the distribution equalization process in which linear interpolation is used. This corrects the distribution of pixel data non-uniform in the vertical direction of the source image. The data input is controlled in two different ways as follows.
1) The data of odd-numbered lines are inputted as the data Y1 and the data Y3, and the data of even-numbered lines are inputted as the data Y2 and the data Y4.
2) The data of even-numbered lines are inputted as the data Y1 and the data Y3, and the data of odd-numbered lines are inputted as the data Y2 and the data Y4.

In 1), the inputted data Y1 (luminance) and the data Y3 (luminance) of odd-numbered lines are selected over a one-line period by the line switching unit 85 and the line switching unit 95. The selected data are outputted from the line switching unit 85 and the line switching unit 95 respectively as a line luminance data 1 having pixels uniformly distributed in the vertical direction and a line luminance data 3 having pixels uniformly distributed in the vertical direction. The inputted line luminance data of the even-numbered lines are processed as described below so that the pixel data distribution thereof becomes uniform downward. The adder 88 adds the data Y2 multiplied by the coefficient α by the multiplier 86 and the data Y3 multiplied by the coefficient β by the multiplier 87, and the divider 89 divides the added data by (α+β). The divided data thus obtained is selected by the line switching unit 90 over a one-line period. As a result, the line luminance data 2 having pixels uniformly distributed in the vertical direction is generated and outputted from the line switching unit 90.

In 2), the inputted data Y1 (luminance) of odd-numbered lines are processed as described below so that the pixel data distribution thereof becomes uniform downward. The adder 83 adds the data Y1 multiplied by the coefficient α by the multiplier 81 and the data Y2 multiplied by the coefficient β by the multiplier 82, and the divider 84 divides the added data by (α+β). The divided data thus obtained is selected by the line switching unit 85 over a one-line period. As a result, the line luminance data 1 having pixels uniformly distributed in the vertical direction is generated and outputted from the line switching unit 85.

The data Y2 is selected by the line switching unit 90 over a one-line period and outputted as the line luminance data 2 having pixels uniformly distributed in the vertical direction. The adder 93 adds the data Y3 multiplied by the coefficient α by the multiplier 91 and the data Y4 multiplied by the coefficient β by the multiplier 92, and the divider 94 divides the added data by (α+β). The divided data thus obtained is selected by the line switching unit 95 over a one-line period. As a result, the line luminance data 3 having pixels uniformly distributed in the vertical direction is generated and outputted from the line switching unit 85.

When processed as described so far, the luminance value of pixel data obtained by mixing an even number of pixels in the vertical direction can be interpolated by employing pseudo shift to lower side on coordinates. Similarly to the example 1, the coefficient α and the coefficient β are logically α:β=2:1 because the non-uniform distribution of the pixel data due to the four-pixel mixing is corrected by linear interpolation between two adjacent pixels. To simplify the division $1/(\alpha+\beta)$ by the dividers 84, 89, and 94, (α+β) may be set to the power-of-two ($2^n$), 16, for example, α:β=10:6 or α:β=11:5 as an approximate value.

Figure 25:
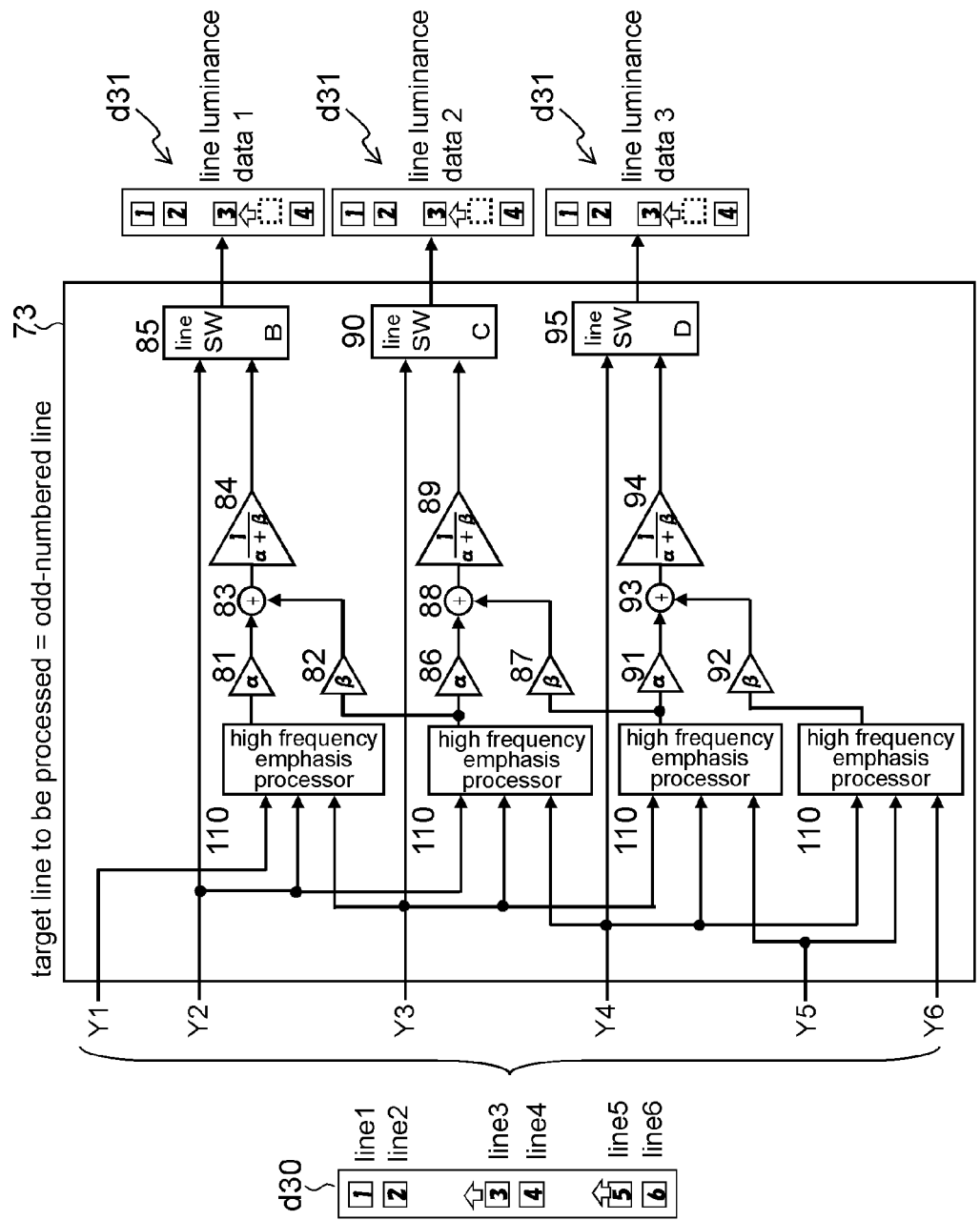
FIG. 25 is a block diagram illustrating the vertical distribution equalization processor according to the example 2 wherein the luminance value of pixel data in an odd-numbered line is subjected to the pseudo interpolation process in a manner shifted to upper side on coordinates without undermining a high resolution in the vertical direction.

FIG. 25 illustrates the vertical distribution equalization processor 73 wherein the luminance value of pixel data of an odd-numbered line in a manner shifted to upper side on coordinates without undermining a desirably high resolution in the vertical direction. A basic operation is similar to that of FIG. 24 except that high frequency emphasis processors 110 are provided to increase a vertical resolution of a line subjected to the correction process. A vertical high frequency emphasis process is performed prior to the linear interpolation to between lines to maintain a desirable resolution in the vertical direction.

Figure 26:
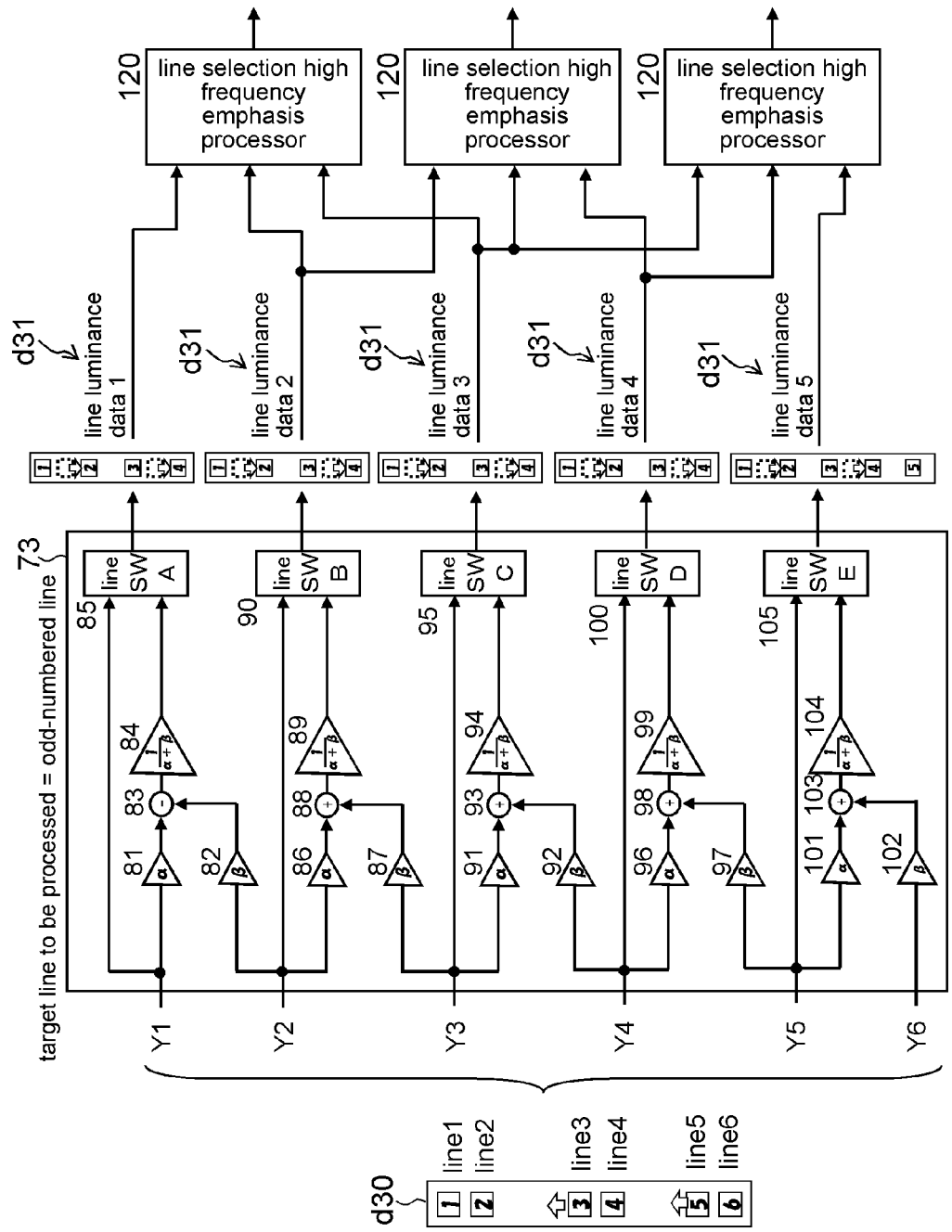
FIG. 26 is a block diagram illustrating the vertical distribution equalization processor according to the example 2 wherein the luminance value of pixel data in an even-numbered line is subjected to the pseudo interpolation process in a manner shifted to lower side on coordinates without undermining a high resolution in the vertical direction.

FIG. 26 illustrates the vertical distribution equalization processor 73 wherein the luminance value of pixel data of an even-numbered line in a manner shifted to lower side on coordinates without undermining a desirably high resolution in the vertical direction. A basic operation is similar to that of FIG. 24 except that high frequency emphasis processors 120 are provided to increase the resolution in a corrected line in the vertical direction. In order to maintain a desirable resolution in the vertical direction, the vertical high frequency emphasis process is performed as a post-processing step to an output line subjected to the correction process alone where the pixel data distribution was corrected to be vertically uniform by linear interpolation between lines.

Referring to FIG. 23 again, the vertical luminance resizing processor 75 vertically performs linear interpolation for three-line input to the line luminance data d31 of three lines having pixels uniformly distributed in the vertical direction in accordance with a reducing ratio. The linearly interpolated data is thinned and outputted as the line luminance data d32 resized and having pixels uniformly distributed in the vertical direction per line.

The three different kinds of color carrier data C1, C2, and C3 modulated in the vertical direction are demodulated for color inversion demodulation to obtain the three different kinds of color difference data d33. The color difference data d33 thus obtained is linearly interpolated by the vertical color difference resizing processor 76 in accordance with a reducing ratio in a manner similar to the linear interpolation for three-line input performed to the luminance data. The linearly interpolated data is thinned and outputted as the line color difference data d34 having BG repeated per line.

The BG-repeated line color difference data d34 resized by thinning lines in the vertical direction is code-inverted per line output by the color carrier modulator 77, which is as an equivalent process in order to modulate the data using the Nyquist frequency that changes based on the cycle of two pixels in the vertical direction. The code-inverted data is outputted from the carrier modulator 77 as the line color carrier data d35 having BG repeated in the vertical direction in which the color array periodicity is resumed.

The color array reproduction processor 78 re-synthesizes the line luminance data d32 resized and having pixels uniformly distributed in the vertical direction with the vertical line color carrier data d35. As a result, the color array reproduction processor 78 obtains the RAW data d36 to be finally obtained, which is resized and having pixels uniformly distributed in the vertical direction. The RAW data d36 contains the BG-repeated line data resized horizontally and vertically and having information of B and information of G repeated per pixel in the vertical direction and the GR-repeated line data resized horizontally and vertically and having information of G and information of R repeated per pixel in the vertical direction.

Though the reducing process was described in this example, an enlarging process may be similarly preformed by using the vertical resizing processing function illustrated in FIG. 23. The enlarging process, however, uses more lines for data output than lines for data input. Therefore, processes after the resizing process should be performed at higher processing speeds, or the continuous data input and processes before the resizing process should be synchronously suspended.

Then, the RAW data d36 resized and having pixels uniformly distributed in the vertical direction is inputted to and processed by the image signal processor 10 illustrated in FIG. 27 to be converted to an image to be finally obtained (for example, a preview display image, moving images recorded in a normalized size with a smaller number of pixels than the image sensor).

The distribution equalization and resizing process according to the invention processes the four-pixel-mixed RAW data as follows;
  divides the source image RAW data into the continuous luminance data and the continuous color carrier data,
  performs the distribution equalization process to the continuous luminance data independently from the continuous color carrier data,
  performs the resizing process to the continuous luminance data, and
  performs the resizing process to the continuous color carrier data.

The color carrier data is code-inverted and then resized, and then code-inverted again to resume its original signal form. Then, the continuous luminance data resized and having pixels uniformly distributed is re-synthesized with the resized continuous color carrier data.

A sequence of these processes is performed in the first array direction and the second array direction orthogonal thereto. The occurrence of false signals caused by the non-uniformity of pixel data distribution due to pixel mixing is prevented from happening in an image finally obtained, and the luminance signal achieves a high resolution to be desirably obtained. The invention favorably exerting these effects is suitably applied to display of preview and shooting and processing moving images.

In the examples of the invention were described the horizontal and vertical equalization processes that are performed to the four-pixel-mixed RAW data obtained by the image sensor. However, only one of the processes may be performed in one direction. When, for example, the RAW data is outputted by mixing two pixels in one of the directions in the image sensor, one of the horizontal and vertical processes may be suitably selected depending on the direction where the pixels are mixed.

The invention is not necessarily applied to dedicated image processing devices (for example, image reproducer and image processor) but may be applied to personal computers as well. A part or the whole of the image processes may be performed by software instead of hardware (signal processing circuit).

The image processing program and the recording medium according to the invention may be provided in the form of independent application software programs or embedded in application software programs, for example, image processing software and file management software. The image processing program and the recording medium according to the invention are not necessarily applied to computer systems, for example, personal computers but may be applied to operation programs and recording media of central processing units (CPU) embedded in information devices such as digital cameras and mobile telephones.

INDUSTRIAL APPLICABILITY

According to the image processing device and the image processing method provided by the invention, RAW data of a source image having pixel data non-uniformly distributed due to pixel mixing in an image sensor is subjected to a distribution equalization process and a re-synthesizing process. This enables to generate the RAW data while reducing the occurrence of false luminance signals and ensuring a desirable resolution. The invention, when combined with a reducing or enlarging process performed to the source image RAW data obtained from a single-plate color image sensor, provides an advantageous technology for electronic still cameras having a data resizing function and data resizing programs to obtain high-quality RAW data.

DESCRIPTION OF REFERENCE SYMBOLS

A1 first distribution equalization processor
B1 second distribution equalization processor
A2 first distribution equalization and resizing processor
B2 first distribution equalization and resizing processor
a1 first filtering processor
a2 first luminance distribution equalization processor a3 first luminance resizing processor
a4 first color inversion demodulator
a5 first color difference resizing processor
a6 first color carrier modulator
a7 first color array reproduction processor
b1 second filtering processor
b2 second luminance distribution equalization processor
b3 second luminance resizing processor
b4 second color inversion demodulator
b5 second color difference resizing processor
b6 second color carrier modulator
b7 second color array reproduction processor
H1, H11, H12 horizontal distribution equalization process
V1, V11, V12 vertical distribution equalization process
H2, H21, H22 horizontal distribution equalization and resizing process
V2, V21, V22 vertical distribution equalization and resizing process
FM1, FM2 frame memory
LM1, LM2 line memory
1 mage sensor
11 color carrier removal filtering processor
12 color carrier extraction filtering processor
20 horizontal distribution equalization processor
27, 28 high frequency emphasis processor
30 color array reproduction processor
37, 38 high frequency emphasis processor
41 color carrier removal filtering processor
42 color carrier extraction filtering processor
43 vertical distribution equalization processor
44 color array reproduction processor
61 color carrier removal filtering processor
62 color carrier extraction filtering processor
63 horizontal distribution equalization processor
64 horizontal luminance resizing processor
65 color inversion demodulator
66 horizontal color difference resizing processor
67 color carrier modulator
68 color array reproduction processor
71 color carrier removal filtering processor
72 color carrier extraction filtering processor
73 vertical distribution equalization processor
74 color inversion demodulator
75 vertical luminance resizing processor
76 vertical color difference resizing processor
77 color carrier modulator
78 color array reproduction processor
110, 120 high frequency emphasis processor

The invention claimed is:

1. An image processing device, including:
a first distribution equalization processor for generating a first multiple-color array data by inputting RAW data of a source image, the source image RAW data being outputted by mixing an even number of pixels from an image sensor having multiple-color pixels where an array of colors has a periodicity and having a pixel data distribution non-uniform in first and second array directions orthogonal to each other, and by correcting the pixel data distribution of the inputted source image RAW data to be uniform in the first array direction; and
a second distribution equalization processor for inputting the first multiple-color array data and generating a second multiple-color array data by correcting the pixel data distribution of the inputted first multiple-color array data to be uniform in the second array direction, wherein
the first distribution equalization processor includes:
a first filtering processor for dividing the source image RAW data into a first luminance data and a first color carrier data that are continuous data by performing a pixel-based filtering process to the source image RAW data along the first array direction;
a first luminance distribution equalization processor for generating a second luminance data by correcting a luminance distribution of the first luminance data to be uniform in the first array direction; and
a first color array reproduction processor for generating the first multiple-color array data by re-synthesizing the first color carrier data with the second luminance data, and
the second distribution equalization processor includes:
a second filtering processor for dividing the first multiple-color array data into a third luminance data and a second color carrier data that are continuous data by performing a pixel-based filtering process to the first multiple-color array data along the second array direction;
a second luminance distribution equalization processor for generating a fourth luminance data by correcting a luminance distribution of the third luminance data to be uniform in the second array direction; and
a second color array reproduction processor for generating the second multiple-color array data by re-synthesizing the second color carrier data with the fourth luminance data.

2. The image processing device as claimed in claim 1, further including a buffer for transmitting the first multiple-color array data to the second distribution equalization processor, wherein
the buffer includes a frame memory having a memory space two-dimensionally extending, and
the first multiple-color array data is read from the frame memory in a direction orthogonal to a direction where the first multiple-color array data is written therein and transmitted to the second distribution equalization and resizing processor.

3. The image processing device as claimed in claim 1, further including a buffer for transmitting the first multiple-color array data to the second distribution equalization processor, wherein
the buffer includes a line memory having a plurality of lines, and
while the first multiple-color array data is being written in each of the plurality of lines of the line memory, the first multiple-color array data is read from the plurality of lines of the line memory and transmitted to the second distribution equalization processor.

4. The image processing device as claimed in claim 1, wherein
the distribution equalization process performed to the luminance data by the first or second luminance distribution equalization processor is a process in which luminance data of a target pixel to be processed is approximated to luminance data of an arbitrary pixel of the source image before mixing plural pixels by performing an interpolation process, and
of two pixels adjacent to the target pixel to be processed, one of the two pixels of a different color more distant from the target pixel to be processed is set as a support pixel, and an interpolated luminance data obtained by performing the interpolation process to the luminance data of the target pixel to be processed and the luminance data of the support pixel is used as the luminance data of the target pixel to be processed.

5. The image processing device as claimed in claim 4, wherein
the distribution equalization process performed to the luminance data by the first or second luminance distribution equalization processor is a process in which the luminance data of the target pixel to be processed and the luminance data of the support pixel are proportionately divided by assigning a distance between the support pixel and a virtually allocated pixel hypothetically located in the middle of the adjacent pixels and a distance between the target pixel to be processed and the virtually allocated pixel to division point formula, so that the interpolated luminance data is obtained from a result of the data division.

6. The image processing device as claimed in claim 4, wherein
the distribution equalization process performed to the luminance data by the first or second luminance distribution equalization processor is a process in which the target pixel to be processed is set as a virtually allocated pixel based on the assumption that the distribution becomes uniform when the target pixel to be processed and the support pixel are moved away from each other, and the luminance data of the target pixel to be processed and the luminance data of the support pixel are proportionately divided by assigning a distance between the support pixel and the virtually allocated pixel and a distance between the target pixel to be processed and the virtually allocated pixel to division point formula, so that the interpolated luminance data is obtained from a result of the data division.

7. The image processing device as claimed in claim 4, wherein
the first and second luminance distribution equalization processors perform a high frequency emphasis process to the luminance data of the target pixel to be processed and a high frequency emphasis process to the luminance data of the support pixel before the interpolation process is performed to the luminance data of the target pixel to be processed.

8. The image processing device as claimed in claim 4, wherein
the first and second luminance distribution equalization processors perform a high frequency emphasis process to the luminance data of the target pixel to be processed a high frequency emphasis process to the luminance data of the support pixel after the interpolation process is performed to the luminance data of the target pixel to be processed.

9. The image processing device as claimed in claim 1, wherein
the source image RAW data is a RAW data having a Bayer RGB periodicity, and
in the RAW data, BG-repeated line data and GR-repeated line data along the horizontal direction are alternately outputted in the vertical direction.

10. The image processing device as claimed in claim 1, wherein
the source image RAW data is a RAW data obtained by a single-plate color image sensor containing multiple-color pixels arranged by complementary color filters based on a periodicity.

11. The image processing device as claimed in claim 1, wherein
the source image RAW data is a RAW data obtained by a single-plate color image sensor containing multiple-color pixels arranged by complementary color filters based on a pixel-based periodicity on a line and one-color pixels arranged irrelevant to such a periodicity on another line.

12. An image processing device, including:
a first distribution equalization and resizing processor for generating a first multiple-color array data by inputting RAW data of a source image, the source image RAW data being outputted by mixing an even number of pixels from an image sensor having multiple-color pixels where an array of colors has a periodicity and having a pixel data distribution non-uniform in first and second array directions orthogonal to each other, and by correcting the pixel data distribution of the inputted source image RAW data to be uniform in the first array direction and further resizing the inputted source image RAW data in the first array direction; and
a second distribution equalization and resizing processor for generating a second multiple-color array data by correcting the pixel data distribution of the first multiple-color array data to be uniform in the second array direction and further resizing the first multiple-color array data in the second array direction, wherein
the first distribution equalization and resizing processor includes:
a first filtering processor for dividing the source image RAW data into a first luminance data that is a continuous data and a first color carrier data that is a continuous data alternately code-inverted and having different colors alternately arranged per pixel by performing a pixel-based filtering process to the source image RAW data along the first array direction;
a first luminance distribution equalization processor for generating a second luminance data by correcting a luminance distribution of the first luminance data to be uniform in the first array direction;
a first luminance resizing processor for generating a 2-1th luminance data by performing a resizing process to the second luminance data in the first array direction;
a first color inversion demodulator for generating a first color difference data that is a continuous data having same colors serially arranged by demodulating the first color carrier data;
a first color difference resizing processor for generating a second color difference data by performing a resizing process to the first color difference data in the first array direction;
a first color carrier modulator for modulating the second color difference data into a 1-1th color carrier data alternately code-inverted so that the array of colors resumes the periodicity; and
a first color array reproduction processor for generating the first multiple-color array data by re-synthesizing the 1-1th color carrier data with the 2-1th luminance data, and
the second distribution equalization and resizing processor includes:
a second filtering processor for dividing the first multiple-color array data into a third luminance data that is a continuous data and a second color carrier data that is a continuous data alternately code-inverted and having different colors alternately arranged per pixel by performing a pixel-based filtering processor to the first multiple-color array data along the second array direction;
a second luminance distribution equalization processor for generating a fourth luminance data by correcting a luminance distribution of the third luminance data to be uniform in the second array direction;

a second luminance resizing processor for generating a fifth luminance data by performing a resizing process to the fourth luminance data in the second array direction;

a second color inversion demodulator for generating a third color difference data that is a continuous data having same colors serially arranged by demodulating the second color carrier data;

a second color difference resizing processor for generating a fourth color difference data by performing a resizing process to the third color difference data in the second array direction;

a second color carrier modulator for modulating the fourth color difference data into a third color carrier data alternately code-inverted so that the array of colors resumes the periodicity; and a second color array reproduction processor for generating the second multiple-color array data by re-synthesizing the third color carrier data with the fifth luminance data.

13. The image processing device as claimed in claim 12, further including a buffer for transmitting the first multiple-color array data to the second distribution equalization processor, wherein the buffer includes a frame memory having a memory space two-dimensionally extending, and the first multiple-color array data is read from the frame memory in a direction orthogonal to a direction where the first multiple-color array data is written therein and then transmitted to the second distribution equalization and resizing processor.

14. The image processing device as claimed in claim 12, further including a buffer for transmitting the first multiple-color array data to the second distribution equalization processor, wherein the buffer includes a line memory having a plurality of lines, and while the first multiple-color array data is being written in each of the plurality of lines of the line memory, the first multiple-color array data is read from the plurality of lines of the line memory and transmitted to the second distribution equalization and resizing processor.

15. The image processing device as claimed in claim 12, wherein the first luminance resizing processor, the second color difference resizing processor, the second luminance resizing processor, and the second color difference resizing processor has a function of performing a reducing process as the resizing process.

16. The image processing device as claimed in claim 12, wherein the first luminance resizing processor, the first color difference resizing processor, the second luminance resizing processor, and the second color difference resizing processor has a function of performing an enlarging process as the resizing process.

17. The image processing device as claimed in claim 12, wherein the distribution equalization process performed to the luminance data by the first or second luminance distribution equalization processor is a process in which luminance data of a target pixel to be processed is approximated to luminance data of an arbitrary pixel of the source image before mixing plural pixels by performing an interpolation process, and of two pixels adjacent to the target pixel to be processed, one of the two pixels of a different color more distant from the target pixel to be processed is set as a support pixel, and an interpolated luminance data obtained by performing the interpolation process to the luminance data of the target pixel to be processed and the luminance data of the support pixel is used as the luminance data of the target pixel to be processed.

18. The image processing device as claimed in claim 17, wherein the distribution equalization process performed to the luminance data by the first or second luminance distribution equalization processor is a process in which the luminance data of the target pixel to be processed and the luminance data of the support pixel are proportionately divided by assigning a distance between the support pixel and a virtually allocated pixel hypothetically located in the middle of the adjacent pixels and a distance between the target pixel to be processed and the virtually allocated pixel to division point formula, so that the interpolated luminance data is obtained from a result of the data division.

19. The image processing device as claimed in claim 17, wherein the distribution equalization process performed to the luminance data by the first or second luminance distribution equalization processor is a process in which the target pixel to be processed is set as a virtually allocated pixel based on the assumption that the distribution becomes uniform when the target pixel to be processed and the support pixel are moved away from each other, and the luminance data of the target pixel to be processed and the luminance data of the support pixel are proportionately divided by assigning a distance between the support pixel and the virtually allocated pixel and a distance between the target pixel to be processed and the virtually allocated pixel to division point formula, so that the interpolated luminance data is obtained from a result of the data division.

20. The image processing device as claimed in claim 17, wherein the first and second luminance distribution equalization processors perform a high frequency emphasis process to the luminance data of the target pixel to be processed and a high frequency emphasis process to the luminance data of the support pixel before the interpolation process is performed to the luminance data of the target pixel to be processed.

21. The image processing device as claimed in claim 17, wherein the first and second luminance distribution equalization processors perform a high frequency emphasis process to the luminance data of the target pixel to be processed a high frequency emphasis process to the luminance data of the support pixel after the interpolation process is performed to the luminance data of the target pixel to be processed.

22. The image processing device as claimed in claim 12, wherein the source image RAW data is a RAW data having a Bayer RGB periodicity, and in the RAW data, BG-repeated line data and GR-repeated line data along the horizontal direction are alternately outputted in the vertical direction.

23. The image processing device as claimed in claim 12, wherein the source image RAW data is a RAW data obtained by a single-plate color image sensor containing multiple-color pixels arranged by complementary color filters based on a periodicity.

24. The image processing device as claimed in claim 12, wherein the source image RAW data is a RAW data obtained by a single-plate color image sensor containing multiple-color pixels arranged by complementary color filters based on a pixel-based periodicity on a line and one-color pixels arranged irrelevant to such a periodicity on another line.

* * * * *